US012724779B2

(12) United States Patent
Mundar

(10) Patent No.: US 12,724,779 B2

(45) Date of Patent: Sep. 1, 2026

(54) SYSTEMS METHODS AND APPARATUS FOR GENERATION OF A DATABASE OBJECT

(71) Applicant: Live Nation Entertainment, Inc., Beverly Hills, CA (US)

(72) Inventor: Thomas Mundar, Scottsdale, AZ (US)

(73) Assignee: Live Nation Entertainment, Inc., Beverly Hills, CA (US)

( * ) Notice: Subject to any disclaimer, the term of this patent is extended or adjusted under 35 U.S.C. 154(b) by 0 days.

(21) Appl. No.: 16/452,137

(22) Filed: Jun. 25, 2019

(65) Prior Publication Data

US 2019/0391980 A1 Dec. 26, 2019

Related U.S. Application Data

(60) Provisional application No. 62/690,131, filed on Jun. 26, 2018.

(51) Int. Cl.

*G06F 16/2455* (2019.01)
*G06F 9/50* (2006.01)
*G06F 16/21* (2019.01)
*G06F 16/22* (2019.01)
*G06F 16/23* (2019.01)
*G06F 16/2458* (2019.01)

(52) U.S. Cl.

CPC .......... *G06F 16/24557* (2019.01); *G06F 9/50* (2013.01); *G06F 16/217* (2019.01); *G06F 16/2237* (2019.01); *G06F 16/2322* (2019.01); *G06F 16/2458* (2019.01)

(58) Field of Classification Search

CPC ............ G06F 16/24557; G06F 16/217; G06F 16/2237; G06F 16/2458; G06F 16/2322; G06F 9/50

See application file for complete search history.

(56) References Cited

U.S. PATENT DOCUMENTS 6,910,627 B1 6/2005 Simpson-Young et al.
8,346,580 B2 1/2013 Nakfoor
9,295,908 B2 3/2016 Froy et al.
9,424,360 B2 8/2016 Goel et al.
9,430,663 B2 * 8/2016 Hsu ....................... H04L 63/105
9,467,545 B1 * 10/2016 Agranov ............... G06F 16/951
9,798,984 B2 10/2017 Paleja et al.
9,953,275 B2 4/2018 Gibson et al.
10,817,831 B1 * 10/2020 Polyanskiy .......... G06Q 10/087
2004/0236852 A1 * 11/2004 Birkestrand .............. G06F 9/50 709/226

(Continued)

*Primary Examiner* — Apu M Mofiz
*Assistant Examiner* — Husam Turki Samara
(74) *Attorney, Agent, or Firm* — MUGHAL GAUDRY & FRANKLIN PC

(57) ABSTRACT

Embodiments described herein generally related to efficient and scalable database querying mechanisms. Various embodiments disclose processes, methods, and systems for storing resource data within a database such that the resource data may be searched across a plurality of time periods. Various embodiments disclose processes, methods, and systems for determining a best resource to return given a specific set of data points. Various embodiments disclose processes, methods, and systems for rending one or more sets of query results based on velocity of received queries for resource data.

21 Claims, 28 Drawing Sheets

(56) References Cited

U.S. PATENT DOCUMENTS

2006/0026598 A1* 2/2006 Handlogten .......... G06F 9/5011
718/104
2012/0215573 A1* 8/2012 Sussman ............. H04L 67/1008
705/5
2014/0236840 A1 8/2014 Islam
2014/0379390 A1* 12/2014 Scarborough ...... G06Q 30/0639
705/5
2016/0063400 A1* 3/2016 Lee ........................ G06Q 10/02
705/5
2017/0286173 A1* 10/2017 Wagh ............... G06Q 10/06311
2019/0319967 A1* 10/2019 Holt ...................... H04L 63/108

* cited by examiner

1200

| | Resource 1 1205 | Resource 2 1210 | Resource 3 1215 |
|---|---|---|---|
| Availability | < 1 0 1 1 0 1> | < 0 0 1 1 1 1> | < 1 1 1 1 1 0> |
| Rate | 110 | 120 | 130 |
| Location | 1:5 | 1:1 | 2:1 |

FIG. 12

| | Resource 1 | Resource 2 | Resource 3 | Resource 4 | Resource 5 | Resource 6 | Resource 7 | Resource 8 | Resource 9 | Resource 10 |
|---|---|---|---|---|---|---|---|---|---|---|
| Time Period 1 | | | | | | | | | 1 | 1 |
| Time Period 2 | 1 | 1 | 1 | | | | | | 1 | 1 |
| Time Period 3 | | | | 1 | 1 | | | | | |
| Time Period 4 | 1 | 1 | 1 | 1 | | | 1 | 1 | 1 | 1 |
| Time Period 5 | 1 | 1 | 1 | 1 | | | | | | |
| Time Period 6 | 1 | 1 | | | | | | | | |
| Time Period 7 | | | 1 | 1 | | | | | 1 | 1 |
| Time Period 8 | 1 | 1 | | | | | | | 1 | 1 |
| Time Period 9 | 1 | 1 | 1 | 1 | | | | 1 | 1 | 1 |
| Time Period 10 | 1 | 1 | 1 | 1 | 1 | 1 | 1 | 1 | 1 | 1 |

| | Resource 1 | Resource 2 | Resource 3 | Resource 4 | Resource 5 | Resource 6 | Resource 7 | Resource 8 | Resource 9 | Resource 10 |
|---|---|---|---|---|---|---|---|---|---|---|
| TP 1: Team 4 | | | | | | | | | 1 | 1 |
| TP 2: Team 2 | 1 | 1 | 1 | | | | | | 1 | 1 |
| TP 3: Team 3 | | | | 1 | 1 | | | | 1 | |
| TP 4: Team 4 | 1 | 1 | 1 | 1 | | | 1 | 1 | 1 | 1 |
| TP 5: Team 1 | 1 | 1 | 1 | 1 | | | | | 1 | |
| TP 6: Team 5 | 1 | 1 | | | | | | | 1 | |
| TP 7: Team 4 | | | 1 | 1 | | | | | 1 | 1 |
| TP 8: Team 2 | 1 | 1 | | | | | | | 1 | 1 |
| TP 9: Team 6 | 1 | 1 | 1 | 1 | | | | 1 | 1 | 1 |
| TP 10: Team 4 | 1 | 1 | 1 | 1 | 1 | 1 | 1 | 1 | 1 | 1 |

TP = Time Period

SYSTEMS METHODS AND APPARATUS FOR GENERATION OF A DATABASE OBJECT

CROSS-REFERENCES TO RELATED APPLICATIONS

This application claims the benefit under 35 U.S.C. 119(e) of U.S. Provisional Application No. 62/690,131, filed Jun. 26, 2018, which is assigned to the assignee hereof, and incorporated herein in its entirety by reference.

BRIEF DESCRIPTION OF THE DRAWINGS

The present disclosure is described in conjunction with the appended figures:

FIG. 12 illustrates one or more exemplary embodiments of one or more data structures of a resource access-facilitating interaction system;

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment (s) will provide those skilled in the art with an enabling description for implementing a preferred exemplary embodiment. It is understood that various changes can be made in the function and arrangement of elements without departing from the spirit and scope as set forth in the appended claims.

Figure 1:
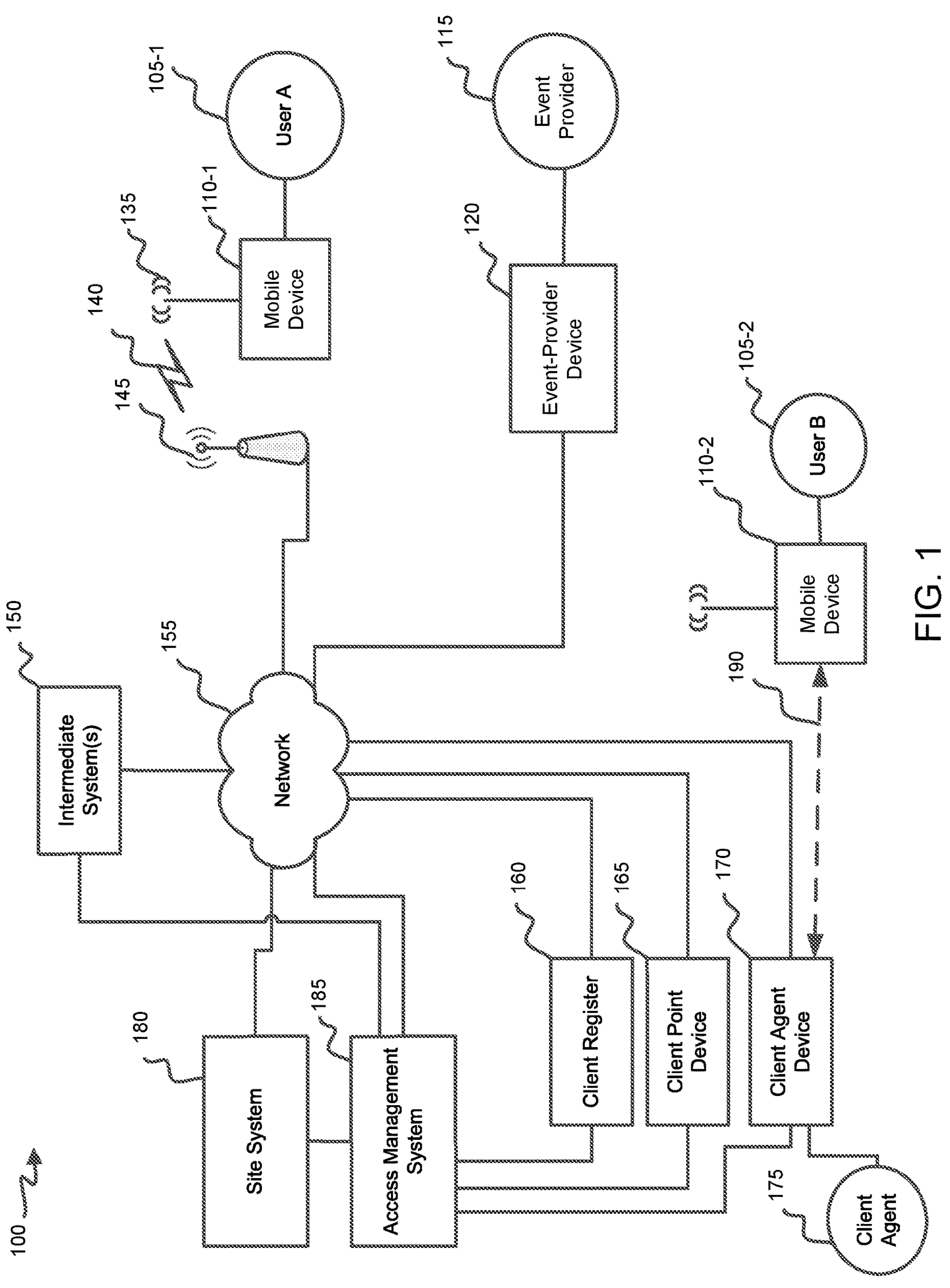
FIG. 1 depicts a block diagram of an embodiment of a resource access-facilitating interaction system.

FIG. 1 depicts a block diagram of an embodiment of a resource management system 100 (resource management system 100 may also be referred to as resource system 100), according to an embodiment of the present disclosure. Mobile device 110 (which can be operated by a user 105) and an event-provider device 120 (which can be operated, controlled, or used by an event provider 115) can communicate with an access management system 185 directly or via another system (e.g., via an intermediate system 150). Mobile device 110 may transmit data to access point 145, which is connected to network 155, over communication channel 140 using antennae 135. While FIG. 1 illustrates mobile device 110 communicating with access point 145 using a wireless connection (e.g., communication channel 140), in some embodiments, mobile device 110 may also communicate with access point 145 using a wired connection (e.g., an Ethernet connection). Mobile device 110 can also communicate with one or more client devices, such as a client agent device 170 operated by a client agent 175, a client register 160 or a client point device 165 using a wired or wireless connection. In addition, using the access management system 185, an event provider 115 can identify an event, a parameter of attending the event, a date or dates of the event, a location or locations of the event, etc. Each inter-system communication can occur over one or more networks 155 and can facilitate transmission of a variety of types of data. It will be understood that, although only one of various systems, devices, entities and network are shown, the resource management system 100 can be extended to include multiple of any given system(s), device(s), entity (ies), and/or networks.

Access management system 185 can be configured to manage a dynamic set of access tokens to one or more resources. More specifically, access management system 185 can track which resources are to be made available to users, specifications of the resources and times at which they will be available. Access management system 185 can also allocate access tokens for resources and facilitate transmissions of notifications of the available rights to a set of user devices. For example, access management system 185 can alert users of the availability via a network location, app page or email. As another example, access management system can transmit data about access tokens and resources to one or more intermediate systems 150, which can facilitate distribution of access token availability and processing of requests for such rights.

Notifications of available access tokens can be accompanied by options to request that one or more access tokens be assigned to a user. Therefore, user 105 can provide input to mobile device 110 via an interface to request such assignment and provide other pertinent information. Intermediate system 150 and/or access management system 185 can process the request to ensure that the requested access token(s) remain available and that all required information has been received and, in some instances, verified. Thereafter, access management system 185 can assign one or more access tokens to the user, e.g., matching the access tokens requested by the user.

Assigning an access token can include, for example, associating an identifier of the right with an identifier of a user, changing a status of the right from available to assigned, facilitating a cease in notifications that the access token is available, generating an access-enabling code to use such that the corresponding access will be permitted and/or generating a notification to be received at mobile device 110 confirming the assignment and/or including data required for corresponding access to be permitted.

In some instances, a resource is at least partly controlled, by a client. The resource may be accessed at a particular location or structure, and a variety of client devices may be present at the location so as to facilitate usage of an access token. Exemplary client devices can include client agent device 170, which can be one operated by a client agent 175 (e.g., a human client agent), a client register 160 (e.g., which can operate independently of an agent and/or can be connected to or include a device that, while in a locked mode, can impede resource access, such as a turnstile) and client point device 165 (e.g., which can operate independently of an agent and/or can be positioned at or around the resource-associated location. For example, in some instances client agent device 170 can be operated by an agent at a location for a resource that is an event ("event resource") taking place at the location. In this example, client agent device 170 is used by an agent that is manning an entrance to the location (e.g., which can include, for example, a location of a structure or a geographic region) or a part thereof; client register 160 can be or can be connected to a turnstile, gate or lockable door that is positioned along a perimeter or entrance to a resource-associated location or part thereof; and client point device 165 can be an electronic device positioned at or within a resource-associated location.

In some instances, mobile device 110 performs particular functions upon detecting a client device and/or the contrary. For example, mobile device 110 may locally retrieve or request (e.g., from an external source) an access-enabling code. The access-enabling code can be transmitted to the client device or a remote server (e.g., a server hosting access management system 185) for evaluation and/or can be locally evaluated. The evaluation can include, for example, confirming that the access-enabling code has a particular characteristic or format (e.g., generally or one characteristic corresponding to a particular resource or type of access), matches one in an access-enabling code data store and/or has not been previously redeemed. A result of the evaluation can be locally displayed at an evaluating device, can control a device component (e.g., a physical access control module), and/or can be transmitted to another device, such as mobile device 110.

In some instances, user 105 can use multiple mobile devices 110 to perform various operations (e.g., using one device to request an access token and another to interact with client devices). Some instances of mobile device 110, access management system 185, intermediate system 150, client agent device 170, client register 160 and/or client point device 165 can include a portable electronic device (e.g., a smart phone, tablet, laptop computer or smart wearable device) or a non-portable electronic device (e.g., one or more desktop computers, servers and/or processors).

In exemplary embodiments, access tokens can be represented in data maintained at a client device or at access management system 185. For example, a database or data store include a list of identifiers for each user or user device having an assigned access token for a resource or associating an identifier for each user or user device with an identifier of a particular access token. In some instances, indicia can be transmitted to a user device that indicates that an access token is availed. In various instances, it may be permitted or prohibited for the indicia to be transferred. The indicia may be provided as part of an electronic or physical object (e.g., a right to access an event) or independently. The indicia may include an access-enabling code.

In some instances, access management system 185 communicates with one or more intermediate systems 150, each of which may be controlled by a different entity as compared to an entity controlling access management system 185. For example, access management system 185 may assign access tokens to intermediate systems 150 (e.g., upon acceptance of terms). Intermediate system 150 can then collect data pertaining to the assigned access tokens and/or a corresponding event, can format and/or edit the data, generate a notification of availability of the access tokens that includes the formatted and/or edited data and facilitate presentation of the notification at a mobile device 110. When intermediate system 150 receives a communication from the mobile device 110 indicative of an access token request, intermediate system 150 can facilitate assignment (or reassignment) of an access token to the user (e.g., by transmitting relevant information to access management system 185 identifying the user and/or user device and/or by transmitting relevant information to mobile device 110 pertaining to the access token).

A resource can include one managed or provided by a client, such as a performing entity or an entity operating a location. A mobile device 110 can transmit data corresponding to the access token (e.g., an access-enabling code) to a client device upon, for example, detecting the client device, detecting that a location of the mobile device 110 is within a prescribed geographical region, or detecting particular input. The receiving client device may include, for example, a client agent device 170 operated at an entrance of a defined geographical location or a client register 160 that includes or is attached to a locking turnstile. The client device can then analyze the code to confirm its validity and applicability for a particular resource and/or access type, and admittance to the event can be accordingly permitted. For example, a turnstile may change from a locked to an unlocked mode upon confirmation of the code's validity and applicability.

Each of the depicted devices and/or systems may include a software agent or application ("app") that, when executed, performs one or more actions as described herein. In some instances, a software agent or app on one device is, at least in part, complementary to a software agent or app on another device (e.g., such that a software agent or app on mobile device 110 is, at least in part, complementary to at least part of one on access management system 185 and/or a client device; and/or such that a software agent or app on intermediate system 150 is, at least in part, complementary to at least part of one on access management system 185).

In some instances, a network in the one or more networks 155 can include an open network, such as the Internet (e.g., network), personal area network, local area network (LAN), campus area network (CAN), metropolitan area network (MAN), wide area network (WAN), wireless local area network (WLAN), a private network, such as an intranet, extranet, or other backbone. In some instances, a network in the one or more networks 155 includes a short-range communication channel, such as Bluetooth or Bluetooth Low Energy channel. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications.

In one embodiment, communications between two or more systems and/or devices can be achieved by a secure communications protocol, such as secure sockets layer (SSL), transport layer security (TLS). In addition, data and/or transactional details may be encrypted based on any convenient, known, or to be developed manner, such as, but not limited to, DES, Triple DES, RSA, Blowfish, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

It will be appreciated that, while a variety of devices and systems are shown in FIG. 1, in some instances, resource management system 100 can include fewer devices and/or systems. Further, some systems and/or devices can be combined. For example, a client agent device 170 may also serve as an access management system 185 or intermediate system 150 so as to as to facilitate assignment of access tokens.

As described in further detail herein, an interaction between mobile device 110 and a client device (e.g., client agent device 170, client register 160 or client point device 165) can facilitate, for example, verification that user 105 has a valid and applicable access token, obtaining an assignment of an access token, and/or obtaining an assignment of an upgraded access token.

In addition, mobile device 110-2, which is operated by user 125-2, may include a user device that is located at a regional space (e.g., stadium or concert hall during an event). Mobile device 110-2 may directly interact with a client device (e.g., client agent device 170, client register 160 or client point device 165), which is also located at the regional space. As such, the access management system 185 may be updated or accessed by mobile device 110-2 via the client agent device 170. For example, mobile device 110-2 may communicate with the client agent device 170 over a short-range communication channel 190, such as Bluetooth or Bluetooth Low Energy channel, Near Field Communication (NFC), Wi-Fi, RFID, Zigbee, ANT, etc. Communicating using a short-range communication such as BLE channel can provide advantages such as consuming less power, being able to communicate across moderate distances, being able to detect levels of proximity, achieving high-level security based on encryption and short ranges, and not requiring pairing for inter-device communications. After the short-range communication channel 190 is established, mobile device 110-2 may communicate with the access management system 185 and access the item or items of resources. That is, while mobile device B is configured to communicate over network 155, mobile device 110-2 may communicate with the access management system 185 via the client agent device 170, instead of the network 155.

It will be appreciated that various parts of system 100 (i.e., resource management system 100) can be geographically separated. It will further be appreciated that system 100 can include a different number of various components rather than a number depicted in FIG. 1. For example, two or more of access management systems 185; one or more site systems 180; and intermediate system 150 may be located in different geographic locations (e.g., different cities, states or countries).

Figure 2:
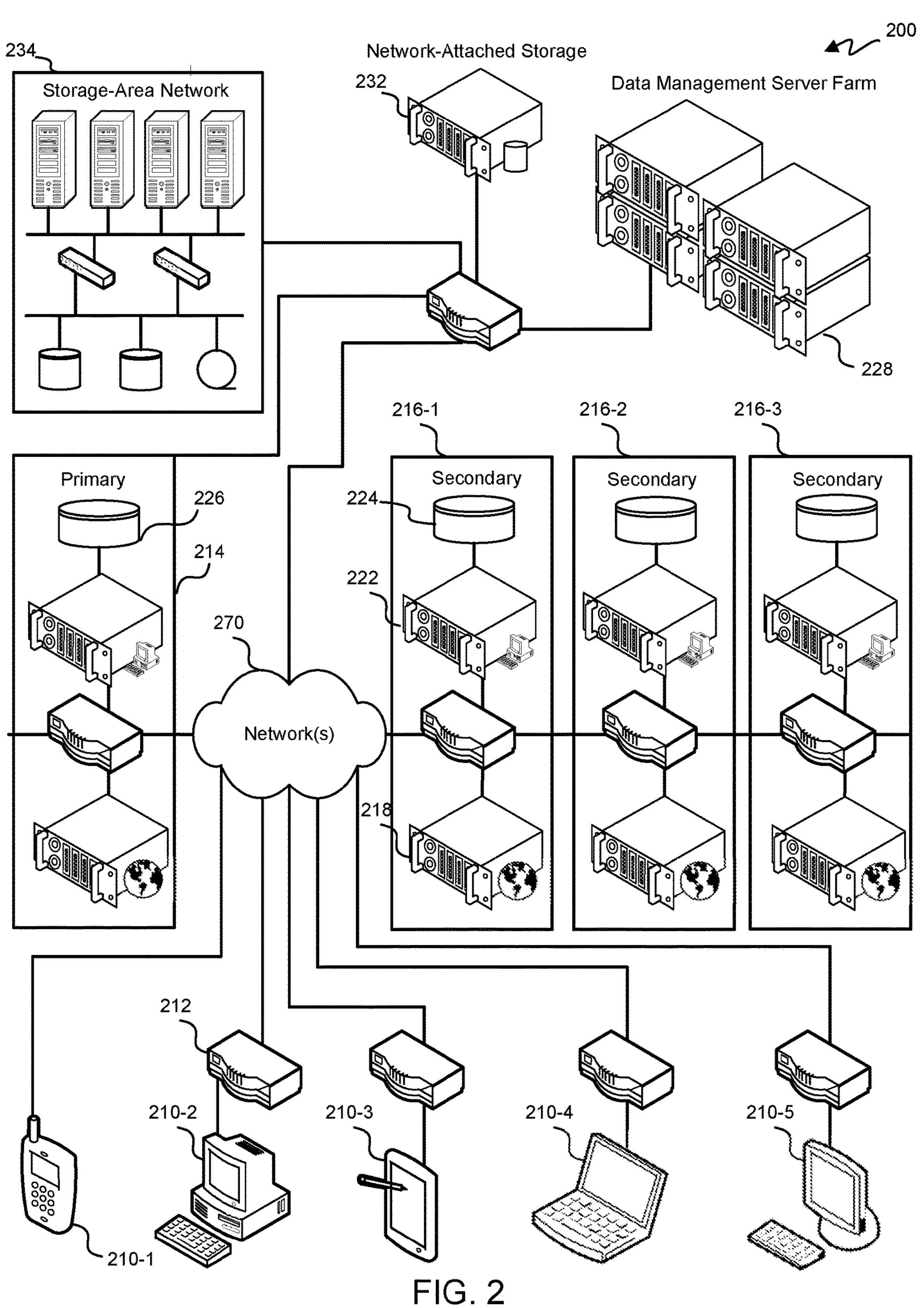
FIG. 2 shows an illustration of hardware and network connections of a resource access-facilitating interaction system according to an embodiment of the invention.

FIG. 2 shows an illustration of hardware and network connections of a resource access-facilitating interaction system 200 according to an embodiment of the invention. Each of various user devices 210-1, 210-2, 210-3, 210-4 and 210-5 can connect, via one or more inter-network connection components (e.g., a router 212) and one or more networks 270 to a primary assignment management system 214 or a secondary assignment management system 216-1, 216-2 or 216-3.

Primary assignment management system 214 can be configured to coordinate and/or control initial assignment of access tokens. Secondary assignment management system 216 can be configured to coordinate and/or control reassignment and/or transfer of access tokens (e.g., from one user or user device to another or from an intermediate agent to a user or user device). Secondary assignment management system 216 may also manage transfer offers (e.g., to allow a first user to identify a rate at which a transfer request would be granted and to detect if a valid request is received). It will be appreciated that, although primary assignment management system 214 is shown to be separate from each secondary assignment management system 216, in some instances, an assignment management system may relate to both a primary and secondary channel, and a single data store or a localized cluster of data stores may include data from both channels.

Each of primary access assignment system 214 and secondary access assignment system 216 can include a server 218 that processes and responds to HTTP requests. Server 218 can retrieve and deliver network location data to a user device 210 that, for example, identify a resource, identify a characteristic of each of one or more access tokens for the resource, include an invitation to request assignment of an access token, facilitate establishment or updating of an account, and/or identify characteristics of one or more assigned access tokens. Server 218 can be configured to support server-side scripting and/or receive data from user devices 210, such as data from forms or file uploads.

In some instances, a server 218 can be configured to communicate data about a resource and an indication that access tokens for the resource are available. Server 218 can receive a request communication from a user device 210 that corresponds to a request for information about access tokens. The request can include one or more constraints, which can correspond to (for example) values (e.g., to be matched or to define a range) of particular fields.

A management server 222 can interact with server 218 to provide indications as to which access tokens' are available for assignment, characteristics of access tokens and/or what data is needed to assign an access token. When requisite information is received (e.g., about a user and/or user device, identifying a final request for one or more access tokens), management server 222 can coordinate an assignment of the one or more access tokens. The coordination can include updating an access token data store to change a status of the one or more access tokens (e.g., to assigned); to associate each of the one or more access tokens with a user and/or user device; to generate or identify one or more access-enabling codes for the one or more access tokens; and/or to facilitate transmission reflecting the assignment (e.g., and including the one or more access-enabling codes) to a user device.

Management server 222 can query, update and manage an access token data store to identify access tokens' availability and/or characteristic and/or to reflect a new assignment. The data store can include one associated with the particular assignment system. In some instances, the data store includes incomplete data about access tokens for a resource. For example, a data store 224 at and/or used by a secondary access assignment system 216 may include data about an incomplete subset of access tokens that have been allocated for a particular resource. To illustrate, a client agent may have indicated that an independent intermediary system can (exclusively or non-exclusively) coordinate assignment of a portion of access tokens for a resource but not the remainder. A data store 224 may then, for example, selectively include information (e.g., characteristics, statuses and/or assignment associations) for access tokens in the portion.

Data store 224 or 226 associated with a particular primary or secondary access assignment system can include assignment data for a set of access tokens that are configured to be set by the particular primary or secondary access assignment system or by another system. For example, a rule can indicate that a given access token is to have an available status until a first of a plurality of access assignment systems assigns the access token. Accordingly, access assignment systems would then need to communicate to alert each other of assignments.

In one instance, management server 222 (or another server in an access assignment system) sends a communication to a data management server farm 228 reflecting one or more recent assignments. The communication may include an identification of one or more access tokens, an indication that the access token(s) have been assigned, an identification of a user and/or user device associated with the assignment and/or one or more access-enabling codes generated or identified to be associated with the assignment. The communication can be sent, for example, upon assigning the access token(s), as a precursor to assigning the access token(s) (e.g., to confirm availability and/or request assignment authorization), at defined times or time intervals and/or in response to an assignment-update request received from data management server farm 228.

Data management server farm 228 can then update a central data store to reflect the data from the communication. The central data store can be part of, for example, a network-attached storage 232 and/or a storage-area network 234.

In some instances, a data store 224 or 226 can include a cache, that includes data stored based on previous communications with data management server farm 228. For example, data management server farm 228 may periodically transmit statuses of a set of access tokens (e.g., those initially configured to be assignable by an access assignment system) or an updated status (e.g., indicating an assignment) of one or more access tokens. As another example, data management server farm 228 may transmit statuses upon receiving a request from an access assignment system for statuses and/or authorization to assign one or more access tokens.

An access assignment system may receive statuses less frequently or at times unaligned with requests received from user devices requesting information about access tokens and/or assignments. Rather than initiate a central data store query responsive to each user-device request, a management server 222 can rely on cached data (e.g., locally cached data) to identify availability of one or more access tokens, as reflect in network location data and/or communications responsive to request communications for access token information. After requisite information has been obtained, management server 222 can then communicate with data management server farm 228 to ensure that one or more particular access tokens have remained available for assignment.

In some instances, one or more of primary access assignment system 214 and/or a secondary access assignment system 216 need not include a local or system-inclusive data store for tracking access token statuses, assignments and/or characteristics. Instead, the access assignment system may communicate with a remote and/or central data store (e.g., network-attached storage 232 or storage-area network 234).

Access management system 185 can include a primary access assignment system 214 and/or a secondary access assignment system 216; data management server farm 228; and/or a central data store (e.g., network-attached storage 232 or storage-area network 234). Each of one or more intermediate systems 130 can include a primary access assignment system 214 and/or a secondary access assignment system 216.

Data management server farm 228 may periodically and/or routinely assess a connection with an access assignment system 214. For example, a test communication can be sent that is indicative of a request to respond (e.g., with particular data or generally). If a response communication is not received, if a response communication is not received within a defined time period and/or if a response communication includes particular data (e.g., reflecting poor data integrity, network speed, processing speed, etc.), data management server farm 228 may reconfigure access tokens and/or permissions and/or may transmit another communication indicating that assignment rights of the access assignment system are limited (e.g., to prevent the system from assigning access tokens).

It will be appreciated that various parts of system 200 can be geographically separated. For example, two or more of primary access assignment system 214; one or more of secondary access assignment systems 216; and data management server farm 228 may be located in different geographic locations (e.g., different cities, states or countries).

It will further be appreciated that system 200 can include a different number of various components rather than a number depicted in FIG. 2. For example, system 200 can include multiple data management server farms 228, central data stores and/or primary access assignment systems 214 (e.g., which can be geographically separated, such as being located in different cities, states or countries). In some instances, processing may be split (e.g., according to a load-balancing technique) across multiple data management server farms 228 and/or across multiple access assignment systems 214. Meanwhile, the farms and/or systems can be configured to accept an increased or full load should another farm and/or system be unavailable (e.g., due to maintenance). Data stored in a central data store may also be replicated in geographically separated data stores.

Figure 3:
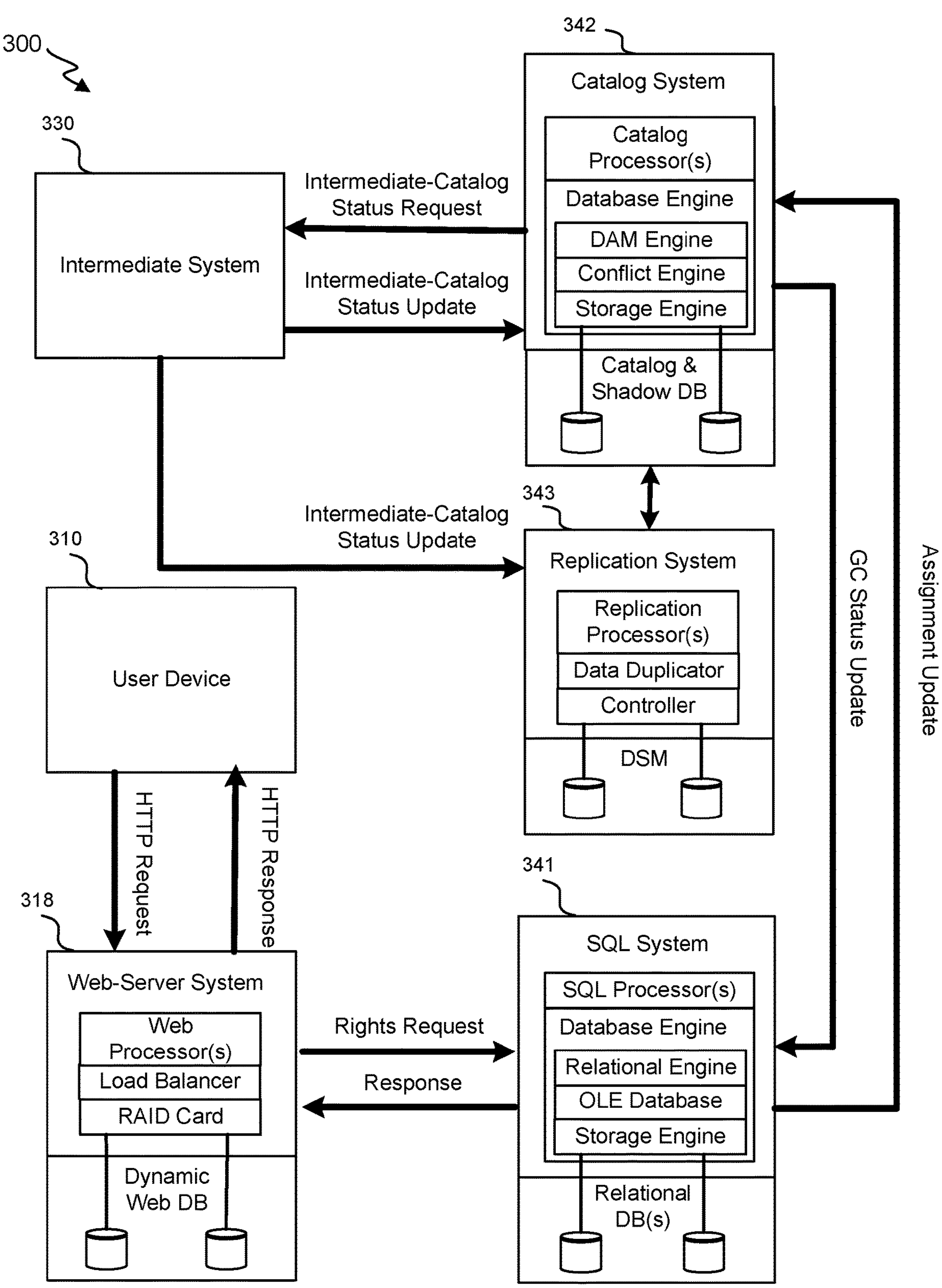
FIG. 3 shows an illustration of a communication exchange between components involved in a resource access-facilitating interaction system according to an embodiment of the invention.

FIG. 3 shows an illustration of a communication exchange between components involved in a resource access-facilitating interaction system 300 according to an embodiment of the invention. A user device 310 can send one or more HTTP requests to a server system 318, and server system 318 can respond with one or more HTTP responses that include network location data. The network location data can include, for example, information about one or more resources, characteristics of a set of access tokens for each of the one or more resources, availability of one or more access tokens, an invitation to request an assignment of one or more access tokens and/or indications as to what information is required for an access token assignment. HTTP requests can include assignment-request data (e.g., a resource identification, requisite information, and/or an identification of an access token constraint or access token).

Server system 318 can include one or more processors (e.g., included in one or more server farms, which may be geographically separated) to, for example, map a path component of a URL to network data (e.g., stored in a local file system or generated by a program); retrieve the network data; and/or generate a response communication including the network data. Processor can further parse communication to identify input-corresponding data in HTTP requests, such as field values required for an access token assignment.

Server system 318 can also include a load balancer to distribute processing tasks across multiple processors. For example, HTTP requests can be distributed to different processors. Load-balancing techniques can be configured so as, for example, to distribute processing across servers or server farms, decrease a number of hops between a server and user device, decrease a geographical location between a user device and server, etc.

Server system 318 can further include a RAID component, such as a RAID controller or card. A RAID component can be configured, for example, to stripe data across multiple drives, distribute parity across drives and/or mirror data across multiple drives. The RAID component can be configured to improve reliability and increase request-processing speeds.

Server system 318 can include one or more distributed, non-distributed, virtual, non-virtual, local and/or remote data stores. The data stores can include network data, scripts and/or content object (e.g., to be presented as part or network data).

Some HTTP requests include requests for identifications of access token characteristics and/or availability. To provide network data reflecting such information, server system 318 can request the information from another server, such as an SQL system 341 (e.g., which may include one or more servers or one or more server farms).

SQL system 341 can include one or more SQL processors (e.g., included in one or more server farms, which may be geographically separated). SQL processors can be configured to query, update and otherwise use one or more relational data stores. SQL processors can be configured to execute (and, in some instances, generate) code (e.g., SQL code) to query a relational data store.

SQL system 341 can include a database engine, that includes a relational engine, OLE database and storage engine. A relational engine can process, parse, compile, and/or optimize a query and/or make query-associated calls. The relational engine can identify an OLE DB row set that identifies the row with columns matching search criteria and/or a ranking value. A storage engine can manage data access and use the row set (e.g., to access tables and indices) to retrieve query-responsive data from one or more relational databases.

SQL system 341 can include one or more distributed, non-distributed, virtual, non-virtual, local and/or remote relational data stores. The relational databases can include linked data structures identifying, for example, resource information, access token identifications and characteristics, access token statuses and/or assignments, and/or user and/or user account data. Thus, for example, use of the relational structures may facilitate identifying, for a particular user, a characteristic of an assigned access token and information about a resource associated with the access token.

One or more data structures in a relational data structure may reflect whether particular access tokens have been assigned or remain available. This data may be based on data received from a catalog system 342 that monitors and tracks statuses of resource access tokens. Catalog system 342 can include one or more catalog processors (e.g., included in one or more server farms, which may be geographically separated). Catalog processors can be configured to generate status-update request communications to be sent to one or more access assignment systems and/or intermediate systems and/or to receive status-update communications from one or more access assignment systems and/or intermediate systems. A status-update communication can, for example, identify an access token and/or resource and indicate an assignment of the access token. For example, a status-update communication can indicate that a particular access token has been assigned and is thus no longer available. In some instances, a status-update communication identifies assignment details, such as a user, account and/or user device associated with an access token assignment; and/or a time that the assignment was made.

In some instances, a status update is less explicit. For example, a communication may identify an access token and/or resource and request a final authorization of an assignment of the access token. Catalog system 342 can then verify that the access token is available for assignment (e.g., and that a request-associated system or entity is authorized to coordinate the assignment) and can transmit an affirmative response. Such a communication exchange can indicate (in some instances) that the access token is assigned and unavailable for other assignment.

In some instances, catalog system 342 can also be integrated with a non-intermediate access assignment system, such that it can directly detect assignments. For example, an integrated access assignment system can coordinate a message exchange with a user device, can query a catalog data store to identify available access tokens and can facilitate or trigger a status-change of an access token to reflect an assignment (e.g., upon having received all required information.

Whether a result of a direct assignment detection or a status update from an intermediate system, a database engine of catalog system 342 can manage one or more data stores so as to indicate a current status of each of a set of access tokens for a resource. The one or more data stores may further identify any assignment constraints. For example, particular access tokens may be earmarked so as to only allow one or more particular intermediate systems to trigger a change to the access tokens' status and/or to assign the access tokens.

The database engine can include a digital asset management (DAM) engine to receive, transform (e.g., annotate, reformat, introduce a schema, etc.) status-update communications, and identify other data (e.g., an identifier of an assigning system and/or a time at which a communication was received) to associate with a status update (e.g., an assignment). Therefore, the DAM engine can be configured to prepare storage-update tasks so as to cause a maintained data store to reflect a recent data change.

Further, the DAM engine can facilitate handling of data-store queries. For example, a status-request communication or authorization-request communication can be processed to identify variables and/or indices to use to query a data store. A query can then be generated and/or directed to a data store based on the processing. The DAM engine can relay (e.g., and, potentially, perform intermediate processing to) a query result to a request-associate system.

The database engine can also include a conflict engine, which can be configured to access and implement rules indicating how conflicts are to be handled. For example, catalog system 342 may receive multiple requests within a time period requesting an assignment authorization (or a hold) for a particular access token. A rule may indicate that a first request is to receive priority, that a request associated with a more highly prioritized requesting system (e.g., intermediate system) is to be prioritized, that a request associated with a relatively high (or low) quantity of access tokens identified in the request for potential assignment are to be prioritized, etc.

The database engine can further include a storage engine configured to manage data access and/or data updates (e.g., modifying existing data or adding new data). The data managed by and/or accessible to the storage engine can be included in one or more data stores. The data stores can include, for example, distributed, non-distributed, virtual, non-virtual, local and/or remote data stores. The data stores can include, for example, a relational, non-relational, object, non-object, document and/or non-document data store. Part or all of a data store can include a shadow data store, that shadows data from another data store. Part or all of a data store can include an authoritative data store that is (e.g., directly and/or immediately) updated with access token assignment changes (e.g., such that a primary or secondary access assignment system updates the data store as part of an access token assignment process, rather than sending a post-hoc status-update communication reflecting the assignment). In some instances, a data store an authoritative data store identifies a status for each of a set (e.g., or all) of access tokens for a given resource. Should there be any inconsistency between an authoritative data store and another data store (e.g., at an intermediate system), system 300 can be configured such that the authoritative data store is controlling.

System 300 can further include a replication system 343. Replication system 343 can include one or more replication processors configured to identify new or modified data, to identify one or more data stores and/or location at which to store the new or modified data and/or to coordinate replication of the data. In some instances, one or more of these identifications and/or coordination can be performed using a replication rule. For example, a replication rule may indicate that replication is to be performed in a manner biased towards storing replicated data at a data store geographically separated from another data store storing the data.

A data duplicator can be configured to read stored data and generate one or more write commands so as to store the data at a different data store. A controller can manage transmitting write commands appropriately so as to facilitate storing replicated data at identified data stores. Further, a controller can manage data stores, such as a distributed memory or distributed shared memory, to ensure that a currently active set of data stores includes a target number of replications of data.

Accordingly, server system 318 can interact with user device 310 to identify available access tokens and to collect information needed to assign an access token. Server system 318 can interact with SQL system 341 so as to retrieve data about particular resources and/or access tokens so as to configure network data (e.g., via dynamic network locations or scripts) to reflect accurate or semi-accurate information and/or statuses. SQL system 341 can use relational data stores to quickly provide such data. Meanwhile, catalog system 342 may manage one or more non-relational and/or more comprehensive data stores may be tasked with more reliably and quickly tracking access token statuses and assignments. The tracking may include receiving status updates (e.g., via a push or pull protocol) from one or more intermediate systems and/or by detecting assignment updates from non-intermediate systems, such as an integrated access assignment system and/or SQL system 341. Catalog system 342 may provide condensed status updates (e.g., reflecting a binary indication as to whether an access token is available) to SQL system 341 periodically, at triggered times and/or in response to a request from the SQL system. Replication system 343 can further ensure that data is replicated at multiple data stores, so as to improve a reliability and speed of system 300.

It will be appreciated that various parts of system 300 can be geographically separated. For example, each of user device 310, intermediate system 330, server system 318, SQL system 341, catalog system 342 and replication system 343 may be located in different geographic locations (e.g., different cities, states or countries).

Figure 4:
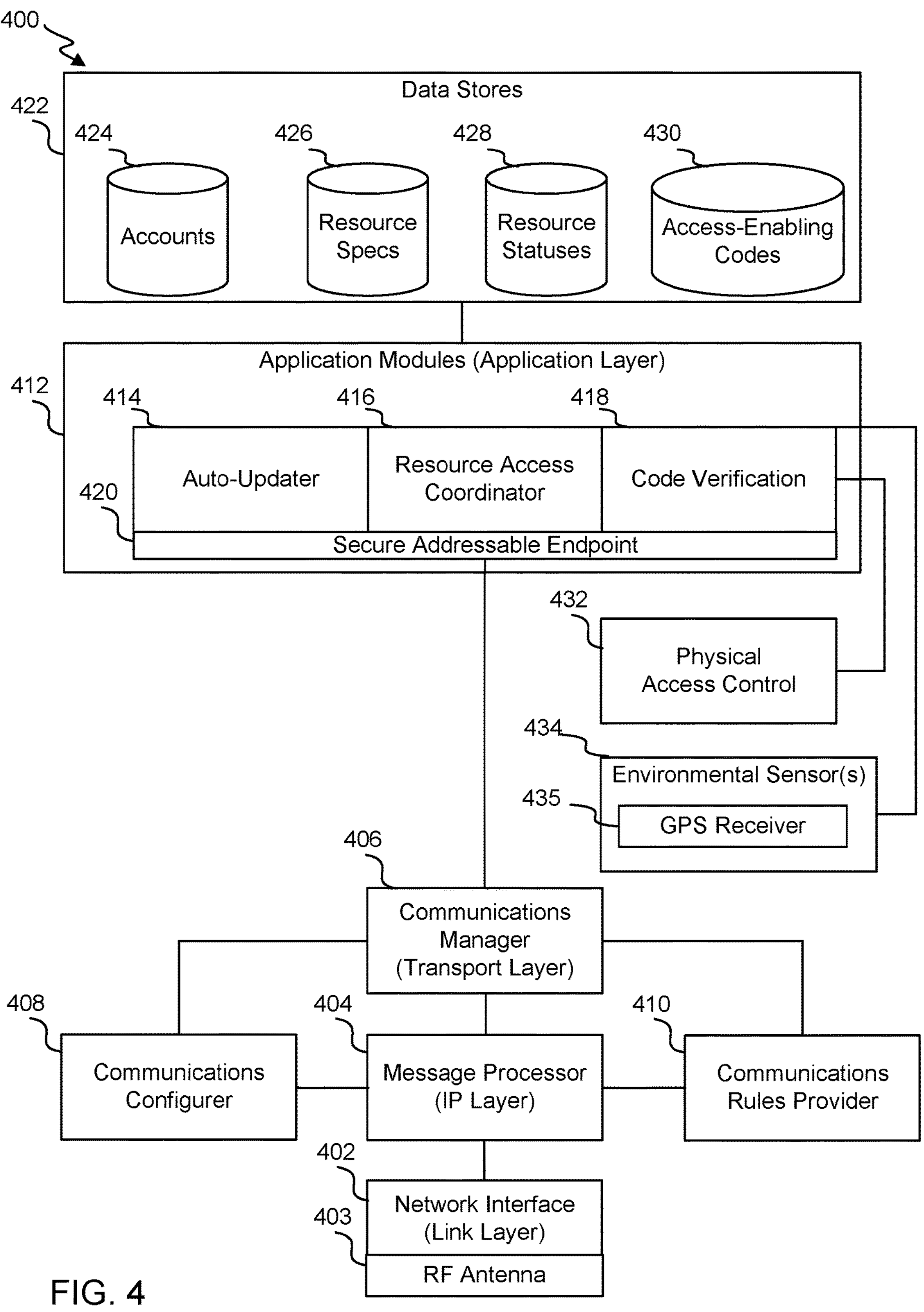
FIG. 4 illustrates example components of a device.

FIG. 4 illustrates example components of a device 400, such as a client device (e.g., client agent device 140, client register 160 and/or client point device 165), an intermediate system (e.g., intermediate system 130) and/or an access management system (e.g., access management system 185) according to an embodiment of the invention.

The components can include one or more modules that can be installed on device 400. Modules can include some or all of the following: a network interface module 402 (which can operate in a link layer of a protocol stack), a message processor module 404 (which can operate in an IP layer of a protocol stack), a communications manager module 406 (which can operate in a transport layer of a protocol stack), a communications configure module 408 (which can operate in a transport and/or IP layer in a protocol stack), a communications rules provider module 410 (which can operate in a transport and/or IP layer in a protocol stack), application modules 412 (which can operate in an application layer of a protocol stack), a physical access control module 432 and one or more environmental sensors 434.

Network interface module 402 receives and transmits messages via one or more hardware components that provide a link-layer interconnect. The hardware component(s) can include, for example, antenna 403 or a port (e.g., Ethernet port) and supporting circuitry. In some embodiments, network interface module 402 can be configured to support wireless communication, e.g., using Wi Fi (IEEE 802.11 family standards), Bluetooth® (a family of standards promulgated by Bluetooth SIG, Inc.), BLE, or near-field communication (implementing the ISO/IEC 18092 standards or the like).

Antenna 403 can be configured to convert electric signals into radio and/or magnetic signals (e.g., to radio waves) to transmit to another device and/or to receive radio and/or magnetic signals and convert them to electric signals. Antenna 403 (e.g., an RF antenna) can be tuned to operate within a particular frequency band. In some instances, a device includes multiple antennas, and the antennas can be, for example, physically separated. In some instances, antennas differ with respect to radiation patterns, polarizations, take-off angle gain and/or tuning bands. Network interface module 402 can include one or more phase shifters, filters, attenuators, amplifiers, switches and/or other components to demodulate received signals, coordinate signal transmission and/or facilitate high-quality signal transmission and receipt.

In some instances, network interface module 402 includes a virtual network interface, so as to enable the device to utilize an intermediate device for signal transmission or reception. For example, network interface module 402 can include VPN software.

Network interface module 402 and one or more antennas 403 can be configured to transmit and receive signals over one or more connection types. For example, network interface module 402 and one or more antennas 403 can be configured to transmit and receive WiFi signals, cellular signals, Bluetooth signals, Bluetooth Low Energy (BLE) signals, Zigbee signals, or Near-Field Communication (NFC) signals.

Message processor module 404 can coordinate communication with other electronic devices or systems, such as one or more servers or a user device. In one instance, message processor module 404 is able to communicate using a plurality of protocols (e.g., any known, future and/or convenient protocol such as, but not limited to, XML, SMS, MMS, and/or email, etc.). Message processor module 404 may further optionally serialize incoming and/or outgoing messages and facilitate queuing of incoming and outgoing message traffic.

Message processor module 404 can perform functions of an IP layer in a network protocol stack. For example, in some instances, message processor module 404 can format data packets or segments, combine data packet fragments, fragment data packets and/or identify destination applications and/or device addresses. For example, message processor module 404 can defragment and analyze an incoming message to determine whether it is to be forwarded to another device and, if so, can address and fragment the message before sending it to the network interface module 402 to be transmitted. As another example, message processor module 404 can defragment and analyze an incoming message to identify a destination application that is to receive the message and can then direct the message (e.g., via a transport layer) to the application.

Communications manager module 406 can implement transport-layer functions. For example, communications manager module 406 can identify a transport protocol for an outgoing message (e.g., transmission control protocol (TCP) or user diagram protocol (UDP)) and appropriately encapsulate the message into transport protocol data units. Message processor module 404 can initiate establishment of connections between devices, monitor transmissions failures, control data transmission rates and monitoring transmission quality. As another example, communications manager module 406 can read a header of an incoming message to identify an application layer protocol to receive the message's data. The data can be separated from the header and sent to the appropriate application. Message processor module 404 can also monitor the quality of incoming messages and/or detect out of order incoming packets.

In some instances, characteristics of message-receipt or message-transmission quality can be used to identify a health status of an established communications link. In some instances, communications manager module 406 can be configured to detect signals indicating the health status of an established communications link (e.g., a periodic signal from the other device system, which if received without dropouts, indicates a healthy link).

In some instances, a communication configurer module 408 is provided to track attributes of another system so as to facilitate establishment of a communication session. In one embodiment, communication configurer module 408 further ensures that inter-device communications are conducted in accordance with the identified communication attributes and/or rules. Communication configurer module 408 can maintain an updated record of the communication attributes of one or more devices or systems. In one embodiment, communications configurer module 408 ensures that communications manager module 406 can deliver the payload provided by message processor module 404 to the destination (e.g., by ensuring that the correct protocol corresponding to the client system is used).

A communications rules provider module 410 can implement one or more communication rules that relate to details of signal transmissions or receipt. For example, a rule may specify or constrain a protocol to be used, a transmission time, a type of link or connection to be used, a destination device, and/or a number of destination devices. A rule may be generally applicable or conditionally applicable (e.g., only applying for messages corresponding to a particular app, during a particular time of day, while a device is in a particular geographical region, when a usage of a local device resource exceeds a threshold, etc.). For example, a rule can identify a technique for selecting between a set of potential destination devices based on attributes of the set of potential destination devices as tracked by communication configure module 408. To illustrate, a device having a short response latency may be selected as a destination device. As another example, communications rules provider module 410 can maintain associations between various devices or systems and resources. Thus, messages corresponding to particular resources can be selectively transmitted to destinations having access to such resources.

A variety of application modules 412 can be configured to initiate message transmission, process incoming transmissions, facilitate selective granting of resource access, facilitate processing of requests for resource access, and/or performing other functions. In the instance depicted in FIG. 4, application modules 412 include an auto-updater module 414, a resource access coordinator module 416, and/or a code verification module 418.

Auto-updater module 414 automatically updates stored data and/or agent software based on recent changes to resource utilization, availability or schedules and/or updates to software or protocols. Such updates can be pushed from another device (e.g., upon detecting a change in a resource availability or access permit) or can be received in response to a request sent by device 400. For example, device 400 can transmit a signal to another device that identifies a particular resource, and a responsive signal can identify availabilities of access to the resource (e.g., available seat reservations for a regional space). As another example, device 400 can transmit a signal that includes an access access-enabling code, and a responsive signal can indicate whether the code is applicable for access of a particular resource and/or is valid.

In some instances, auto-updater module 414 is configured to enable the agent software to understand new, messages, commands, and/or protocols, based on a system configuration/change initiated on another device. Auto-updater module 414 may also install new or updated software to provide support and/or enhancements, based on a system configuration change detected on device 400. System configuration changes that would necessitate changes to the agent software can include, but are not limited to, a software/hardware upgrade, a security upgrade, a router configuration change, a change in security settings, etc. For example, if auto-updater module 414 determines that a communication link with another device has been lost for a pre-determined amount of time, auto-updater module 414 can obtain system configuration information to help re-establish the communication link. Such information may include new settings/configurations on one or more hardware devices or new or upgraded software on or connected to device 400. Thus, auto-updater module 414 can detect or be informed by other software when there is a new version of agent software with additional functionality and/or deficiency/bug corrections or when there is a change with respect to the software, hardware, communications channel, etc.), and perform updates accordingly.

Based on the newly obtained system configuration for device 400, auto-updater module 414 can cause a new communication link to be re-established with another device. In one embodiment, upon establishment of the communication link, system configuration information about device 400 can also be provided to another device to facilitate the connection to or downloading of software to device 400.

In one embodiment, when a poor health signal is detected by another device (e.g., when the health signal is only sporadically received but the communication link is not necessarily lost), the other device can send a command to auto-updater module 414 to instruct auto-updater module 414 to obtain system configuration information about device 400. The updated system configuration information may be used in an attempt to revive the unhealthy communications link (e.g., by resending a resource request). For example, code can utilize appropriate system calls for the operating system to fix or reestablish communications. By way of example and not limitation, model and driver information is optionally obtained for routers in the system in order querying them. By way of further example, if the code determines that a new brand of router has been installed, it can adapt to that change, or to the change in network configuration, or other changes.

Instead or in addition, the host server (e.g., via communications manager module 406) can send specific instructions to auto-updater module 414 to specify tests or checks to be performed on device 400 to determine the changes to the system configurations (e.g., by automatically performing or requesting an inventory check of system hardware and/or software). For example, the components involved in the chain of hops through a network can be queried and analyzed. Thus, for example, if a new ISP (Internet service provider) is being used and the management system traffic is being filtered, or a new router was installed and the software needs to change its configuration, or if someone made a change to the operating system that affects port the management system is using to communicate, the management system (or operator) can communicate with the ISP, change it back, or choose from a new available port, respectively.

The specific tests may be necessary to help establish the communication link, if, for example, the automatic tests fail to provide sufficient information for the communication link to be re-established, if additional information is needed about a particular configuration change, and/or if the client system is not initially supported by the auto-updater module 414, etc.

Auto-updater module 414 can also receive signals identifying updates pertaining to current or future availability of resources and/or access permits. Based on the signals, auto-updater module 414 can modify, add to or delete stored data pertaining to resource availabilities, resource schedules and/or valid access permits. For example, upon receiving an update signal, auto-updater module 414 can modify data stored in one or more data stores 422, such as an account data store 424, resource specification data store 426, resource status data store 428 and/or access-enabling code data store 430.

Account data store 424 can store data for entities, such as administrators, intermediate-system agents and/or users. The account data can include login information (e.g., username and password), identifying information (e.g., name, residential address, phone number, email address, age and/or gender), professional information (e.g., occupation, affiliation and/or professional position), preferences (e.g., regarding event types, performers, seating areas, and/or resource types), confirmation data. The account data can also or alternatively include technical data, such a particular entity can be associated with one or more device types, IP addresses, browser identifier and/or operating system identifier).

Resource specification data store 426 can store specification data characterizing each of one or more resources. For example, specification data for a resource can include a processing power, available memory, operating system, compatibility, device type, processor usage, power status, device model, number of processor cores, types of memories, date and time of availability, a performing entity, a location of the event and/or a set of seats (e.g., a chart or list). Specification data can further identify, for example, a cost for each of one or more access tokens.

Resource status data store 428 can store status data reflecting which resources are available (or unavailable), thereby indicating which resources have one or more open assignments. In some instances, the status data can include schedule information about when a resource is available. Status data can include information identifying an entity who requested, reserved or was assigned a resource. In some instances, status information can indicate that a resource is being held or reserved and may identify an entity associated with the hold or reserve and/or a time at which the hold or reservation will be released.

Access-enabling code data store 430 can store access-enabling code data that includes one or more codes and/or other information that can be used to indicate that an entity is authorized to use, have or receive a resource. An access-enabling code can include, for example, a numeric string, an alphanumeric string, a text string, a 1-dimensional code, a 2-dimensional code, a barcode, a quick response (QR) code, an image, a static code and/or a temporally dynamic code. An access-enabling code can be, for example, unique across all instances, resource types and/or entities. For example, access-enabling codes provided in association for access tokens to a particular event can be unique relative to each other. In some instances, at least part of a code identifies a resource or specification of a resource. For example, for a an access token to a regional space, various portions of a code may reflect: a performing entity, resource location, date, section and access-permitted location identifier.

One or more of data stores 424, 426, 428, and 430 can be a relational data store, such that elements in one data store can be referenced within another data store. For example, resource status data store 428 can associate an identifier of a particular access token (e.g., ticket) with an identifier of a particular entity. Additional information about the entity can then be retrieved by looking up the entity identifier in account data store 424.

Updates to data stores 424, 426, 428, and 430 facilitated and/or initiated by auto-updater module 414 can improve cross-device data consistency. Resource access coordinator module 416 can coordinate resource access by, for example, generating and distributing identifications of resource availabilities; processing requests for resource access; handling competing requests for resource access; and/or receiving and responding to resource-offering objectives.

Figure 5:
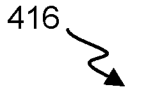
FIG. 5 illustrates example components of resource access coordinator module.

FIG. 5 illustrates example components of resource access coordinator module 416 that may operate, at least in part, at an access management system (e.g., access management system) according to an embodiment of the invention. A resource specification engine 502 can identify one or more available resources. For example, resource specification engine 502 can detect input that identifies a current or future availability of a new resource.

Resource specification engine 502 can identify one or more specifications of each of one or more resources. A specification can include an availability time period. For example, resource specification engine 502 can determine that a resource is available, for example, at a particular date and time (e.g., as identified based on input), for a time period (e.g., a start to end time), as identified in the input, and/or from a time of initial identification until another input indicating that the resource is unavailable is detected. A specification can also or alternatively include a location (e.g., a geographic location and/or venue) of the resource. A specification can also or alternatively include one or more parties associated with the resource (e.g., performing acts or teams). Resource specification engine 502 can store the specifications in association with an identifier of the resource in resource specifications data store 426.

A resource-access allocation engine 504 can allocate access tokens for individual resources. An access token can serve to provide an associated entity with the right or a priority to access a resource. For example, an allocated right can correspond to one or more access characteristics, such as an processor identifier, a usage time, a memory allocation, and/or a geographic location (e.g., section or seat identifier). For an allocated access token, resource-access allocation engine 504 can store an identifier of the right in resource status data store 428 in association with an identifier for the resource and an indication that it has not yet been assigned to a particular entity.

A communication engine 506 can facilitate communicating the availability of the resource access tokens to users. In some instances, a publisher engine 508 generates a presentation that identifies a resource and indicates that access tokens are available. Initially or in response to user interaction with the presentation, the presentation can identify access characteristics about available access tokens. The presentation can include, for example, a chart that identifies available access tokens for an event. Publisher engine 508 can distribute the presentation via, for example, a network location, app page, email and/or message. The presentation can be further configured to enable a user to request assignments of one or more access tokens.

In some instances, an intermediate system coordination engine 510 can facilitate transmission of information about resource availability (e.g., resource specifications and characteristics of resource-access tokens) to one or more intermediate systems (e.g., by generating one or more messages that include such information and/or facilitating publishing such information via a network location or app page). Each of the one or more intermediate systems can publish information about the resource and accept requests for resource access. In some instances, intermediate system coordination engine 510 identifies different access tokens as being available to individual intermediate systems to coordinate assignment. For example, access tokens for resources in Section 1 may be provided for a first intermediate system to assign, and access tokens for resources in Section 2 may be provided to a second intermediate system to assign.

In some instances, overlapping access tokens are made available to multiple intermediate systems to coordinate assignments. For example, some or all of a first set of resource rights (e.g., corresponding to a section) may be provided to first and second intermediate systems. In such instances, intermediate system coordination engine 510 can respond to a communication from a first intermediate system indicating that a request has been received (e.g., and processed) for an access token in the set) by sending a notification to one or more other intermediate systems that indicates that the access token is to be at least temporarily (or entirely) made unavailable.

Intermediate system coordination engine 510 can monitor communication channels with intermediate systems to track the health and security of the channel. For example, a healthy connection can be inferred when scheduled signals are consistently received. Further, intermediate system coordination engine 510 can track configurations of intermediate systems (e.g., via communications generated at the intermediate systems via a software agent that identifies such configurations) so as to influence code generation, communication format, and/or provisions or access tokens.

Thus, either via a presentation facilitated by publisher engine 508 (e.g., via a network location or app page) or via communication with an intermediate system, a request for assignment of an access token can be received. A request management engine 512 can process the request. Processing the request can include determining whether all other required information has been received, such as user-identifying information (e.g., name), access token identifying information (e.g., identifying a resource and/or access token characteristic) user contact information (e.g., address, phone number, and/or email address), and/or user device information (e.g., type of device, device identifier, and/or IP address).

When all required information has not been received, request management engine 512 can facilitate collection of the information (e.g., via a network location, app page or communication to an intermediate system). In some instances, request management engine 512 retrieves data from a user account. For example, publisher engine 508 may indicate that a request for an access token has been received while a user was logged into a particular account. Request management engine 512 may then retrieve, for example, contact information, device information, and/or preferences information associated with the account from account data store 424.

In some instances, request management engine 512 prioritizes requests, such as requests for overlapping, similar or same access tokens (e.g., requests for access tokens associated with a same section) received within a defined time period. The prioritization can be based on, for example, times at which requests were received (e.g., prioritizing earlier requests), a request parameter (e.g., prioritizing requests for a higher or lower number of access tokens above others), whether requests were received via an intermediate system (e.g., prioritizing such requests lower than others), intermediate systems associated with requests (e.g., based on rankings of the systems), whether requests were associated with users having established accounts, and/or whether requests were associated with inputs indicative of a bot initiating the request (e.g., shorter inter-click intervals, failed CAPTCHA tests).

Upon determining that required information has been received and request-processing conditions have been met, request management engine 512 can forward appropriate request information to a resource scheduling engine 514. For a request, resource scheduling engine 514 can query resource status data store 428 to identify access tokens matching parameters of the request.

In some instances, the request has an access token specificity matching a specificity at which access tokens are assigned. In some instances, the request is less specific, and resource scheduling engine 514 can then facilitate an identification of particular rights to assign. For example, request management engine 512 can facilitate a communication exchange by which access token characteristics matching the request are identified, and a user is allowed to select particular rights. As another example, request management engine 512 can itself select from amongst matching access tokens based on a defined criterion (e.g., best summed or averaged access token ranking, pseudo-random selection, or a selection technique identified based on user input).

Upon identifying appropriately specific access tokens, resource scheduling engine 514 can update resource status data store 428 so as to place the access token(s) on hold and/or to change a status of the access token(s) to indicate that they have been assigned. Such assignment indication may associate information about the user (e.g., user name, device information, phone number and/or email address) and/or assignment process (e.g., identifier of any intermediate system and/or assignment date and time) with an identifier of the access token(s).

For individual assigned access tokens, an encoding engine 516 can generate an access-enabling code. The access-enabling code can include, for example, an alphanumeric string, a text string, a number, a graphic, a barcode (e.g., a 1-dimensional or 2-dimensional barcode), a static code, a dynamic code (e.g., with a feature depending on a current time, current location or communication) and/or a technique for generating the code (e.g., whereby part of the code may be static and part of the code may be determined using the technique). The code may be unique across all access tokens, all access tokens for a given resource, all access tokens associated with a given location, all access tokens associated with a given time period, all resources and/or all users. In some instances, at least part of the code is determined based on or is thereafter associated with an identifier of a user, user device information, a resource specification and/or an access token characteristic.

In various embodiments, the code may be generated prior to allocating access tokens (e.g., such that each of some or all allocated access tokens are associated with an access-enabling code), prior to or while assigning one or more access token(s) responsive to a request (e.g., such that each of some or all assigned access tokens are associated with an access-enabling code), at a prescribed time, and/or when the device is at a defined location and/or in response to user input. The code may be stored at or availed to a user device. In various instances, at the user device, an access-enabling code may be provided in a manner such that it is visibly available for user inspection or concealed from a user. For example, a access token document with a barcode may be transmitted to a user device, or an app on the user device can transmit a request with a device identifier for a dynamic code.

Encoding engine 516 can store the access-enabling codes in access-enabling code data store 430. Encoding engine 516 can also or alternatively store an indication in account data store 424 that the access token(s) have been assigned to the user. It will again be appreciated that data stores 424, 426, 428, and 430 can be relational and/or linked, such that, for example, an identification of an assignment can be used to identify one or more access tokens, associated access-enabling code(s) and/or resource specifications.

Resource scheduling engine 514 can facilitate one or more transmissions of data pertaining to one or more assigned access tokens to a device of a user associated with the assignment and/or to an intermediate system facilitating the assignment and/or having transmitted a corresponding assignment request. The data can include an indication that access tokens have been assigned and/or details as to which rights have been assigned. The data can also or alternatively include access-enabling codes associated with assigned access tokens.

While FIG. 5 depicts components of resource access coordinator module 416 that may be present on an access management system 185, it will be appreciated that similar or complementary engines may be present on other systems. For example, a communication engine on a user device can be configured to display presentations identifying access token availability, and a request management engine on a user device can be configured to translate inputs into access token requests to send to an intermediate system or access management system.

Returning to FIG. 4, code verification module 418 (e.g., at a user device or client device) can analyze data to determine whether an access-enabling code is generally valid and/or valid for a particular circumstance. The access-enabling code can include one that is received at or detected by device 400. The analysis can include, for example, determining whether all or part of the access-enabling code matches one stored in access-enabling code data store 430 or part thereof, whether the access-enabling code has previously been applied, whether all or part of the access-enabling code is consistent with itself or other information (e.g., one or more particular resource specifications, a current time and/or a detected location) as determined based on a consistency analysis and/or whether all or part of the access-enabling code has an acceptable format.

For example, access-enabling code data store 430 can be organized in a manner such that access-enabling codes for a particular resource, date, resource group, client, etc. can be queried to determine whether any such access-enabling codes correspond to (e.g. match) one being evaluated, which may indicate that the code is verified. Additional information associated with the code may also or alternatively be evaluated. For example, the additional information can indicate whether the code is currently valid or expired (e.g., due to a previous use of the code).

As another example, a portion of an access-enabling code can include an identifier of a user device or user account, and code verification module 418 can determine whether the code-identified device or account matches that detected as part of the evaluation. To illustrate, device 400 can be a client device that electronically receives a communication with an access-enabling code from a user device. The communication can further include a device identifier that identifies, for example, that the user device is a particular type of smartphone. Code verification module 418 can then determine whether device-identifying information in the code is consistent with the identified type of smartphone.

As yet another example, code verification module 418 can identify a code format rule that specifies a format that valid codes are to have. To illustrate, the code format rule may identify a number of elements that are to be included in the code or a pattern that is to be present in the code. Code verification module 418 can then determine that a code is not valid if it does not conform to the format.

Verification of an access-enabling code can indicate that access to a resource is to be granted. Conversely, determining that a code is not verified can indicate that access to a resource is to be limited or prevented. In some instances, a presentation is generated (e.g., and presented) that indicates whether access is to be granted and/or a result of a verification analysis. In some instances, access granting and/or limiting is automatically affected. For example, upon a code verification, a user device and/or user may be automatically permitted to access a particular resource. Accessing a resource may include, for example, using a computational resource, possessing an item, receiving a service, entering a geographical area, and/or attending an event (e.g., generally or at a particular location).

Verification of an access-enabling code can further trigger a modification to access-enabling code data store 430. For example, a code that has been verified can be removed from the data store or associated with a new status. This modification may limit attempts to use a same code multiple times for resource access.

A combination of modules 414, 416, 418 comprise a secure addressable endpoint agent 420 that acts as an adapter and enables cross-device interfacing in a secure and reliable fashion so as to facilitate allocation of access-enabling codes and coordinate resource access. Secure addressable endpoint agent 420 can further generate a health signal that is transmitted to another device for monitoring of a status of a communication channel. The health signal is optionally a short message of a few bytes or many bytes in length that may be transmitted on a frequent basis (e.g., every few milliseconds or seconds). A communications manager module 406 on the receiving device can then monitors the health signal provided by the agent to ensure that the communication link between the host server and device 400 is still operational.

In some instances, device 400 can include (or can be in communication with) a physical access control module 432. Physical access control module 432 can include a gating component that can be configured to provide a physical barrier towards accessing a resource. For example, physical access control module 432 can include a turnstile or a packaging lock.

Physical access control module 432 can be configured such that it can switch between two modes, which differ in terms of a degree to which user access to a resource is permitted. For example, a turnstile may have a locked mode that prevents movement of an arm of the turnstile and an unlocked mode that allows the arm to be rotated. In some instances, a default mode is the mode that is more limiting in terms of access.

Physical access control module 432 can switch its mode in response to receiving particular results from code verification module 418. For example, upon receiving an indication that a code has been verified, physical access control module 432 can switch from a locked mode to an unlocked mode. It may remain in the changed state for a defined period of time or until an action or event is detected (e.g., rotation of an arm).

Device 400 can also include one or more environmental sensors 434. Measurements from the sensor can processed by one or more application modules. Environmental sensor (s) 434 can include a global positioning system (GPS) receiver 435 that can receive signals from one or more GPS satellites. A GPS chipset can use the signals to estimate a location of device 400 (e.g., a longitude and latitude of device 400). The estimated location can be used to identify a particular resource (e.g., one being offered at or near the location at a current or near-term time). The identification of the particular resource can be used, for example, to identify a corresponding (e.g., user-associated) access-enabling code or to evaluate an access-enabling code (e.g., to determine whether it corresponds to a resource associated with the location).

The estimated location can further or alternatively be used to determine when to perform a particular function. For example, at a user device, detecting that the device is in or has entered a particular geographical region (e.g., is within a threshold distance from a geofence perimeter or entrance gate) can cause the device to retrieve or request an access-enabling code, conduct a verification analysis of the code and/or transmit the code to a client device.

It will be appreciated that environmental sensor(s) 434 can include one or more additional or alternative sensors aside from GPS receiver 435. For example, a location of device 400 can be estimated based on signals received by another receive from different sources (e.g., base stations, client point devices or Wi Fi access points). As another example, an accelerometer and/or gyroscope can be provided. Data from these sensors can be used to infer when a user is attempting to present an access-enabling code for evaluation.

It will also be appreciated that the components and/or engines depicted in figures herein are illustrative, and a device need not include each depicted component and/or engine and/or can include one or more additional components and/or engines. For example, a device can also include a user interface, which may include a touch sensor, keyboard, display, camera and/or speakers. As another example, a device can include a power component, which can distribute power to components of the device. The power component can include a battery and/or a connection component for connecting to a power source. As yet another example, a module in the application layer can include an operating system. As still another example, an application-layer control processor module can provide message processing for messages received from another device. The message processing can include classifying the message and routing it to the appropriate module. To illustrate, the message can be classified as a request for resource access or for an access-enabling code, an update message or an indication that a code has been redeemed or verified. The message processing module can further convert a message or command into a format that can interoperate with a target module.

It will further be appreciated that the components, modules and/or agents could be implemented in one or more instances of software. The functionalities described herein need not be implemented in separate modules, for example, one or more functions can be implemented in one software instance and/or one software/hardware combination. Other combinations are similarly be contemplated.

Further yet, it will be appreciated that a storage medium (e.g., using magnetic storage media, flash memory, other semiconductor memory (e.g., DRAM, SRAM), or any other non-transitory storage medium, or a combination of media, and can include volatile and/or non-volatile media) can be used to store program code for each of one or more of the components, modules and/or engines depicted in FIGS. 4 and 5 and/or to store any or all data stores depicted in FIG. 4 or described with reference to FIGS. 4 and/or 5. Any device or system disclosed herein can include a processing subsystem for executing the code. The processing system can be implemented as one or more integrated circuits, e.g., one or more single-core or multi-core microprocessors or microcontrollers, examples of which are known in the art.

Figure 6:
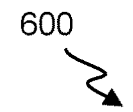
FIG. 6 illustrates a flowchart of an embodiment of a process for assigning access tokens for resources.
Figure 6:
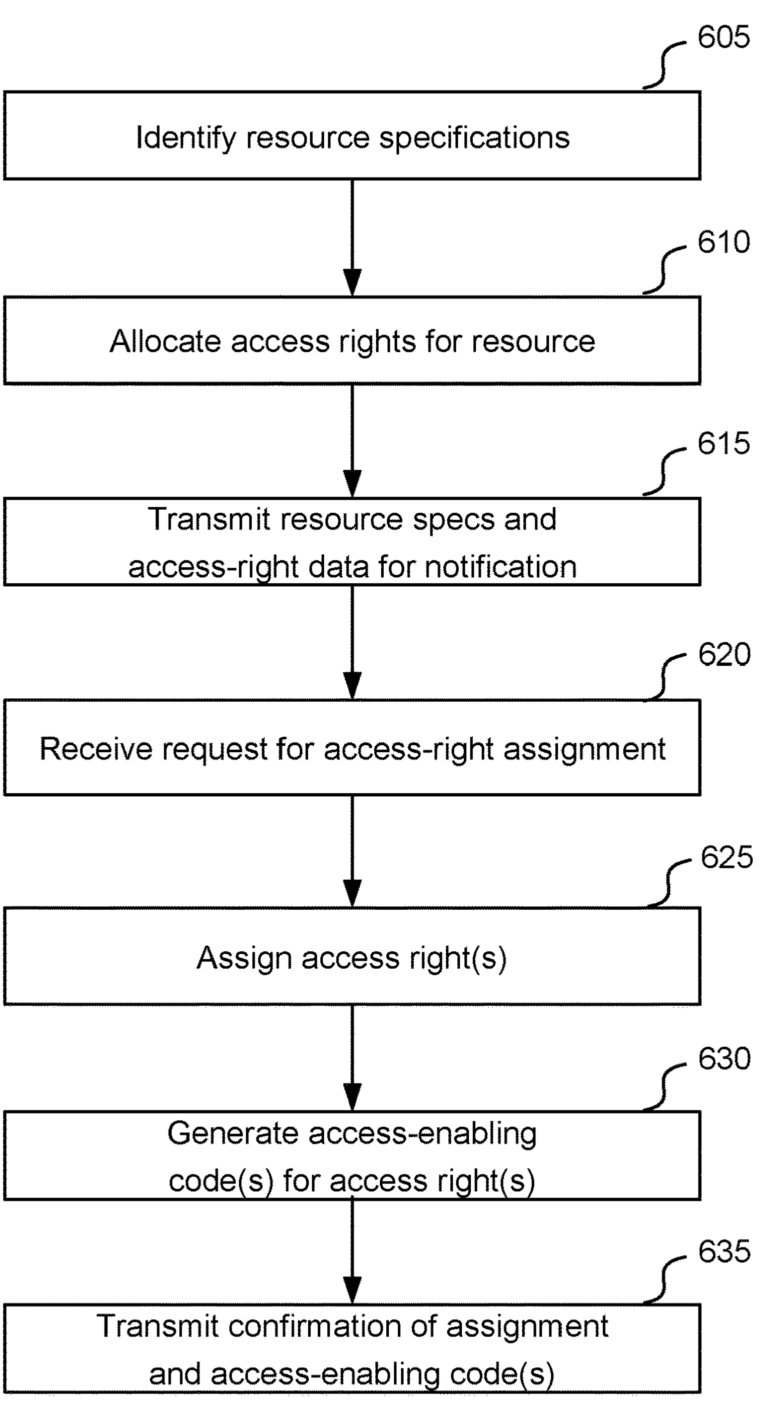

FIG. 6 illustrates a flowchart of an embodiment of a process 600 for assigning access tokens for resources. Process 600 can be performed by an access management system, such as access management system 185. Process 600 begins at block 605 where resource specification engine 502 identifies one or more specifications for a resource. The specifications can include, for example, a time at which the resource is to be available, a location of the resource, a capacity of the resources and/or one or more entities (e.g., performing entities) associated with the resource.

At block 610, resource-access allocation engine 504 allocates a set of access tokens for the resource. In some instances, each of at least some of the access tokens corresponds to a different access parameter, such as a different resource (e.g., seat) assignment. Upon allocation, each of some or all of the access tokens may have a status as available. A subset of the set of access tokens can be immediately (or at a defined time) assigned or reserved according to a base assignment or reservation rule (e.g., assigning particular access tokens to particular entities, who may be involved in or related to provision of the resource and/or who have requested or been assigned a set of related access tokens.

At block 615, communication engine 506 transmits the resource specifications and data about the access tokens. The transmission can occur in one or more transmissions. The transmission can be to, for example, one or more user devices and/or intermediate systems. In some instances, a notification including the specifications and access token data is transmitted, and in some instances, a notification can be generated at a receiving device based on the specifications and access token data. The notification can include, for example, a network location (e.g., network location) that identifies a resource (via, at least in part, its specifications) and indicates that access tokens for the resource are available for assignment. The notification can include an option to request assignment of one or more access tokens.

At block 620, request management engine 512 receives a request for one or more access tokens to be assigned to a user. The request can, for example, identify particular access tokens and/or access parameters. The request can include or be accompanied by other information, such as identifying information. In some instances, the request is received via an intermediate system that has already handled such authorization.

At block 625, resource scheduling engine 514 assigns the requested one or more access tokens to the user. The assignment can be conditioned on receipt of all required information, confirmation that the access token(s) have remained available for assignment, determining using data corresponding to the request that a bot-detection condition is not satisfied and/or other defined conditions. Assignment of the access token(s) can include associating an identifier of each of the one or more rights with an identifier of a user and/or assignment and/or changing a status of the access token(s) to assigned. Assignment of the access token(s) can result in impeding or preventing other users from requesting the access token(s), being assigned the access token(s) and/or being notified that the access token(s) are available for assignment. Assignment of the access token(s) can, in some instances, trigger transmission of one or more communications to, for example, one or more intermediate systems identifying the access token(s) and indicating that they have been assigned and/or with an instruction to cease offering the access tokens.

At block 630, encoding engine 516 generates an access-enabling code for each of the one or more access tokens. The code can be generated, for example, as part of the assignment, as part of the allocation or subsequent to the assignment (e.g., upon detecting that a user is requesting access to the resource). Generating an access-enabling code can include applying a code-generation technique, such on one that generates a code based on a characteristic of a user, user device, current time, access token, resource, intermediate system or other variable. The access-enabling code can include a static code that will not change after it has been initially generated or a dynamic code that changes in time (e.g., such that block 630 can be repeated at various time points).

At block 635, communication engine 506 transmits a confirmation of the assignment and the access-enabling code(s) in one or more transmissions. The transmission(s) may be sent to one or more devices, such as a user device having initiated the request from block 620, a remote server or an intermediate system having relayed the request from block 620.

Figure 7A:
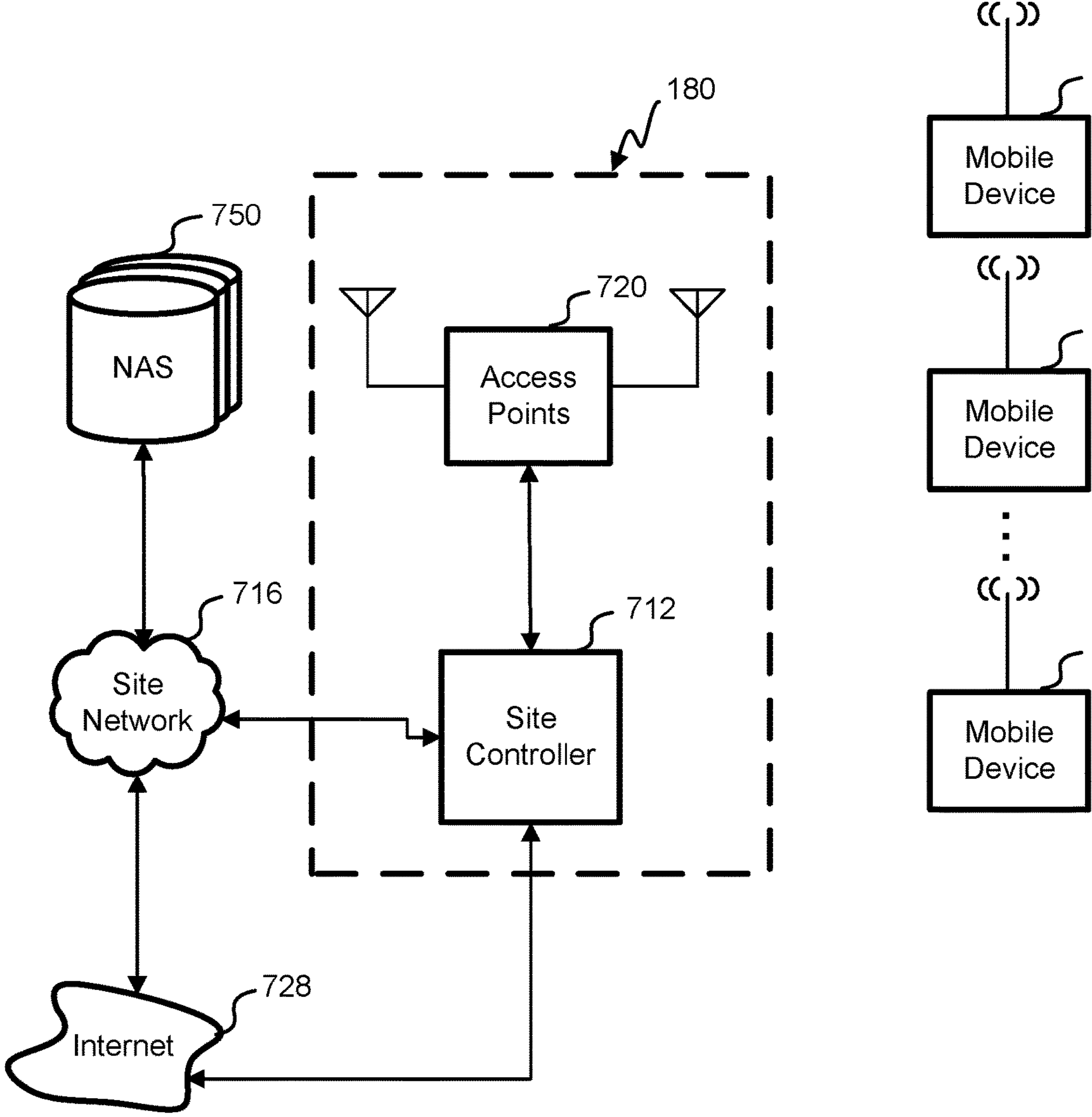
FIGS. 7A and 7B show embodiments of site systems in relations to mobile devices.

Referring to FIG. 7A, an embodiment of a site system 180 is shown in relation to mobile devices 724-*n*, Network Attached Storage (NAS) 750, site network 716 and the Internet 728. In some embodiments, for attendees of a regional space, site network 716 and site system 180 provide content, services and/or interactive engagement using mobile devices 724. Connections to site system 180 and site network 716 can be established by mobile devices 724 connecting to access points 720. Mobile devices 724 can be a type of mobile device 110 that is portable, e.g., smartphones, mobile phones, tablets, and/or other similar devices.

Site network 716 can have access to content (information about attendees, videos, pictures, music, trivia information, etc.) held by NAS 750. Additionally, as described herein, content can be gathered from attendees both before and during the event. By connecting to site network 716, mobile device 724 can send content for use by site system 180 or display content received from NAS 750.

Figure 7B:
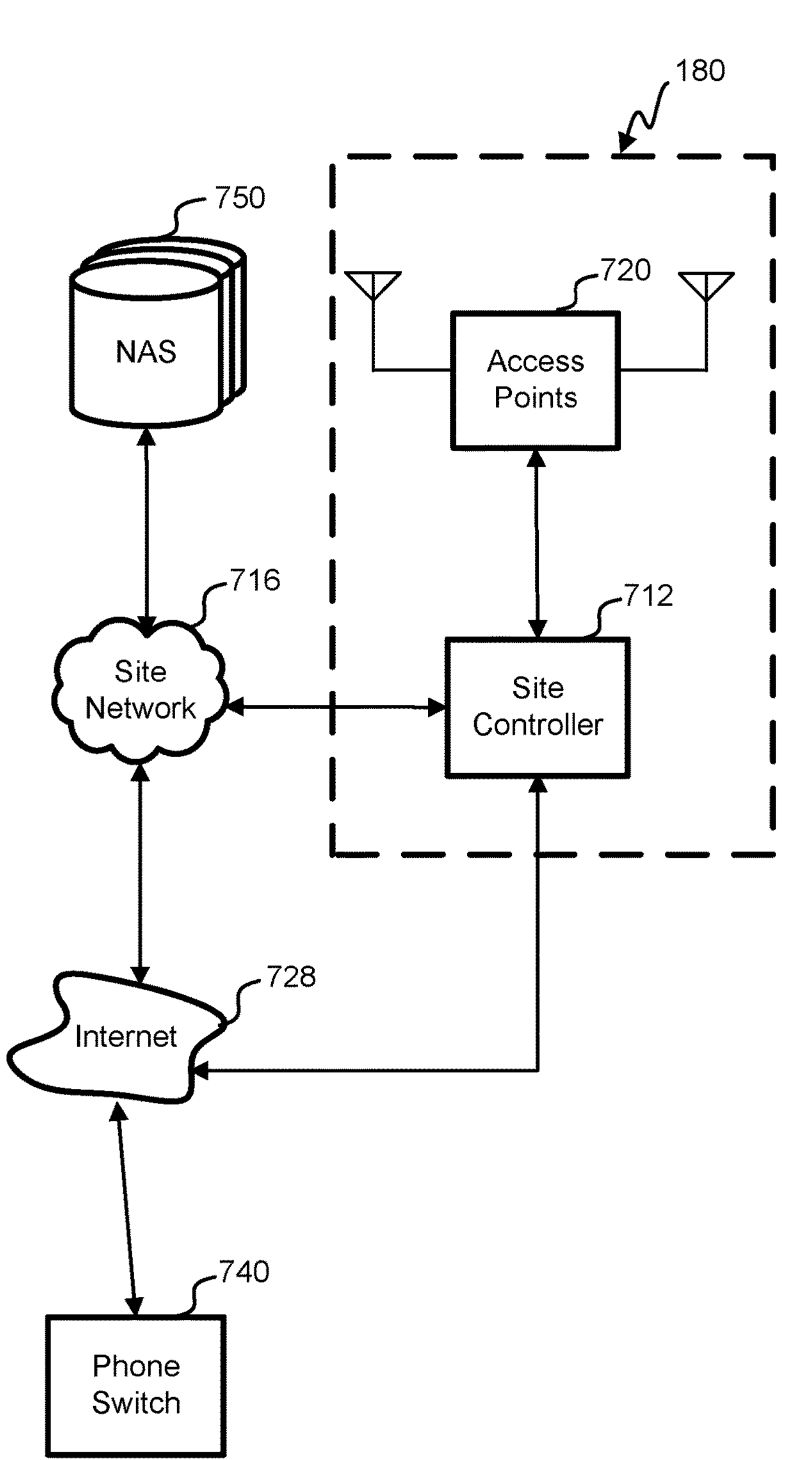
Figure 7B:
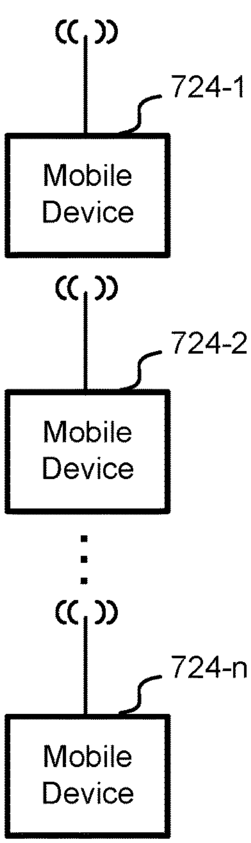

Referring to FIG. 7B, another embodiment of a site system 180 is shown in relation to mobile devices 724-*n*, NAS 750, site network 716 and the Internet 728, in an embodiment. FIG. 7B additionally includes phone switch 740. In some embodiments, phone switch 740 can be a private cellular base station configured to spoof the operation of conventionally operated base stations. Using phone switch 740 at an event site allows site system 180 to provide additional types of interactions with mobile devices 724. For example, without any setup or configuration to accept communications from site controller 712, phone switch 740 can cause connected mobile devices 724 to ring and, when answered, have an audio or video call be established. When used with other embodiments described herein, phone switch 740 can provide additional interactions. For example, some embodiments described herein use different capabilities of mobile devices 724 to cause mass sounds and/or establish communications with two or more people. By causing phones to ring and by establishing cellular calls, phone switch can provide additional capabilities to these approaches.

Figure 8:
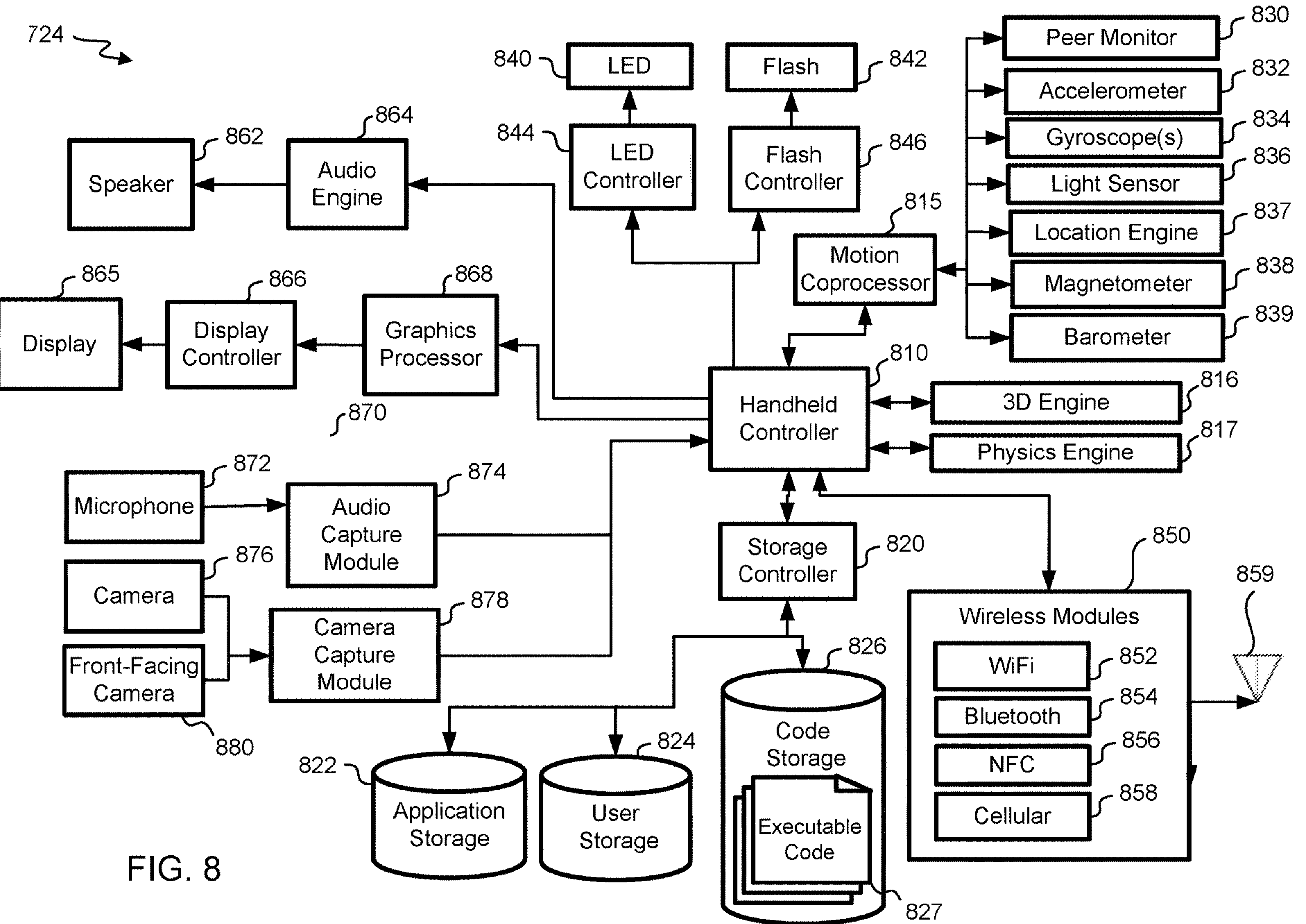
FIG. 8 shows a block diagram of user device according to an embodiment.

FIG. 8 shows a block diagram of mobile device 110 according to an embodiment. Mobile device 110 includes a handheld controller 810 that can be sized and shaped so as enable the controller and mobile device 110 in a hand. Handheld controller 810 can include one or more user-device processors that can be configured to perform actions as described herein. In some instances, such actions can include retrieving and implementing a rule, retrieving an access-enabling code, generating a communication (e.g., including an access-enabling code) to be transmitted to another device (e.g., a nearby client-associated device, a remote device, a central server, a server, etc.), processing a received communication (e.g., to perform an action in accordance with an instruction in the communication, to generate a presentation based on data in the communication, or to generate a response communication that includes data requested in the received communication) and so on.

Handheld controller 810 can communicate with a storage controller 820 so as to facilitate local storage and/or retrieval of data. It will be appreciated that handheld controller 810 can further facilitate storage and/or retrieval of data at a remote source via generation of communications including the data (e.g., with a storage instruction) and/or requesting particular data.

Storage controller 820 can be configured to write and/or read data from one or more data stores, such as an application storage 822 and/or a user storage 824. The one or more data stores can include, for example, a random access memory (RAM), dynamic random access memory (DRAM), read-only memory (ROM), flash-ROM, cache, storage chip, and/or removable memory. Application storage 822 can include various types of application data for each of one or more applications loaded (e.g., downloaded or pre-installed) onto mobile device 110. For example, application data can include application code, settings, profile data, databases, session data, history, cookies and/or cache data. User storage 824 can include, for example, files, documents, images, videos, voice recordings and/or audio. It will be appreciated that mobile device 110 can also include other types of storage and/or stored data, such as code, files and data for an operating system configured for execution on mobile device 110.

Handheld controller 810 can also receive and process (e.g., in accordance with code or instructions generated in correspondence to a particular application) data from one or more sensors and/or detection engines. The one or more sensors and/or detection engines can be configured to, for example, detect a presence, intensity and/or identify of (for example) another device (e.g., a nearby device or device detectable over a particular type of network, such as a Bluetooth, Bluetooth Low-Energy or Near-Field Communication network); an environmental, external stimulus (e.g., temperature, water, light, motion or humidity); an internal stimulus (e.g., temperature); a device performance (e.g., processor or memory usage); and/or a network connection (e.g., to indicate whether a particular type of connection is available, a network strength and/or a network reliability).

FIG. 8 shows several exemplary sensors and detection engines, including a peer monitor 830, accelerometer 832, gyroscope 834, light sensor 836 and location engine 838. Each sensor and/or detection engine can be configured to collect a measurement or make a determination, for example, at routine intervals or times and/or upon receiving a corresponding request (e.g., from a processor executing an application code).

Peer monitor 830 can monitor communications, networks, radio signals, short-range signals, etc., which can be received by a receiver of mobile device 110) Peer monitor 830 can, for example, detect a short-range communication from another device and/or use a network multicast or broadcast to request identification of nearby devices. Upon or while detecting another device, peer monitor 830 can determine an identifier, device type, associated user, network capabilities, operating system and/or authorization associated with the device. Peer monitor 530 can maintain and update a data structure to store a location, identifier and/or characteristic of each of one or more nearby user devices.

Accelerometer 832 can be configured to detect a proper acceleration of mobile device 110. The acceleration may include multiple components associated with various axes and/or a total acceleration. Gyroscope 834 can be configured to detect one or more orientations (e.g., via detection of angular velocity) of mobile device 110. Gyroscope 834 can include, for example, one or more spinning wheels or discs, single- or multi-axis (e.g., three-axis) MEMS-based gyroscopes.

Light sensor 836 can include, for example, a photosensor, such as photodiode, active-pixel sensor, LED, photoresistor, or other component configured to detect a presence, intensity and/or type of light. In some instances, the one or more sensors and detection engines can include a motion detector, which can be configured to detect motion. Such motion detection can include processing data from one or more light sensors (e.g., and performing a temporal and/or differential analysis).

Location engine 838 can be configured to detect (e.g., estimate) a location of mobile device 110. For example, location engine 838 can be configured to process signals (e.g., a wireless signal, GPS satellite signal, cell-tower signal, iBeacon, or base-station signal) received at one or more receivers (e.g., a wireless-signal receiver and/or GPS receiver) from a source (e.g., a GPS satellite, cellular tower or base station, or WiFi access point) at a defined or identifiable location. In some instances, location engine 838 can process signals from multiple sources and can estimate a location of mobile device 110 using a triangulation technique. In some instances, location engine 838 can process a single signal and estimate its location as being the same as a location of a source of the signal.

Mobile device 110 can include a flash 842 and flash controller 846. Flash 842 can include a light source, such as (for example), an LED, electronic flash or high-speed flash. Flash controller 846 can be configured to control when flash 842 emits light. In some instances, the determination includes identifying an ambient light level (e.g., via data received from light sensor 836) and determining that flash 842 is to emit light in response to a picture- or movie-initiating input when the light level is below a defined threshold (e.g., when a setting is in an auto-flash mode). In some additional or alternative instances, the determination includes determining that flash controller 846 is, or is not, to emit light in accordance with a flash on/off setting. When it is determined that flash controller 846 is to emit light, flash controller 846 can be configured to control a timing of the light so as to coincide, for example, with a time (or right before) at which a picture or video is taken.

Mobile device 110 can also include an LED 840 and LED controller 844. LED controller 844 can be configured to control when LED 840 emits light. The light emission may be indicative of an event, such as whether a message has been received, a request has been processed, an initial access time has passed, etc.

Flash controller 846 can control whether flash controller 846 emits light via controlling a circuit so as to complete a circuit between a power source and flash controller 846 when flash 842 is to emit light. In some instances, flash controller 846 is wired to a shutter mechanism so as to synchronize light emission and collection of image or video data.

Mobile device 110 can be configured to transmit and/or receive signals from other devices or systems (e.g., over one or more networks, such as network(s) 155). These signals can include wireless signals, and accordingly mobile device 110 can include one or more wireless modules 850 configured to appropriately facilitate transmission or receipt of wireless signals of a particular type. Wireless modules 850 can include a Wi-Fi module 852, Bluetooth module 854, near-field communication (NFC) module 856 and/or cellular module 858. Each module can, for example, generate a signal (e.g., which may include transforming a signal generated by another component of mobile device 110 to conform to a particular protocol and/or to process a signal (e.g., which may include transforming a signal received from another device to conform with a protocol used by another component of mobile device 110).

Wi-Fi module 852 can be configured to generate and/or process radio signals with a frequency between 2.4 gigahertz and 5 gigahertz. Wi-Fi module 852 can include a wireless network interface card that includes circuitry to facilitate communicating using a particular standard (e.g., physical and/or link layer standard).

Bluetooth module 854 can be configured to generate and/or process radio signals with a frequency between 2.4 gigahertz and 2.485 gigahertz. In some instances, Bluetooth module 854 can be configured to generate and/or process Bluetooth low-energy (BLE or BTLE) signals with a frequency between 2.4 gigahertz and 2.485 gigahertz.

NFC module 856 can be configured to generate and/or process radio signals with a frequency of 13.56 megahertz. NFC module 856 can include an inductor and/or can interact with one or more loop antenna.

Cellular module 858 can be configured to generate and/or process cellular signals at ultra-high frequencies (e.g., between 698 and 2690 megahertz). For example, cellular module 858 can be configured to generate uplink signals and/or to process received downlink signals.

The signals generated by wireless modules 850 can be transmitted to one or more other devices (or broadcast) by one or more antennas 859. The signals processed by wireless modules 850 can include those received by one or more antennas 859. One or more antennas 859 can include, for example, a monopole antenna, helical antenna, intenna, Planar Inverted-F Antenna (PIFA), modified PIFA, and/or one or more loop antennae.

User device 110 (e.g., mobile device 110) can include various input and output components. An output component can be configured to present output. For example, a speaker 862 can be configured to present an audio output by converting an electrical signal into an audio signal. An audio engine 864 can effect particular audio characteristics, such as a volume, event-to-audio-signal mapping and/or whether an audio signal is to be avoided due to a silencing mode (e.g., a vibrate or do-not-disturb mode set at the device).

Further, a display 866 can be configured to present a visual output by converting an electrical signal into a light signal. Display 866 may include multiple pixels, each of which may be individually controllable, such that an intensity and/or color of each pixel can be independently controlled. Display 866 can include, for example, an LED- or LCD-based display.

A graphics engine 868 can determine a mapping of electronic image data to pixel variables on a screen of user device 110. It can further adjust lighting, texture and color characteristics in accordance with, for example, user settings.

In some instances, display 866 is a touchscreen display (e.g., a resistive or capacitive touchscreen) and is thus both an input and an output component. A screen controller 870 can be configured to detect whether, where and/or how (e.g., a force of) a user touched display 866. The determination may be made based on an analysis of capacitive or resistive data.

An input component can be configured to receive input from a user that can be translated into data. For example, as illustrated in FIG. 8, user device 110 can include a microphone 872 that can capture audio data and transform the audio signals into electrical signals. An audio capture module 874 can determine, for example, when an audio signal is to be collected and/or any filter, equalization, noise gate, compression and/or clipper that is to be applied to the signal.

User device 110 can further include one or more cameras 876, 880, each of which can be configured to capture visual data (e.g., at a given time or across an extended time period) and convert the visual data into electrical data (e.g., electronic image or video data). In some instances, user device 110 includes multiple cameras, at least two of which are directed in different and/or substantially opposite directions. For example, user device 110 can include a rear-facing camera 876 and a front-facing camera 880.

A camera capture module 878 can control, for example, when a visual stimulus is to be collected (e.g., by controlling a shutter), a duration for which a visual stimulus is to be collected (e.g., a time that a shutter is to remain open for a picture taking, which may depend on a setting or ambient light levels; and/or a time that a shutter is to remain open for a video taking, which may depend on inputs), a zoom, a focus setting, and so on. When user device 110 includes multiple cameras, camera capture module 878 may further determine which camera(s) is to collect image data (e.g., based on a setting).

Figure 9:
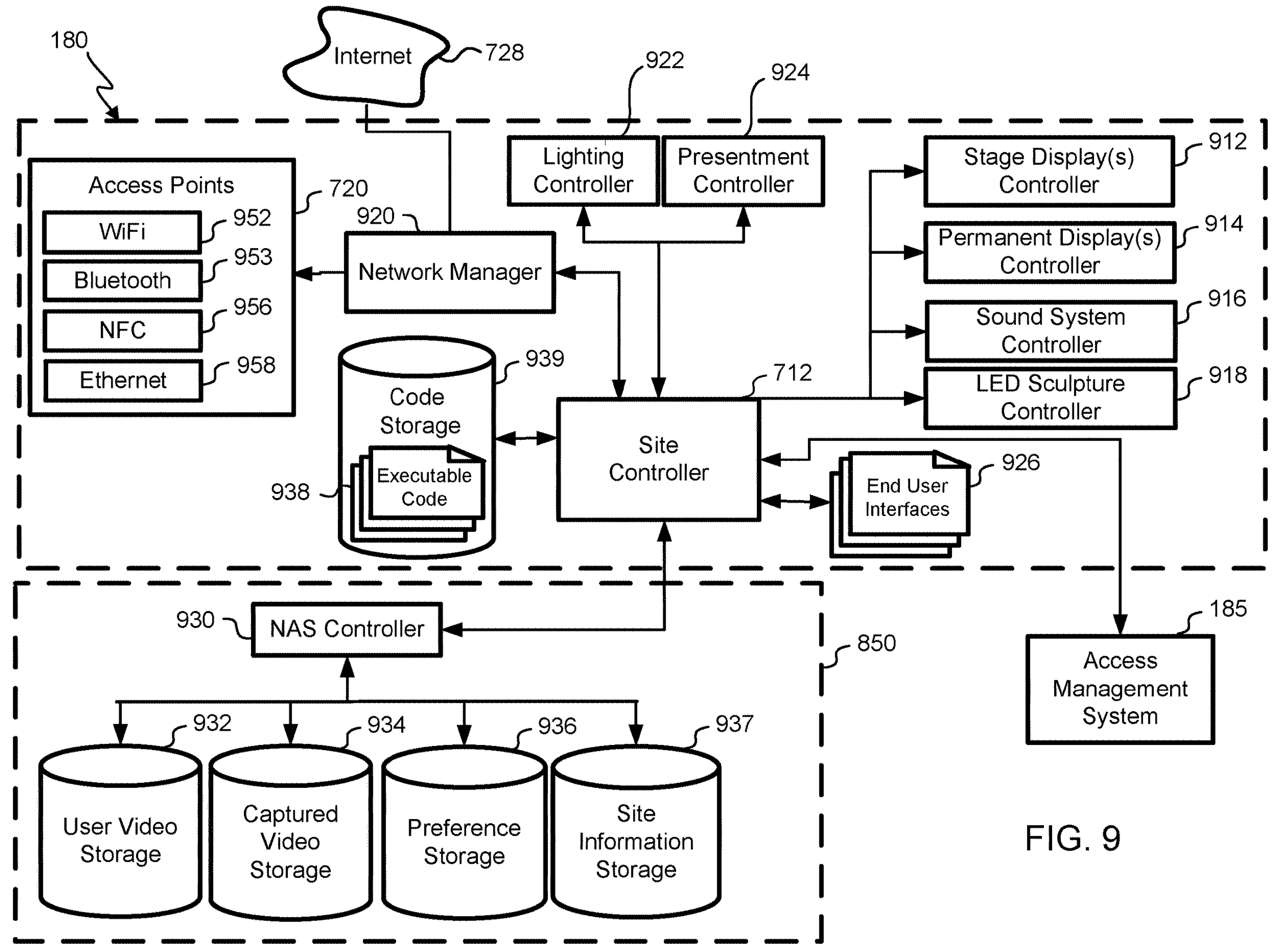
FIG. 9 illustrates sample components of an embodiment of site system 180, including connections to a NAS and access management system.

FIG. 9 illustrates sample components of an embodiment of site system 180, including connections to NAS 750 and access management system 185. Embodiments of site controller 712 use network manager 920 to connect via access points 720 (using e.g., WiFi 952, Bluetooth 953, NFC 956, Ethernet 958, and/or other network connections) to other network components, such as site network 716 and mobile devices 724. In some embodiments, site system 280 uses site controller 712 to control aspects of an event location. A broad variety of location features can be controlled by different embodiments, including: permanent lights (e.g., with lighting controller 922), stage lights (e.g., with presentment controller 924), stage display screens (e.g., with stage display(s) controller 912), permanent display screens (e.g., with permanent display(s) controller 914), and the location sound system (e.g., with the sound system controller 916).

A more detailed view of NAS 750 is shown, including NAS controller 930 coupled to user video storage 932, captured video storage 934, preference storage 936, and 3D model 938. Captured video storage 934 can receive, store and provide user videos received from mobile devices 724. In some embodiments, site controller 712 triggers the automatic capture of images, audio and video from mobile devices 724, such triggering being synchronized to activities in an event. Images captured by this and similar embodiments can be stored on both the capturing mobile device 724 and user video storage 932. In an embodiment, site controller 712 can coordinate the transfer of information from mobile devices to NAS 750 (e.g., captured media) with activities taking place during the event. When interacting with mobile devices 724, some embodiments of site controller 712 can provide end user interfaces 926 to enable different types of interaction. For example, as a part of engagement activities, site controller may offer quizzes and other content to the devices. Additionally, with respect to location determinations discussed herein, site controller can supplement determined estimates with voluntarily provided information using end user interfaces 926, stored in a storage that is not shown.

In some embodiments, to guide the performance of different activities, site controller 712 and/or other components may use executable code tangibly stored in code storage 939. In some embodiments, site information storage 937 can provide information about the site, e.g., events, resource maps, attendee information, geographic location of destinations (e.g., concessions, bathrooms, exits, etc.), as well as 3D models of site features and structure.

Figure 10A:
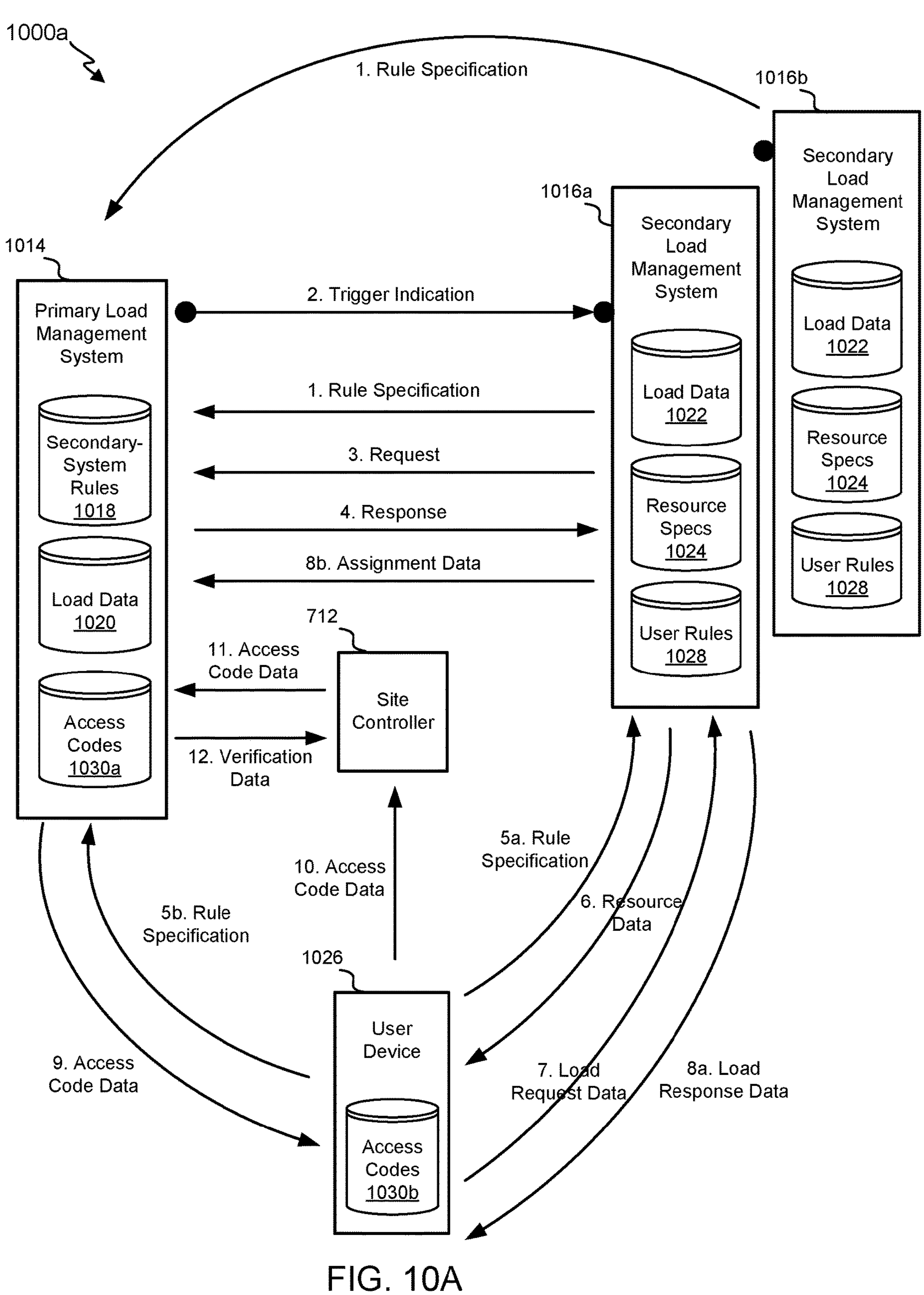
FIGS. 10A and 10B illustrate examples of communication exchanges involving primary and secondary load management systems.

Referring next to FIG. 10A, an example of a communication exchange 1000*a* involving primary load management system 1014 and each of a plurality of secondary load management systems 1016*a*, 1016*b* is shown. In some instances, secondary load management system 1016*a* is managed by an entity different than an entity that manages secondary load management system 1016*b*. Primary load management system 1014 may include and/or share properties with a primary assignment management system 214. Each of one or both of secondary load management system 1016*a* and 1016*b* may include or correspond to a secondary access assignment system 216. Communications shown in FIG. 10A or 10B may be transmitted over one or more networks, such as network 270, the Internet and/or a short-range network.

In one instance, one of secondary load management system 1016*a* or 1016*b* is managed by a same entity as manages primary load management system 1014. In one instance, each of secondary load management system 1016 and 1016*b* is managed by an entity different than an entity managing primary load management system 1014. Primary load management system 1014 can include a system that, for example, manages a master access token assignment data store, distributes access codes, performs verification data for access attempts, and so on. Secondary load management systems 1016*a*, 1016*b* can include systems that, for example, facilitate assignment of access codes to users. For example, secondary load management systems 1016*a*, 1016*b* can be configured to request allocation of access token slots, which may result in a temporary or final allocation or assignment to the system, a hold on the access token slots, and/or a distribution of data pertaining to the slot(s). Secondary load management systems 1016*a*, 1016*b* may then facilitate transmission of the access token slots to one or more users and identify a user that has requested one or more particular access token slots. The secondary load management system can then facilitate an assignment of the access token slots by (for example) transmitting one or more access codes to the user device, identifying the user to primary load management system 1014 or updating assignment data.

Communication exchange 1000*a* begins with transmission of one or more rule specifications from each secondary load management system 1016*a*, 1016*b* to primary load management system 1014. The rule specification can include one or more request parameters identify parameters of a load requested for allocation. For example, a rule specification can include a specification pertaining to a size of a desired load (e.g., corresponding to a number of access token slots, such as resources). The specification may include a particular number or a threshold. A rule specification can include a specification of a type of at least part of the load, such as one that identifies a resource or type of resource and/or one that identifies a characteristic of one or more access token slots (e.g., a location). The specification may include a first allocation parameter that may identify a value for which access token slots are being requested.

In some instances, a rule and/or request corresponds to a single resource, while in others, the rule and/or request corresponds to multiple resources. For example, a request may be for access token results pertaining to each of three resources or to each resource available at a location in a season. Thus, in some instances, a rule specification identifies or is indicative of a number of resources. Resources may, but need not, be specifically identified in a rule specification, rule and/or request. For example, a rule specification may indicate that a defined number or range (e.g., 100-200) of access token slots is requested for any given resource within a defined time period (e.g., year).

A rule specification can include an allocation parameter that identifies a parameter for allocating a load should it be allocated to the secondary load management system. To illustrate, secondary load management system 1016*a*, 1016*b* may be configured to receive allocations of access token slots but to attempt to facilitate assignment of the access token slots to users. Communication exchange 1000*a* can be configured so as to promote facilitated distribution to users upon allocation of access token slots to a secondary load management system. Early provision of allocation parameters by a secondary load management system can promote such quick facilitated distribution.

For example, an allocation parameter can identify one or more communication channels (e.g., network locations, portals, information-distribution protocols, email addresses, etc.) for transmitting information pertaining to at least part of the load to each of one or more devices and/or a second allocation parameter. This information may enable primary load management system 1014 to (for example) automatically provide information pertaining to allocated access token slots via the communication channel(s) and/or to verify that allocation parameters comply with one or more primary-system rules (e.g., that may include an upper and/or lower threshold for an allocation parameter and/or limits on which communication channels may be used).

Primary load management system 1014 can define a rule for each secondary load management system 1016*a*, 1016*b* based on the rule specifications. The rules can be stored in a secondary system rules data store 1018.

Primary load management system 1014 can further include a load data store 1020. Load data store 1020 can include, for example, information pertaining to which access token slots for a given resource are available and information pertaining to each of those slots. Load data store 1020 can further identify information pertaining to one or more defined loads, such as which access token slots are corresponding to the load, to which secondary load management system a load has been allocated, whether an allocation includes any restrictions (e.g., time limits).

Primary load management system 1014 can assess whether a set of available access token slots corresponds to request parameters identified in any secondary-system rules. For example, it can be determined whether a resource type corresponds to that specified in a request parameter, whether a quantity (and/or contiguous quantity) corresponds to that specified in a request parameter, whether a type of the access token slots corresponds to that specified in a request parameter, and/or whether the quantity of access token slots can be allocated for a value that corresponds to a first allocation parameter specified in a request parameter (e.g., the determination being based on defined values or thresholds associated with the access token slots and/or a primary-system rule).

In some instances, it may be determined that request parameters identified in rules for multiple secondary load management system correspond to a same load or to a same at least part of a load. Primary load management system 1014 may include a switch, such as a content switch, that may evaluate a load, rules and/or systems to determine to which secondary load management system 1016 a load is to be allocated or identified. In these instances, the rules and/or systems may be prioritized to determine to which entity the load is to be allocated. The prioritization may depend on, for example, defined prioritizations of the systems, a time at which rule specifications were submitted (e.g., prioritizing early submission), a size parameter (e.g., prioritizing either lower or larger size requests), and/or first allocation parameters (e.g., prioritizing larger first allocation parameters).

It will be appreciated that, in various instances, a load may be generated in response to evaluation of a load (e.g., in an attempt to define a load that accords with request parameters), or a load may be first defined (e.g., based on which access token slots remain available and/or distribution priorities of the primary load management system) and it is then determined which rule to which the load corresponds. In some instances, a primary-system rule as to which access token slots are to be included in a load and/or a secondary-system rule as to which access token slots are requested may depend on information, such as an environmental characterization (e.g., weather forecast) corresponding to a resource, a throughput monitor (e.g., identifying a probability of a performing entity in being positioned in a playoff or other game) and/or a discrepancy associated with a resource (e.g., a spread or line associated with a resource). In some instances, a primary-system rule and/or secondary-system rule may include a function that relates an environmental characteristic, throughput characteristic and/or discrepancy with an allocation parameter (e.g., such that larger discrepancies, poorer environmental characteristics and/or lower throughput prospects result in lower allocation parameters).

When it is determined that a load corresponds to a secondary-system rule (and/or any prioritization is performed), primary load management system can transmit a trigger indication to the associated secondary load management system 1016*a*. The trigger indication may identify characteristics of the load (e.g., a size, type of one or more access token slots, resource, and/or allocation value). In some instances, the trigger indication may identify a rule and/or what specifications were defined in the triggered rule.

In some instances, communication exchange 1000*a* is configured so as to provide a secondary load management system 1016*a* a defined time period for transmitting a request responsive to a trigger indication. Access-right slots may, but need not, be placed on hold for the time period. Should a request not be received within the time period, primary load management system 1014 may transmit a same or different trigger indication to another secondary load management system with a rule corresponding to the load or may redefine a load so as to correspond with a rule of another secondary load management system and transmit a trigger indication accordingly. In some instances, a trigger indication is simultaneously transmitted to multiple secondary load management systems 1016, and a load may be allocated to a system that thereafter requests the load (e.g., in accordance with a first-responder or other secondary-system selection technique).

Secondary load management system 1016*a* can then transmit a request communication back to primary load management system that requests the load. Primary load management system 1014 can then transmit a response communication that confirms that the load is being allocated. In some instances, the response communication is transmitted subsequent to or in temporal proximity of a time at which a charge is issued or collected for the load. In some instances, then response communication includes further information about the load. For example, location of access token slots in the load may be more precisely identified.

Secondary load management system 1016*a* can store data pertaining to the load in a load data store 1022. Load data store 1022 may further track statuses of access token slots so as to be able to identify which access token slots have been assigned to users. Secondary load management system 1016*a* can further manage and/or have access to a resource specification data store 1024 that can associate identifiers of various resources with corresponding information. The resource specifications may be, for example, included in a trigger-information or response communication from primary load management system 1014; identified via an external search (e.g., network crawl), and so on. Resource specifications may include, for example, a location, one or more performing entities and/or a date and time.

A user device 1026 can also transmit rule specifications to one or more of primary load management system 1014 and secondary load management system 1016*a*. The rule specifications may include request parameters, such as a size specification, type specification and/or assignment value (e.g., that may be precisely identified or a threshold). When rule specifications are transmitted and/or availed to secondary load management system 1016*a*, a corresponding user rule can be defined for the user device and/or user.

Secondary load management system 1016*a* can distribute data of a resource (or multiple resources) corresponding to the load allocated to the system. The resource data can include one or more resource specifications stored at resource specification data store 1024. The resource data may further include data associated with one or more access token slots included in the load. For example, the resource data may identify a time and location of a resource and a location of each of one or more access token slots. In some instances, the resource data further includes an allocation parameter, such as the second allocation parameter and/or one defined based thereupon included in a secondary-system rule specification or included in a rule associated with secondary load management system 1016*a*.

In some instances, secondary load management system 1016*a* controls the transmission of the resource data to one or more user devices 1026. In some instances, primary load management system 1014 facilitates the transmission. For example, the data may be identified in a network location hosted, controlled and/or managed by secondary load management system 1016*a*, but primary load management system 1014 may have authorization to update the network location, and thus primary load management system can update the secondary-system to include the resource data.

In some instances, resource data is selectively transmitted to user devices. For example, resource data may be transmitted only to the user devices associated with user rules corresponding with at least part of the load.

User device 1026 can request assignment of at least part of the load. The user request can identify, for example, one or more access token slots (e.g., and/or one or more resources). Secondary load management system 1016*a* can evaluate the request and respond with load response data. The load response data may (for example) indicate that the assignment has been accepted and/or include confirmation data. Upon such acceptance, secondary load management system 1016*a* can also transmit assignment data to primary load management system. The load data can include an identification of the user device (or corresponding information, such as a name, email, account, device identifier or phone number of a corresponding user) and/or one or more access token slots being assigned. Primary assignment management system can update an assignment data store and/or load data store 1020 to reflect the assignment.

Primary load management system 1014 can then retrieve access code data from an access code data store 1030 and transmit the access code data to user device 1026. The access code data can correspond to the one or more access tokens being assigned to the user. The access code data can be transmitted (for example) immediately, at a defined time (e.g., relative to a time of a resource), or upon receiving a request (e.g., triggered by a user input or detecting that a user device has crossed a geofence corresponding to a resource).

User device 1026 can store the access code(s) in an access-code data store 1030*b*. Subsequently, user device 1026 can retrieve the access-code data and transmitting it to a site controller 712 (e.g., upon detecting the site controller, upon receiving a request from the site controller or in response to detecting a corresponding user input). Site controller 712 can include one located at a resource location. Site controller 712 can transmit the access-code data to primary load management system 1014, which can then determine whether the code is a valid code, has not been previously redeemed and/or corresponds to one or more characteristics (e.g., a resource associated with or identified by the site controller, a time, a device characteristic, etc.). A result of such determination(s) can be transmitted back to site controller 712 such that a user can then be granted or denied requested access to a resource.

It will be appreciated that one, more or all communications represented in communication exchange 1000*a* can be transmitted via (for example) a network location, another portal, an email exchange, a message (e.g., SMS message) exchange, and/or an API.

It will be appreciated that part or all of a communication exchange can be performed in an automated or semi-automated manner. For example, one or more rules (e.g., secondary-system rules or user rules) can be defined so as to trigger automatic allocation or assignment upon detecting data that corresponds to request parameters in the rules. As another example, the one or more rules can be defined so as to trigger a notification communication to the user device or secondary load management system that includes an alert that the request parameters are satisfied and enable to user device or secondary load management system to transmit a request for allocation or assignment.

It will also be appreciated that various modifications to communication exchange 1000*a* are contemplated. For example, in one instance, secondary load management system 1016*a* may at least partly manage access codes. For example, one or more access codes corresponding to a load may be transmitted from primary load management system 1014 to secondary load management system 1016*a* as part of a response. Secondary load management system 1016*a* may then transmit select access codes to a user device 1026, and (in various instances) either primary load management system 1014 or secondary load management system 1016*a* may provide verification of the code to site controller 712.

Figure 10B:
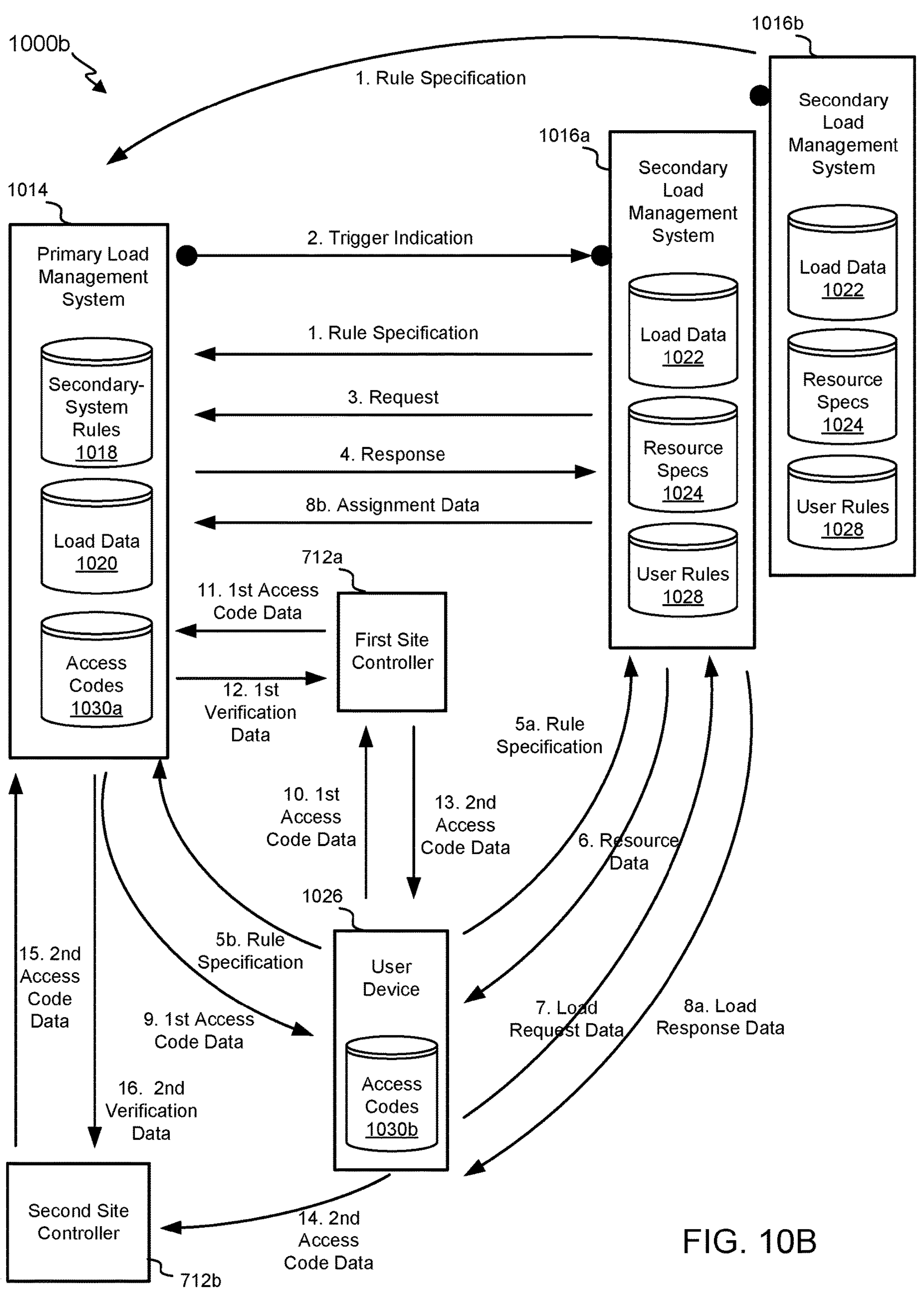

Referring next to FIG. 10B, another example of a communication exchange 1000*b* involving primary load management system 1014 and each of a plurality of secondary load management systems 1016*a*, 1016*b* is shown. In this instance, two different types of access code data are associated with an assignment.

As shown, in response to an initial assignment of an access token slot, primary load management system 1014 transmits first access code data to user device 1026. The first access code data may include data representing that access to a resource has been authorized. However, in this instance, the first access code data may lack a precision of association that would associate the first access code data with one or more particular access characteristics. For example, the data may lack information that would identify a particular location within a resource area for which access is to be granted.

Subsequently (e.g., after a predefined time period, such as within a defined period from a resource time; and/or when a user device 1026 crosses a geofence corresponding to a resource, and/or when a user device 1026 receives input or a site-controller request indicating that access data is to be transmitted to a nearby site controller), user device 1026 may retrieve the first access code data and transmit it (e.g., via a short-range communication) to a first site controller 712*a*.

First site controller 712*a* may communicate with primary load management system 1014 to verify the data, in a manner similar to that described herein. Upon detecting that the first access code data has been verified, first site controller 712*a* can transmit second access code data to user device 1026. The second access code data have a precision of association that associates the data with one or more particular access characteristics (e.g., one or more resources). The second access code data may be, for example, generated at first site controller 712*a* or received from primary load management system (e.g., as part of the verification communication or as part of another communication). The particular access characteristics may be identified based on, for example, a technique described in U.S. application Ser. No. 14/063,929, filed on Oct. 25, 2013, which is hereby incorporated by reference in its entirety for all purposes. The particular access characteristics may be identified based on, for example, for which and/or how many access token results first access code data had been previously verified and/or which and/or how many second access codes had been generated and/or transmitted.

The second access code data may indicate where access to a resource is authorized, and user device 1026 may thus move to a corresponding location. In some instance, a second site controller 712*b* is associated with the corresponding location. User device 1026 may then transmit the second access code data (e.g., when user device 1026 detects that it has crossed a geofence corresponding to the location and/or when user device 1026 receives input or a site-controller request indicating that access data is to be transmitted to a nearby site controller) to second site controller 712*b*. Second site controller 712*b* can determine whether the code is verified (e.g., valid, has not been previously used, and/or corresponds to the user device 1026 and/or location). The determination can include (for example) transmitting the second access code data to another device (e.g., primary load management system 1014, a local server, or another site controller, such as first site controller 712*a*) and receiving second verification data that indicates whether the second access code data is verified. The determination can, alternatively or additionally, include a local determination, which may be based (for example) on comparing the second access code data to data in a local access-code data store to determine whether there is a match and/or whether the second access code data (or corresponding access code data that is associated with same one or more particular characteristics) has been previously verified. The local access-code data store may be populated by second site controller 712*b*, for example, in response to communications from one or more other site controllers and/or primary load management system 1014 that identify second access code data that have been issued.

Multiple Event Searching within a Venue

Figure 11:
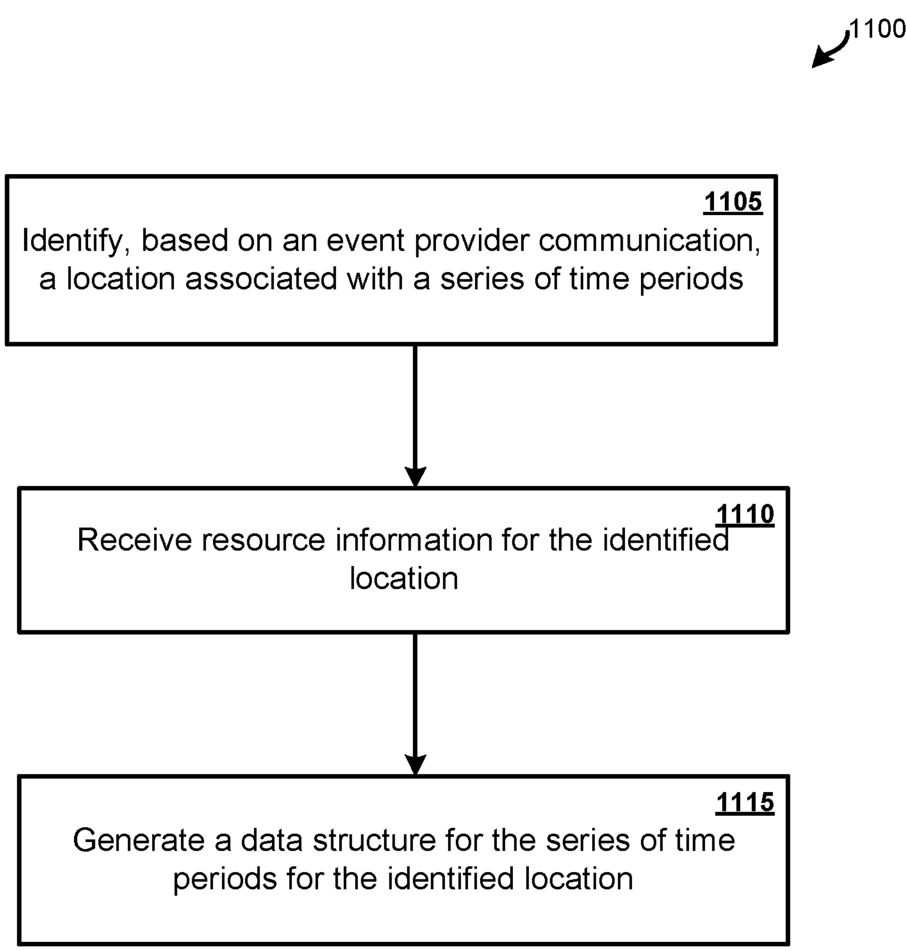
FIG. 11 illustrates one or more exemplary embodiments of one or more operations of a resource access-facilitating interaction system.

FIG. 11 illustrates exemplary process 1100 performed by one or more parts of resource system 100. Process 1100 may be a process for generating a single data structure for multiple resources that are valid at various time periods within a particular location. At 1105, one or more parts of resource system 100 identifies, based on an event provider communication, a location associated with a series of time periods. A location may host a series of time periods. For example, different locations may simultaneously host different time periods. A series of time periods may be two or more time periods that share a common attribute. For example, a series of time periods may a series of time periods where a particular resource is valid at a single location. In such an instance, the events share the common attribute of all being periods of time which a particular resource is valid. Device 120 can generate and/or transmit event provider communication. The event provider communication may include one or more of the following: an identification of a series of time periods, parameters of acquiring access tokens for resources during the series of time periods, indications of dates and times of each time periods in the series of time periods, indications of access tokens for one or more resources for one or more time periods in the series of time periods, an identification of a location for hosting the series of time periods, etc.

For example, device 120 may send an event provider communication that indicates Location Y in New York, will host a series of time periods (e.g., a series of the play Hamilton on 10 particular nights). In one embodiment, only a single location associated with a single series of time periods is identified from the event provider communication. For example, the received event provider communication may only indicate the location of Location Y for hosting a single series of Hamilton shows between March 2018 and April 2018. In another embodiment, the received event provider communication may indicate multiple locations associated with multiple series of time periods. For example, the received event provider communication may indicate the Location Y for hosting a series of Hamilton shows between March 2018 and April 2018 and the location Raleigh Arena in Raleigh, North Carolina for hosting a series of Hamilton shows between June 2018 and July 2018. As can be seen, a series of time periods may correspond to a series of events of a particular performance or show at a particular venue (e.g., location). In such an embodiment, each performance may occur at the particular location at a particular time period.

At 1110, one or more parts of resource system 100 receives resource information for the identified location. Resource information may include various resource parameters such as resource location, resource rate, resource accessibility, resource status, and the like. The received resource (e.g., seat) information may also include a visual display of resources such as an interactive graph of the location (e.g., map of seats at a particular venue). The resource information may be transmitted by device 120 and may be specific to a single location. For example, at 1105, one or more parts of resource system 100 may identify Location Y as a location. Then one or more parts of resource system 100 may transmit a resource information request to device 120 for Location Y. Device 120 may query an internal or external memory associated with device 120 to retrieve resource information for one or more or all of the resources at Location Y and send the resource information to one or more parts of resource system 100. As can be seen, a resource may correspond to a seat within a particular location.

At 1115, one or more parts of resource system 100 generates a data structure for the series of events for the identified location. A data structure may be a 3D (3 dimensional) array, 2D (2 dimensional) array, a table, a linked list, a record, a union, a tagged union, a database object, and the like. In one embodiment, a single data structure is generated for a series of time periods for a particular location. For example, a single data structure is generated for a series of Hamilton shows between March 2018 and April 2018 for Location Y. In such an instance, a separate data structure is generated for the series of Hamilton shows between June 2018 and July 2018 for the location Raleigh Arena. In one embodiment, the data structure is generated based on the received resource information at 1110. For example, a data structure for a series of time periods at a particular location may include one or more resources in the location as well as various resource parameters for each resource such as availability, rate, and location.

FIG. 12 illustrates exemplary data structure 1200 that may be generated by one or more parts of resource system 100. A single data structure may be generated for a series of time periods at a particular location. For example, data structure 1200 may be generated for a 6 show run of Hamilton at the Location Y. In the depicted embodiment, data structure 1200 is a database object table. Data structure 1200 may reside in a memory internal or external to resource system 100 such as a resource database system. Data structure 1200 may reside in a MySQL, Oracle, or DB2 database. Data structure 1200 may store all resource information for a series of time periods within a single data structure. Column 1205 may comprise resource information associated with resource 1 in a location, column 1210 may comprise resource information associated with resource 2 in the same location, and column 1215 may comprise resource information associated with resource 3 in the same location. Although only three columns are depicted, data structure 1200 may comprise as many columns as there are resources in a location.

Data structure 1200 may include resource availability (e.g., resource accessibility), rate (e.g., price for a resource) and/or location for each resource. Resource availability may be indicated as a bit mask. Each bit in the bit mask may correspond to access token availability for a particular time in the series of time periods. For example, column 1205 indicates that the availability of resource 1 is <1 0 1 1 0 1>. This may indicate, to one or more parts of resource system 100, that access tokens are available for time period 1 in the series of time periods, access tokens are not available for time period 2 in the series of time periods, access tokens are available for time period 3 in the series of time periods, access tokens are available for time period 4 in the series of time periods, access tokens are not available for time period 5 in the series of time periods, and access tokens are available for time period 6 in the series of time periods. In one embodiment, there is an availability bit for each time period. For example, if there are 6 instances of a time period that make up the series of time periods at a particular location then there may be 6 availability bits. Each instance of a time period in a series of an time periods may be for different times (i.e. different times on the same day, the same time on different days, and the like). For example, time period 1 may be on day 1, time period 2 may be on day 2 and so forth. As another example, time period 1 may be on day 1 in the morning and time period 2 may be on day 1 in the evening and so forth.

Data structure 1200 may indicate a rate in any one or more known methodologies. For example, rate may be displayed bitcoin, euros, and the like. In one embodiment, the rate for each resource remains constant throughout the series of time periods. For example, in the depicted embodiment, resource 1 as identified by column 1205 may have the same rate for each of the 6 time periods.

Data structure 1200 may indicate a location of a resource by row and column number. For example, column 1210 corresponds to resource information for resource 2. In the depicted embodiment, resource 2 is located at row 1 column 1. In the depicted embodiment, resource 1 is row 1 column 5. The row numbering may be according to a location associated with a resource. The resource numbering may start at 1 and sequentially increase in a left to right manner. In one embodiment, a section may be indicated. For example a resource may have the location of A:1:5, which may indicate section A row 1 column 5. Other resource information may be part of data structure 1200.

Figure 13A:
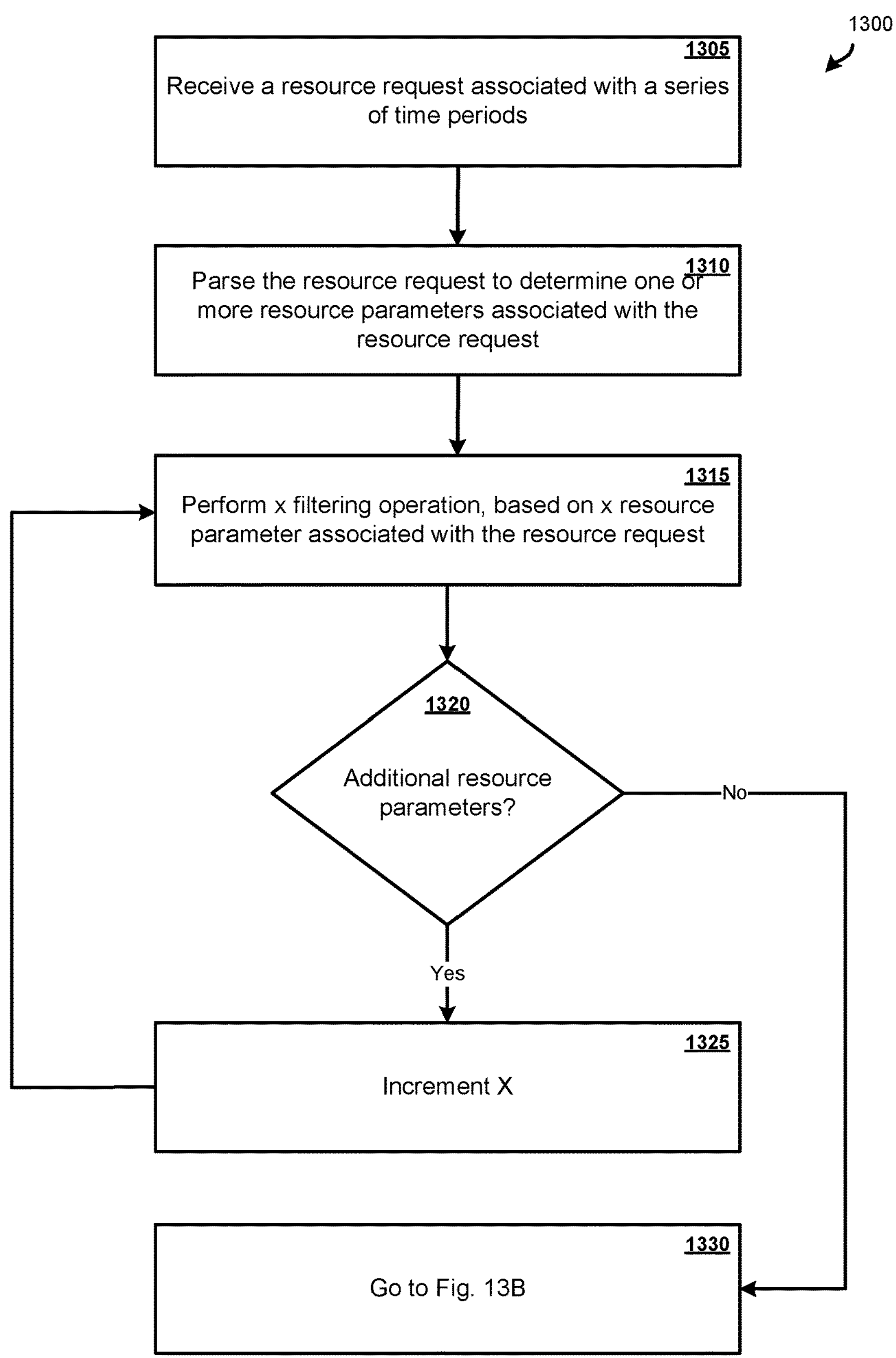
FIG. 13A illustrates one or more exemplary embodiments of one or more operations of a resource access-facilitating interaction system.
Figure 13B:
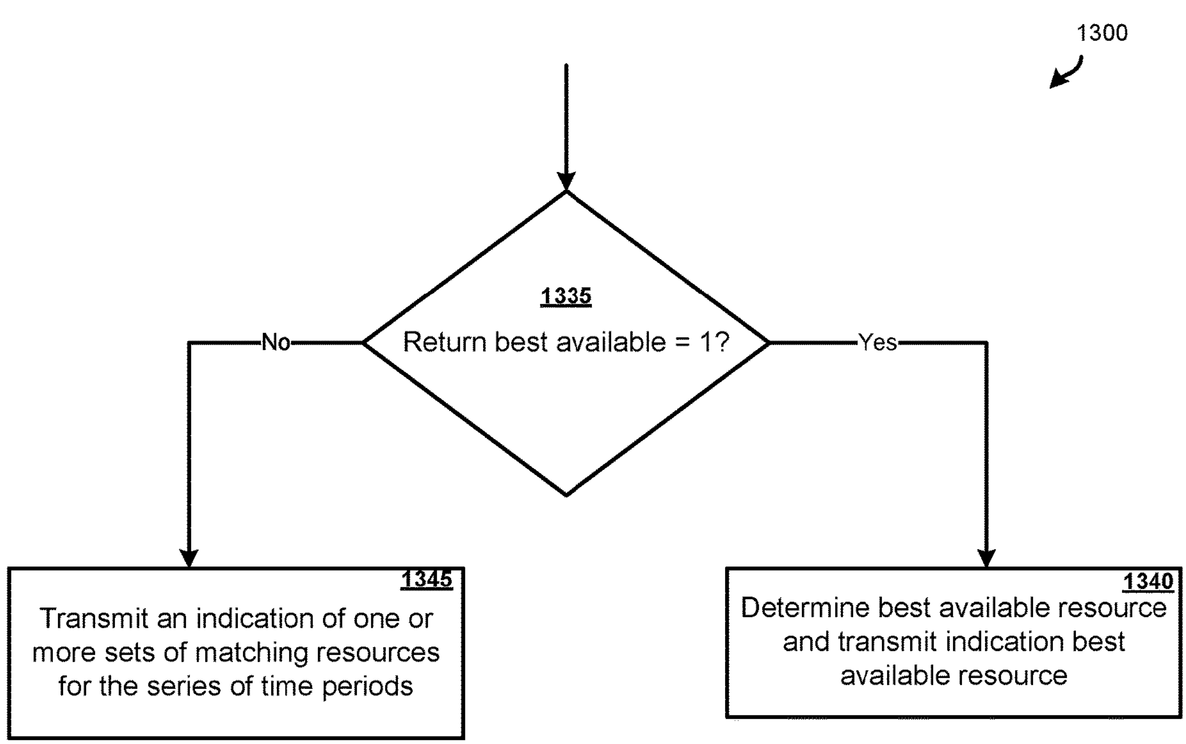
FIG. 13B illustrates one or more exemplary embodiments of one or more operations of a resource access-facilitating interaction system.

FIGS. 13A-13B illustrate an exemplary process 1300 performed by one or more parts of resource system 100. Process 1300 may be a method for simultaneously searching multiple time periods associated with a location. At 1305, one or more parts of resource system 100 receives a resource request associated with a series of time periods. The resource request may be transmitted from a user device (e.g., mobile device 110-1). The resource request may comprise one or more resource parameters such as: a series of time periods identifier, a location identifier, resource location information, a number of resources, a coupled resource value and the like.

The series of time period identifier may identify the series of time period. For example the series of time period identifier may identify a series of Hamilton shows. In one embodiment, the series of time period identifier may also include the location identifier.

The location identifier may identify the location which hosts the series of time periods. For example, the location identifier may identify Location Y as the location.

The resource location information parameter may indicate a desired resource location. For example, the resource location information parameter may indicate a particular section, column, and/or row of a location.

The number of resources parameter may indicate a desired number of resources. For example, the number of resources parameter may indicate 3 resources.

The a coupled resource value parameter may indicate the desire of a user to have two or more resources together. For example, the a coupled resource value parameter may indicate 2 out of 4, which indicates the user would like 2 out of the 4 resources to be coupled. In one embodiment, "coupled" may mean within two resources of each other in any direction. For example, a first resource located at row 1 column 1 may be coupled with a second resource located at row 3 column 1, as only one resource is in between the two (a third resource located at row 2 column 1.)

At 1310, one or more parts of resource system 100 parses the resource request to determine one or more resource parameters associated with the resource request. At 1315, one or more parts of resource system 100 performs a first filtering operation based on a first resource parameter associated with the resource request. The parsed resource parameters associated with the resource request may be sequentially compared to resource information in a corresponding data structure to determine one or more matching resources. As described in relation to FIG. 11 and FIG. 12 each series of time periods for a particular location may have a corresponding data structure. An example of such a data structure is embodied by data structure 1200 as shown in FIG. 12. A matching resource may be defined as a resource or set of resources that satisfies one or more or all resource parameters associated with the resource request. For example, a resource request may be received that comprises:

| Parameter | Value |
|---|---|
| Series of Time Periods Identifier | Any between November 2018 and December 2018 |
| Location Identifier | Location Y |
| Rate Range | 0-200 |
| Number of Resources | 2 |

In response, one or more parts of resource system 100 queries associated memory to find the data structure that corresponds to time periods between November 2018 and December 2018. One or more parts of resource system 100 may locate a data structure that comprises all time periods for at Location Y between November 2018 and December 2018.

Once the data structure is retrieved one or more parts of resource system 100 may query the data structure to perform a first filtering operation based on a first resource parameter to filter out one or more resources that do not meet one or more resource parameters associated with the resource request. For sake of explanation, data structure 1200 will correspond to the data structure for resources at Location Y between November 2018 and December 2018. One or more parts of resource system 100 may perform a first search operation based on the received rate range parameter to determine one or more resources that are between 0 to 200. The resources that are not within the 0 to 200 range are filtered out. In data structure 1200, all resources are within the rate range parameter.

At 1320, one or more parts of resource system 100 determines if there are additional resource parameters. If there are not additional resource parameters, then process 1300 moves to 1335 (via 1330). However, if there are additional set parameters, as there are in the current example, then at 1325 one or more parts of resource system 100 increments the filtering operation. As a result, one or more or parts of resource system 100 may perform a second filter operation based on the received number of resources parameter (i.e. the second resource parameter) to determine if there are two available resources for the same time period between November 2018 and December 2018. In one embodiment, the second search operation is performed on the filtered resource set determined from the first filter operation. To perform the second filter operation, in one embodiment, one or more parts of resource system 100 performs an AND operation between the bit masks of one or more resources in the database structure. For example, the 6 availability bits in data structure 1200 may indicate the availability of resources on 6 different days. To perform the AND operation, in one embodiment, a first resource is chosen as an anchor. An anchor may be a resource that is a starting point for an availability search for multiple resources. For example, resource 1 is determine to have some availability based on its availability bits so it may be chosen as an anchor. Once resource 1 is determined to be the anchor an AND operation may be performed between the availability bits of resource 1 and the availability bits of resource 2. For example, <1 0 1 1 0 1> & <0 0 1 1 1 1>=<0 0 1 1 0 1>. The resulting bit mask indicates that both resource 1 and 2 are available day 3, day 4, and day 6. In another example, an AND operation is performed between resource 1's availability bits and resource 3's availability bits. For example, <1 0 1 1 0 1> & <1 1 1 1 1 0>=<1 0 1 1 0 0>. The resulting bit mask indicates that both resource 1 and resource 3 are available day 1, day 3, and day 4. Using an AND operation allows the availability determination for multiple resources to be performed by a single assembly language process, which may increase the speed of search as opposed to searching resource availability across multiple data structures using multiple assembly languages processes.

Depending on how many resource parameters are received, one or more parts of resource system 100 may perform additional filtering operations. For example, the received resource request may include resource parameters that may include blackout time and date parameters that indicate a user may not be available on day 1. In such an instance, the combination of resource 1 and resource 3 for day 1 would be filtered out. In one embodiment, once all filtering operations are performed according to the received resource parameters a matching resources list may be determined. The matching resources list may indicate a combination of resources or single resources that match the resource parameters of the received resource request. The matching resources list may also indicate the time and date the matching resources are available along with access tokens for each matching resources.

In one embodiment, one or more processes associated with one or more blocks 1315-1325 (e.g., an AND operation) are performed as a single thread operation instead of a multi-thread operation. By performing one or more processes as a single thread operation it may prevent returning one or more conflicting sets of resources to users. For example, in a multi-thread processing two processes may run simultaneously and return the same resources as "available" to two different users. If one user reserves the resources before the other user then one set of the "available" resources are actually unavailable. Running one or more processes associated with one or more blocks 1315-1325 as a single thread may prevent one or more conflicting sets of resources.

At 1335, one or more parts of resource system 100 determines if a return best available flag is equal to 1. In situations when the best available flag is equal to 0 (i.e. not equal to 1) then, at 1345, one or more parts of resource system 100 may transmit an indication of one more sets of matching resources for the series of time periods. The transmission may be sent to mobile device 110-1 or another device associated with the resource request at 1305. The transmission may indicate one more matching resources and one or more details corresponding to the matching resources such as: location of the resources, an interactive resource map of the location, a timer to confirm access tokens for the resources, and the like. Once a user receives the transmission, via a user device, she may confirm access tokens for one or more sets of matching resources. Once confirmed, one or more access tokens may be generated for simultaneous utilization of an associated resource at the determined time period(s). In one embodiment, an access token may take the form of a computer readable device such as a barcode.

At 1335 if it is determined that the best available flag is equal to 1 then, at 1340, one or more parts of resource system 100 may determine the best available resources from the matching resources list and transmit an indication of the best available resources. The transmission may be sent to mobile device 110-1 or another device associated with the resource request at 1305. The transmission may indicate a single option for resources and one or more details corresponding to the single option for resources such as: location of the resources, an interactive resource map of the location, a timer to confirm access tokens for the resources, and the like. One or more parts of resource system 100 may determine what the best available resources are based on a plurality of factors such as: user access token history, time period popularity, availability, user preference, and the like. Once a user receives the transmission, via a user device, she may confirm access tokens for the single option for resources.

By storing resource information for a plurality of events as in a single data structure a computer system may quickly perform search functions across multiple events at the same location.

Figure 14:
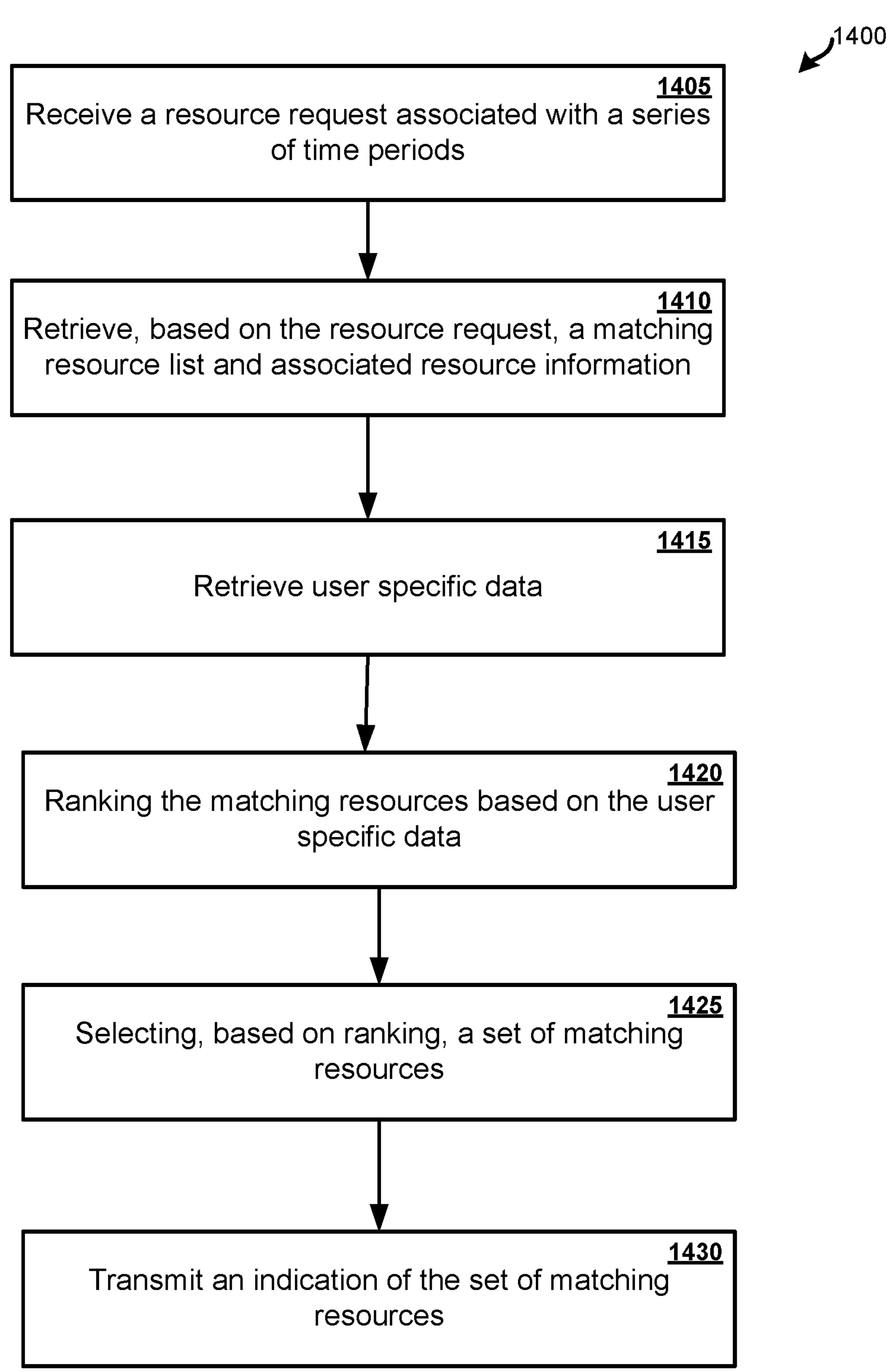
FIG. 14 illustrates one or more exemplary embodiments of one or more operations of a resource access-facilitating interaction system.
Figure 15:
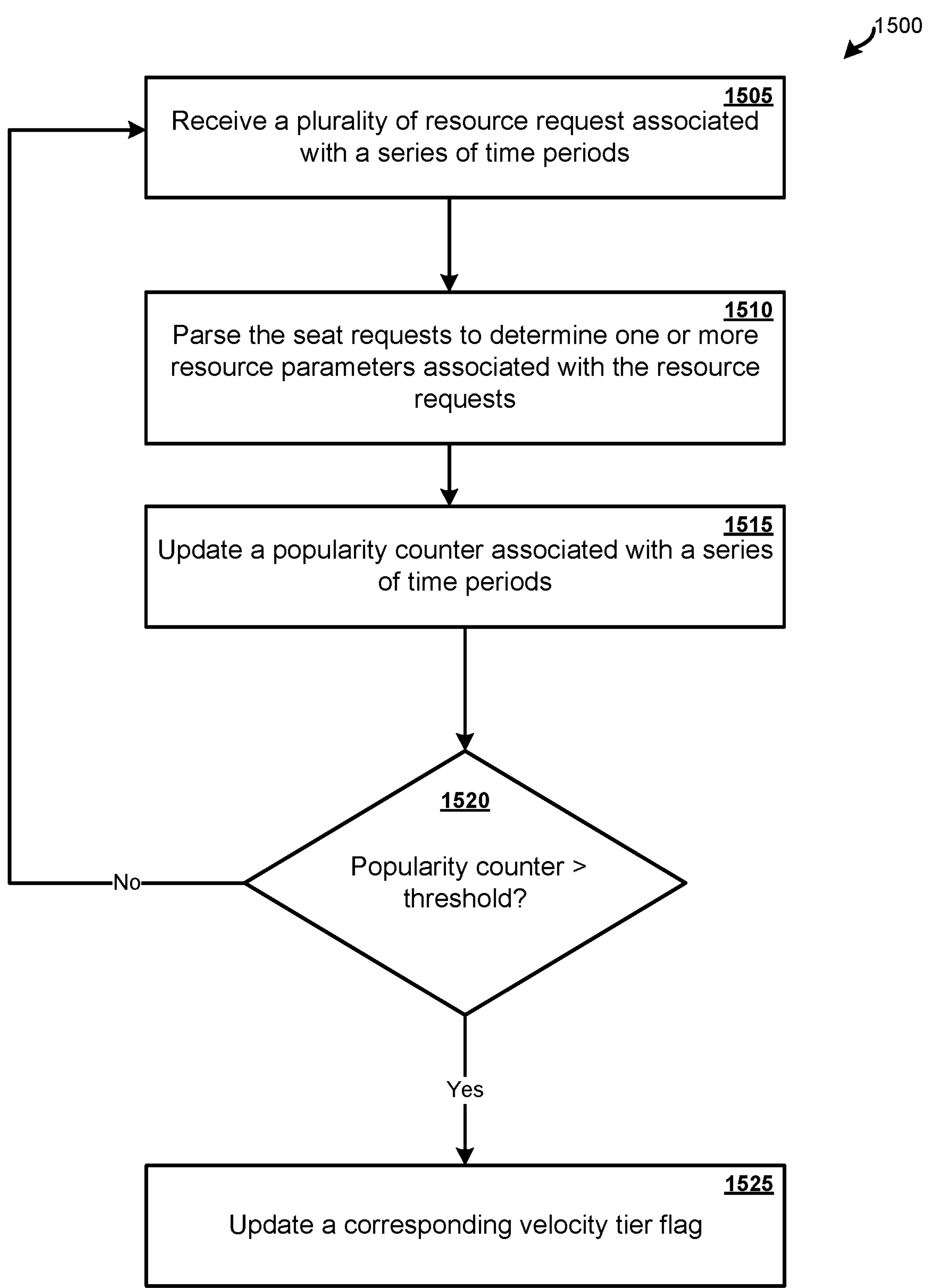
FIG. 15 illustrates one or more exemplary embodiments of one or more operations of a resource access-facilitating interaction system.
Figure 16:
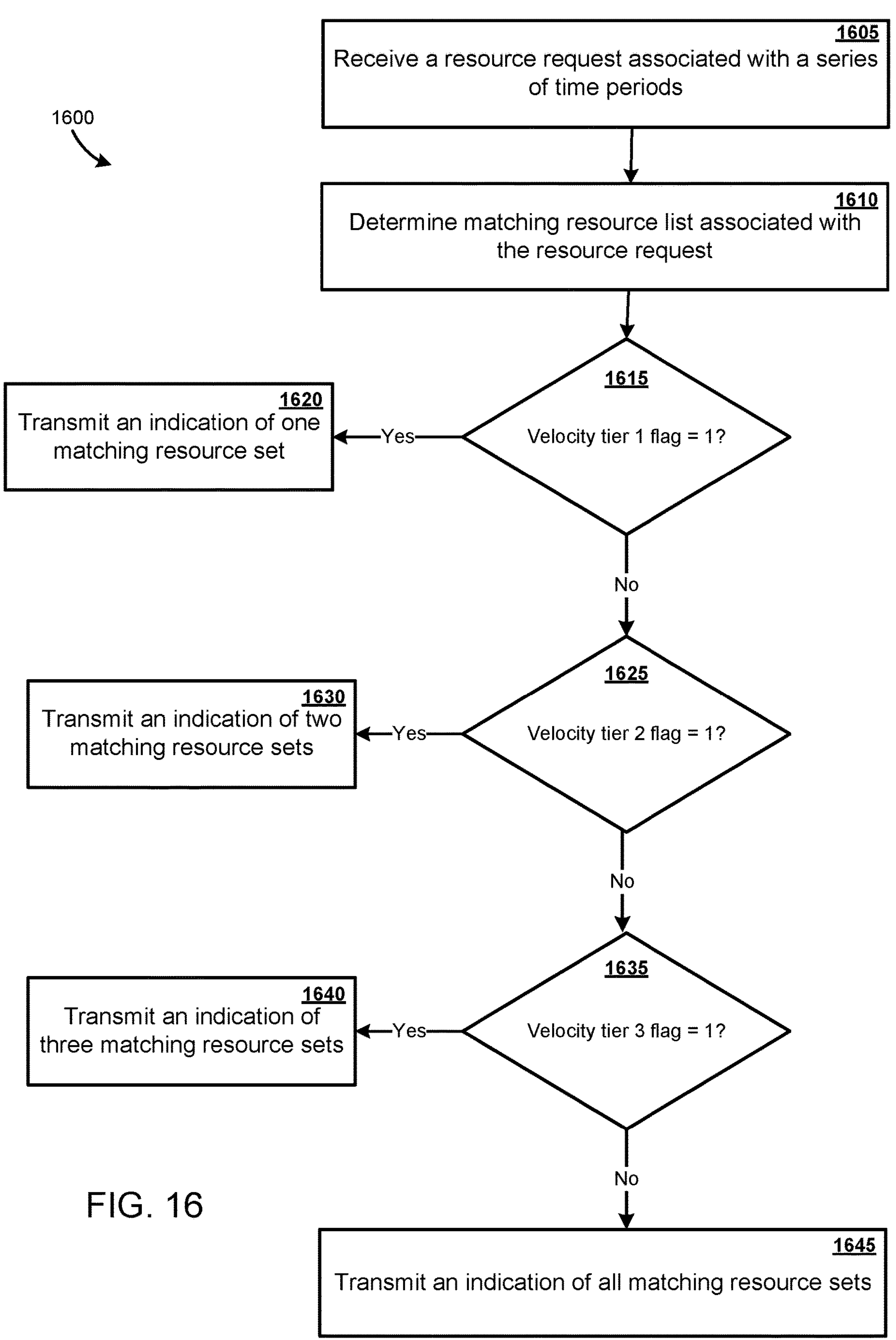
FIG. 16 illustrates one or more exemplary embodiments of one or more operations of a resource access-facilitating interaction system.

FIG. 14 illustrates exemplary process 1400 performed by one or more parts of resource system 100. Process 1400 may be a process for determining the best available resources from a list of matching resources. The list of matching resources may be associated with a series of time periods at a particular location. In one embodiment, one or more processes associated with process 1400 may be performed at 1330 in process 1300.

At 1405, one or more parts of resource system 100 receives a resource request associated with a series of time periods. The request may be transmitted from user device 110-1. The resource request may comprise one or more resource parameters such as: a series of time periods identifier, a location identifier, resource location information, unavailable times and dates, number of resources, a coupled value, a user identifier, and the like.

At 1410, one or more parts of resource system 100 retrieves, based on one or more resource parameters in the resource request, a matching resource list and associated resource information for the resources on the list. In one embodiment the matching resource list may be generated dynamically as described at 1305-1330 in process 1300. In one embodiment, the matching resource list may have been previously generated and stored in internal or external memory sets associated with one or more parts of resource system 100. In such an instance, one or more parts of resource system 100 may query memory according to an user identifier, location identifier, and/or a series of time periods identifier to find one or more matching resource lists associated with that user.

Once the matching resource list is retrieved, one or more parts of resource system 100 retrieves resource information associated with resources in the matching resource list. This process may be similar to the processes described at 1315-1330 in process 1300, in which a single data structure corresponding to a series of time periods at a particular location is queried to receive resource information. The resource information may include resource availability, rate and/or location information for each resource in the matching resource list.

At step 1415, one or more parts of resource system 100 retrieves user specific data. The user specific data may data that is associated with a user identifier associated with the received resource request. User specific data may be stored in one or more internal or external memory sets associated with one or more parts of resource system 100. User specific data may include: a user's past resource history, a user's resource conversion history, a user's availability, and/or a user's previous access tokens associated with one or more time periods.

A user's past resource history may include one or more attributes of a user's history of access tokens. For example, a user's past resource history may indicate a user frequently obtains access tokens for certain time periods (e.g., weekends). In another example, a user's past resource history may indicate a certain genre of access tokens the user frequently obtains (e.g., regional spaces, etc.) A user's past resource history may indicate a certain genre of access tokens the user does not frequently obtain. A user's past resource history may indicate one or more locations preferred by the user (e.g., first row access tokens, box resources, etc.) A user's past resource history may indicate one or more rate ranges preferred by the user (e.g., 0-300.)

A user's resource conversion history may include one or more attributes of a user's resource conversion history. A resource conversion may be defined as the process of confirming an access token associated with the a resource. The resource conversion history may indicate the likelihood of a user to confirm (e.g., purchase) one or more access tokens.

A user's availability may include one or more times which a user is available to according to one or more time periods. A user's availability may be determined by data specified by the user. For example, a user may indicate, via a user device, which times she is available (e.g., Jan. 20, 2019 between 5 pm and 7 pm). In another embodiment, a user's availability may be determined by one or more applications running on a user device or one or more applications associated with a user. For example, a task application or email application (e.g., Microsoft Outlook) associated with a user device may keep a user's times in which the user has previously determined engagements. One or more parts of resource system 100 may query one or more of the associated applications to retrieve one or more times a user is not available. Similarly, one or more parts of resource system 100 may query one or more of the associated applications to retrieve one or more times that a user is available (e.g., does not have any engagements currently for certain times.)

A user's access tokens associated with one or more time periods may include one or more instances or indicators of the use of access token associated with one or more resources. In one embodiment, location data such as Global Positioning System data may be used to indicate a user's location at a particular time within a time period. For example, location data may be utilized to determine if a user is present at a location during a time period. Location data from a user device associated with the user may be used to determine a user's location relative to a particular location. Similarly, location data may be used to indicate that a user's location during a particular time period is different than a location associated with a resource for which the user has an access token.

At 1420 one or more parts of resource system 100 ranks, based on the user specific data, the matched resources in the matched resources list. Using user specific data may allow one or more parts of resource system 100 to determine which resources in a matching resource list that may be preferable to a user. One or more user specific data may be used. For example, one or more parts of resource system 100 may retrieve the following matching resource list for an event at a particular location.

| | Resource Set 1 | Resource Set 2 | Resource Set 3 |
|---|---|---|---|
| Accessibility | Saturday | Wednesday | Sunday |
| Location | Row 1 | Row 3 | Row B |
| Rate | 600 | 400 | 150 |
| Number of resources | 2 | 2 | 2 |

The matching resource list may be based on one or more resource parameters in the resource request received at 1405. One or more user specific data may be prioritized to determine the ranking of the resource sets of the matching list. For example, one or more parts of resource system 100 may prioritize a user's previous resource history when determining the rankings. In such an instance, one or more parts of resource system 100 may determine, based on a user's prior resource history, that the user typically obtains row 1 access tokens at a typical rate of 500 per access token. One or more parts of resource system 100 may then return the following ranking: 1. Resource Set 1, Resource Set 2, Resource Set 3. In another example, one or more parts of resource system 100 may determine, based on a user's accessibility, that the user is not accessible on the weekend. One or more parts of resource system 100 may then return the following rankings: 1. Resource Set 2, Resource Set 1, Resource Set 3. In one embodiment, one or more parts of resource system 100 may use two or more user specific data to determine the rankings. For example, one or more parts of resource system 100 may determine, based on a user's prior resource history, that the user typically obtains row 1 access tokens for under 300. One or more parts of resource system 100 may also determine, based on a user's accessibility, that the user, while accessible is very congested on Wednesday. As a result, one or more parts of resource system 100 may return the following rankings: 1. Resource Set 1, 2. Resource 3, 3. Resource 2. Resource Set 1 may be ranked number 1 because the ranking determination may prioritize the user's prior resources for row 1 access tokens over the user's prior resource rate range. Resource Set 3 may be ranked higher than Resource Set 2 because the ranking determination may prioritize the user's accessibility as indicated by the user's email application client over the user's prior access tokens for row 1 resources (e.g., being closer to the performance area.) Any combination of user specific data may be used to determine one or more rankings of resource sets in the matching resource list.

At 1425, one or more parts of resource system 100 selects, based on the ranking, a set of matching resources. In one embodiment, one or more parts of resource system 100 may select the highest ranking set of resources. In one embodiment, other parameters may be taken into account for the selection process. Other parameters may include may include an indication of an time period's congestion.

An indication of an time periods's congestion may be determined by dynamically monitoring resource requests for a particular time period. For example, if one or more parts of resource system 100 receive 100 resource requests for location A at time period 1 and 50 resource requests for location A at time period 2, then location A at time period 1 may be indicated as more congested than location A at time period 2.

In one example, one or more parts of resource system 100 selects a set of matching resources based on user specific data and an indication of an time period's congestion. One or more parts of resource system 100 may retrieve the following matching resource list for an event at a particular location.

| | Resource Set 1 | Resource Set 2 | Resource Set 3 |
|---|---|---|---|
| Accessibility | Saturday | Wednesday | Sunday |
| Location | Row 1 | Row 3 | Row B |
| Rate | 600 | 400 | 150 |
| Number of resources | 2 | 2 | 2 |

Based on user specific data, one or more parts of resource system 100 may rank the resource sets in the following order: 1. Resource Set 1, 2. Resource Set 2, 3. Resource Set 3 (row B may be a row within a balcony of a location). One or more parts of resource system 100 may receive an indication that the Wednesday time period is less congested than the Saturday time period as a result, one or more parts of resource system 100 may select resource set 2 over resource set 1. Different and other parameters may be considered when determining which set of matching resources to select. In one embodiment, only one set of resources is selected. In another embodiment, a plurality of resources are selected.

At 1430, one or more parts of resource system 100 transmits an indication of the set of matching resources. This indication may be transmitted to a the user device associated with the resource request at 1405. The indication may be configured to be rendered by a user device to display the set of matching resources to a user of the user device.

Selecting, by a computer system, one or more sets of resources from a matching resource list may allow quick and efficient distribution of access tokens to a plurality of users. Such efficiency may be particular useful for high congestion (e.g. on-sale) situations where a plurality of users are attempting to access a limited supply of access tokens at substantially the same time. By choosing resources for a user, a computer system may quickly service a plurality of users without waiting for users to determine a resource selection from a plurality of choices. In addition, during a high congestion instances, one or more parts of resource system 100 may place a temporary hold on one or more access tokens for a set of resources when the indication of the sets of resources that are sent at step 1430. Using process 1400 may enable only one temporary hold per user (because they only have one option) instead of displaying a plurality of resource options and temporarily holding a plurality of access tokens corresponding to those plurality of resource options. Thus, allowing for quicker access token distribution, more efficient resource allocation, and disabling the potential temporary hold bottleneck of access token distribution in a high congestion environment. In one embodiment, a user of a user device may never receive an indication or may never generally be aware of the matching list of resources and instead only receives an indication of resources transmitted to her at 1430.

Process 1500 may be performed by one or more parts of resource system 100. Process 1500 may be a process that determines and sets one or more velocity tier flag values. A velocity tier flag may be a binary value that indicates a particular popularity of an object based on velocity. Velocity may be defined as the amount of communications received by one or more parts of resource system 100 related to a particular object. An object may be a series of time periods, a time period in a series of time periods, or a segment of a location (e.g., the front row of a venue), and the like.

At 1505, one or more parts of resource system 100 receives a plurality of resource requests (e.g., a plurality of resource requests) associated with a series of time periods. The requests may be transmitted from a plurality of user devices such as mobile device 110-1. The resource requests may comprise one or more resource parameters such as: a series of time periods identifier, a time period identifier, a location identifier, preferred times, preferred dates, rate ranges, rate limits, resource location information, blackout times and dates, number of resources, a coupled value and the like.

At 1510, one or more parts of resource system 100 parses the resource requests to determine one or more resource parameters associated with the resource requests. At 1515, one or more parts of resource system 100 updates a popularity counter associated with a series of time periods. A popularity counter may be stored in one or more sets of memory associated with one or more or more parts of resource system 100. There may be a plurality of popularity counters and each popularity counter may be associated with a different series of time periods. The popularity counter may increase each time one or more parts of resource system 100 receives a resource request associated with the series of time periods. For example, if at 1505, 300 resource requests are received, then the popularity counter would be updated to equal 300. In another embodiment, the popularity may increase each time one or more parts of resource system 100 receives an indication of a social media mention associated with the series of time periods. A social media mention may be a post on one or more social media network locations or applications or one or more posts made, via one or more social media network locations or applications.

At 1520, one or more parts of resource system 100 compares the popularity counter to a predetermined threshold. The predetermined threshold may be retrieved by one or more parts of resource system 100 by querying one or more sets of memory associated with one or more parts of resource system 100. The predetermined threshold may vary based on preference. In addition, there may also be a plurality of predetermined thresholds and each threshold may correspond to a different velocity tier flag. For example, a first velocity tier flag may have an associated threshold value of 100, a second velocity tier flag may have an associated threshold value of 200, and a third velocity tier flag may have an associated threshold value of 300. If the popularity counter is equal to or greater than the predetermined threshold for a velocity tier flag then at 1525, one or more parts of resource system 100 updates a corresponding velocity tier flag. For example, if a first velocity tier flag has an associated threshold value of 100 and the popularity counter is 250 then one or more parts of resource system 100 may update the first velocity tier flag to be equal to 1. Furthermore, if a second velocity tier flag has an associated threshold value of 200 then one or more parts of resource system 100 may update the second velocity tier flag to be equal to 1 because the popularity counter exceeds 200. If at 1620, the popularity counter does not exceed any predetermined threshold value then process 1500 returns to 1505.

Although process 1500 is described in terms of determining velocity based on the popularity of a series of time periods, another object may be used. For example, process 1500 may be used to determine the velocity of a time period (e.g., an event) in a series of time periods, or a segment of a location (e.g., the front row) and the like. For example, the popularity counter at 1615 may be updated based on resource parameters that identify a particular event to determine the popularity of a particular time period in a series of time periods. In another example, the popularity counter at 1616 may be updated based on resource parameters that identify one or more resource locations, such as the front row, to determine the popularity of a particular segment of a location.

Process 1600 may be performed by one or more parts of resource system 100. Process 1600 may be a process that transmits a certain number of options from a matching resource list based on velocity. Velocity may be defined as the amount of communications received by one or more parts of resource system 100 related to a particular object. An object may be a series of time periods, a time period in a series of time periods, or a segment of a location (e.g., the front row) and the like.

At 1605, one or more parts of resource system 100 receives a resource request associated with a series of time periods. The request may be transmitted from mobile device 110-1. The resource request may comprise one or more resource parameters such as: a series of time periods identifier, a time period identifier, a location identifier, preferred times, preferred times, rate ranges, rate limits, resource location information, blackout times and dates, number of resources (e.g., number of resources), a coupled value and the like. From the series of time periods identifier one or more parts of resource system 100 determines a series of time periods. Once a series of time periods is identified, one or more parts of resource system 100 may retrieve, from one or more sets of memory associated with one or more parts of resource system 100, one or more velocity tier flags associated with the identified series of time periods. A velocity tier flag may be a binary value that indicates a particular popularity of an object based on velocity. A value of a velocity tier flag may be set according to process 1500. In one embodiment, there are multiple velocity tier flags and each flag is equal to one when a certain amount of communications related to a series of time periods exceeds a respective threshold.

At 1610, one or more parts of resource system 100 determines a matching resource list associated with the resource request. A matching resource list may be defined as a resource or set of resources that satisfies one or more or all resource parameters associated with the resource request. The matching resource list may be determined as described by one or more operations of process 1300.

At 1615, one or more parts of resource system 100 determines if a velocity tier 1 flag is equal to one. One or more parts of resource system 100 may query one or more sets of memory associated with resource system 100 to retrieve the velocity tier 1 flag. The velocity tier 1 flag may indicate the velocity for resource requests for a series of time periods is above a first threshold. For example, a velocity tier 1 flag may be set to one in circumstances when there are over 300 resource requests for a series of time periods within a time frame (e.g. 5, 10, 15, 20 minutes etc.) This very high velocity rate may indicate that the series of time periods is in very high demand.

If velocity tier 1 flag is equal to one then at 1620, one or more parts of resource system 100 transmits an indication of one matching resource set from a matching resource list. In one embodiment, the matching resource list has a plurality of matching resource sets. For example, the matching resource list may have 4 sets of matching resources. In such an example, at 1620, one or more parts of resource system 100 may choose one of the matching resource sets from the matching resource list and transmit an indication of the chosen matching resource set to a user device associated with the resource request. The transmission may be configured to be rendered by the user device. In one embodiment, the transmission includes a timer that may be rendered by the user device. The timer may indicate how long the user has to acquire access tokens for the indicated matching resource set. In one embodiment, one or more parts of resource system 100 puts a temporary hold on the access tokens associated with the matching resource set. The temporary hold may be removed when the timer expires. The temporary hold may block any other user devices from obtaining the access tokens associated with the matching resource set while the timer is not expired. The temporary hold may also prevent parallel threads from attempting to grant the same access tokens to different users at the same time.

In circumstances when velocity tier 1 flag is not equal to one then at 1625, one or more parts of resource system 100 determines if a velocity tier 2 flag is equal to one. One or more parts of resource system 100 may query one or more sets of memory associated with resource system 100 to retrieve the velocity tier 2 flag. The velocity tier 2 flag may indicate the velocity for resource requests for a series of time periods is above a second threshold. For example, a velocity tier 2 flag may be set to one in circumstances when there are over 200 resource requests for a series of time periods within a time frame (e.g. 5, 10, 15, 20 minutes etc.) This high velocity rate may indicate that the series of time periods is in high demand.

If velocity tier 2 flag is equal to one then at 1630, one or more parts of resource system 100 transmits an indication of up to two matching resource sets from a matching resource list. In one embodiment, the matching resource list has a plurality of matching resource sets. For example, the matching resource list may have 4 sets of matching resources. In such an example, at 1630, one or more parts of resource system 100 may choose two of the matching resource sets from the matching resource list and transmit an indication of the chosen matching resource sets to a user device associated with the resource request. The transmission may be configured to be rendered by the user device. In one embodiment, the transmission includes a timer that may be rendered by the user device. In one embodiment, one or more parts of resource system 100 puts a temporary hold on the access tokens associated with matching resource sets.

In circumstances when velocity tier 2 flag is not equal to one then at 1635, one or more parts of resource system 100 determines if a velocity tier 3 flag is equal to one. One or more parts of resource system 100 may query one or more sets of memory associated with resource system 100 to retrieve the velocity tier 3 flag. The velocity tier 3 flag may indicate the velocity for resource requests for a series of time periods is above a third threshold. For example, a velocity tier 3 flag may be set to one in circumstances when there are over 100 resource requests for a series of time periods within a time frame (e.g. 5, 10, 15, 20 minutes etc.) This velocity rate may indicate that the series of time periods is in mild demand.

If velocity tier 3 flag is equal to one then at 1640, one or more parts of resource system 100 transmits an indication of up to three matching resource sets from a matching resource list. In one embodiment, the matching resource list has a plurality of matching resource sets. For example, the matching resource list may have 4 sets of matching resources. In such an example, at 1640, one or more parts of resource system 100 may choose three of the matching resource sets from the matching resource list and transmit an indication of the chosen matching resource sets to a user device associated with the resource request. The transmission may be configured to be rendered by the user device. In one embodiment, the transmission includes a timer that may be rendered by the user device. In one embodiment, one or more parts of resource system 100 puts a temporary hold on the access tokens associated with matching resource set.

In circumstances when velocity tier 3 flag is not equal to one then at 1645, one or more parts of resource system 100 transmits an indication of all of the resource sets from a matching resource list. In one embodiment, the matching resource list has a plurality of matching resource sets. For example, the matching resource list may have 4 sets of matching resources. In such an example, at 1640, one or more parts of resource system 100 may transmit an indication of the matching resource sets to a user device associated with the resource request. The transmission may be configured to be rendered by the user device. In one embodiment, the transmission includes a timer that may be rendered by the user device. In one embodiment, one or more parts of resource system 100 puts a temporary hold on the access tokens associated with matching resource set.

In one embodiment, processes associated with 1615, 1625, and 1635 may be performed in a linear fashion such that a first check is performed to determine if velocity tier 1 flag is equal to one, then a second check is performed to determine if velocity tier 2 flag is equal to one, then a third check is performed to determine if velocity tier 3 flag is equal to one and so forth. Similarly a reverse process may be performed where a first check is performed to determine if velocity tier 3 flag is equal to one, then a second check to determine if velocity tier 2 flag is equal to one, and a third check to determine if velocity tier 1 flag is equal to one. In one embodiment, process 1600 may be utilized for a high congestion time period.

Determining, by a computer system, certain operations to perform based on a velocity of communication pertaining to a particular object may improve the speed and efficiency of a computer system for granting access tokens to events. In times of low demand for access tokens a user may be given a longer duration and more options to make a decision. However, when demand is high for access tokens, a user may be given a shorter duration and less options. Such a system, enables quick assignment of access tokens, which is especially beneficial when a temporary hold is used while a user is making a decision. If a user takes too long to make a decision it prevents another user from being granted an access token, which could potentially bottleneck a system. The system and methods presented here within remove that bottleneck because in periods of high demand a user may quickly make a choice in part due to the limited options presented to her. Furthermore, the limited options presented may ensure that unnecessary temporary holds are not placed on access tokens which could reduce the overall speed of granting access tokens to a plurality of users for a plurality of events.

Figure 17:
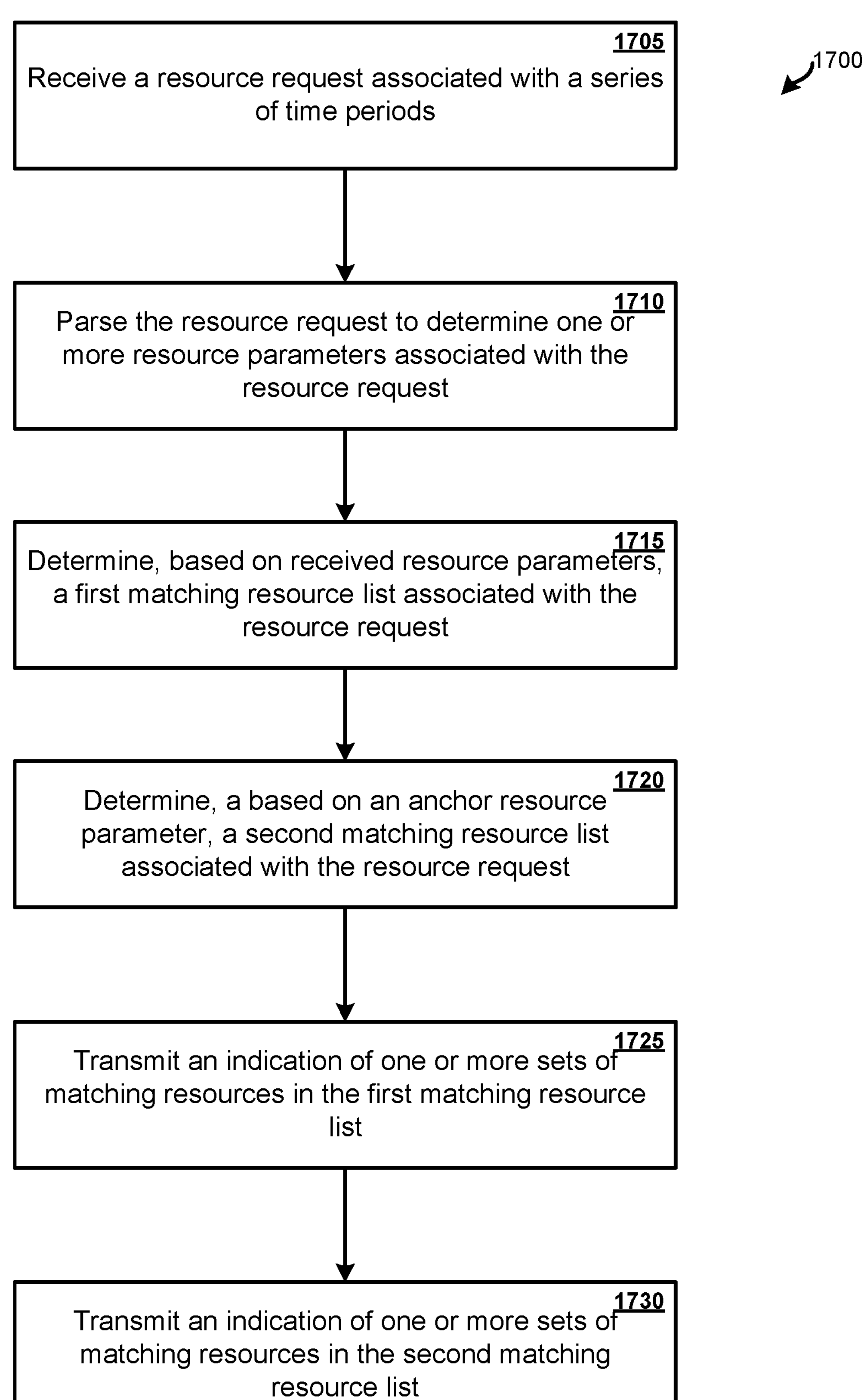
FIG. 17 illustrates one or more exemplary embodiments of one or more operations of a resource access-facilitating interaction system.

FIG. 17 illustrates an exemplary process 1700 performed by one or more parts of resource system 100. Process 1700 may be a method for identifying a first set of access tokens that correspond to a first set of parameters and further identifying a second set of access tokens that correspond to a second set of parameters. At 1705, one or more parts of resource system 100 receives a resource request associated with a series of time periods. The request may be transmitted from mobile device 110-1. The resource request may comprise one or more resource parameters such as: a series of time periods identifier, a location identifier, preferred times, rate ranges, resource location information, number of resources, a coupled value and the like.

At 1710, one or more parts of resource system 100 parses the resource request to determine one or more resource parameters associated with the resource request. At 1715, one or more parts of resource system 100 determines a first matching resource list associated with the resource request. A first matching resource list may be defined as a resource or set of resources that satisfies one or more or all resource parameters associated with the resource request. The first matching resource list may be determined as described by one or more operations of process 1300.

At 1720, one or more parts of resource system 100 determines a second matching resource list associated with the resource request. The second matching resource list may be a resource or a set of resources that satisfies one or more anchor conditions. An anchor condition may be a resource parameter or condition that must be satisfied. The anchor condition may be specified in the resource request. For example, a user may indicate an anchor condition as being preferred times. In such an instance, the second matching resource list may contain sets of matching sets that are available for the specified times. In one embodiment, a resource request may only specify one anchor condition. For example, a resource request may be received that contains the resource parameters of preferred times, rate ranges, and resource location information. However, only one of those resource parameters may be identified as an anchor condition. The second matching resource list may be determined by methods similar to those described in relation to process 1300.

In one embodiment, an anchor condition may be specified by device 120. For example, an device 120 may indicate an anchor condition of a resource location being a row 1 resource. Thus, each entry in the second matching resource list must be for a resource or set of resources in row 1. Such an embodiment may be useful when access tokens for a particular type of resource are not heavily allotted. In another example, device 120 may indicate the anchor condition of a particular rate. Thus, each entry in the second matching resource list must be for a resource or set of resources may correspond to a particular rate or rate range.

In one embodiment, an anchor condition may be specified by user specific data. User specific data can be data that is associated with a user identifier of the received resource request. User specific data may be stored by one or more internal or external memory sets associated with one or more parts of resource system 100. User specific data may include: a user's past resource history, a user's resource conversion history, a user's accessibility, and the like. In one embodiment, there may be a first anchor condition indicated by the received resource request and a second anchor condition indicated by user specific data.

In one embodiment the operations associated with 1715 and the operations associated with 1720 may be performed in parallel or sequentially.

At 1725, one or more parts of resource system 100 transmits an indication of one or more sets of matching resources in the first matching resource list. This indication may be transmitted to a user device associated with the resource request at 1705. The indication may be configured to be rendered by a user device and display the indication to a user of the user device. In one embodiment, the indication of the set of matching resources may be determined by one or more processes associated with FIG. 14.

At 1730, one or more parts of resource system 100 transmits an indication of one or more sets of matching resources in the second matching resource list. This indication may be transmitted to a user device associated with the resource request at 1705. The indication may be configured to be rendered by a user device and display the indication to a user of the user device. In one embodiment, the indication the set of matching resources may be determined by one or more processes associated with FIG. 14.

Example of Process 1700

At 1705, one or more parts of resource system 100 receives a resource request that comprises:

| Parameter | Value |
|---|---|
| Series of Time Periods Identifier | November 2018 and December 2018 |
| Location Identifier | Location S |
| Rate Range | 0 to 200 |
| Preferred Time Period | Any time period between Nov. 15, 2018-Nov. 27, 2018. |
| Number of Resources | 2 |

At 1710, one or more parts of resource system 100 parses the resource request such that the series of time periods identifier, location identifier, rate range identifier, preferred time period range, and number of resources identifier are in a format that may be compatible with one or more search operations to be performed by one or more parts of resource system 100.

At 1715 one or more parts of resource system 100 queries associated memory sets to find a data structure that corresponds to a series of time periods that occur between November 2018 and December 2018 at Location S. One or more parts of resource system 100 may locate a data structure that comprises all series of time periods at Location S between November 2018 and December 2018. Such a data structure may be similar to data structure 1200.

Once the data structure is retrieved, one or more parts of resource system 100 may query the data structure to filter out one or more resources that do not meet one or more resource parameters associated with the resource request. The filtering operation may be iterated for each resource parameter. For example, all resources that are not accessible between Nov. 15, 2018 and Nov. 27, 2018 are filtered out to create a first filtered list. Next, all resources that are not in the rate range of 0-200 are filtered out of the first filtered list to create a second filtered list. Then all instances where two resources are not available next to each other are filtered out of the second filtered list to produce the first matching resource list.

At 1720 one or more parts of resource system 100 may determine an anchor resource parameter to produce the second matching resource list. One or more parts of resource system 100 retrieves user specific data. In this instance, the user specific data is a user's availability. The user's availability may be retrieved via one or more applications related to the user associated with the received resource request. For example, one or more applications may be an email client, and the like. One or more parts of resource system 100 retrieves user availability information that indicates the user associated with the resource request is accessible November 30$^{th}$ and December 1$^{st}$. These times can serve as anchor resource parameters.

Once the user's availability is retrieved, one or more parts of resource system 100 may query the data structure to filter out one or more resources (e.g., resources) that do not meet the anchor resource parameters to produce the second matching resource list. Thus, the second matching resource list may comprise results that are outside the first matching resource list. For example, the second matching resource list may comprise of sets of resources that are valued above the 0-200 rate range and sets of resources that are outside of the Nov. 15, 2018-Nov. 27, 2018 preferred time range.

At 1725, one or more parts of resource system 100 may select a set of matching resources from the first matching resource list and transmit the an indication of the selected matching resource set to a user device associated with the resource request. The selection of the set of matching resources may be determined by a process similar to that described by process 1600. The selected matching resource set can be two adjacent resources for Hamilton on November 20$^{th}$ at Location S. Access tokens associated with the two resources are 100 each.

At 1730, one or more parts of resource system 100 may select a set of matching resources from the second matching resource list and transmit the an indication of the selected matching resource set to a user device associated with the resource request. The selection of the set of matching resources may be determined by a process similar to that described by process 1600. The selected matching resource set can be one row 1 resource for a time period on November 30$^{th}$ at Location S. Access tokens associated with the resource is 150.

Compiling, by a computer system, multiple sets of matching resource list based on two different parameters may allow the selection of one or more access tokens that may not have been search for. Often times user specific data may be a better indicator of user/human tendency than user-provided search data. When a user submits a request he may do so with certain parameters and a first set of access tokens may be indicated to him. At the same time the computer system may perform a second search to indicate a second set of access tokens that may be better suited to the user. For example, a user may search for access tokens for an event that is on Saturday, but according to the user's conversion data for prior time periods, the user has a 40% conversion rate of time periods on Saturday, but a 90% conversion rate of time periods on Sunday. The first set of access tokens indicated to the user may include Saturday events as requested and the second set of access tokens indicated to the user may exclude Saturday time periods and only include Sunday time periods. This machine learning process may enable smarter and more efficient allocation of access tokens.

Figure 18:
FIG. 18 illustrates one or more exemplary embodiments of one or more operations of a resource access-facilitating interaction system.

FIG. 18 illustrates exemplary data structure 1800 that may be generated by one or more parts of resource system 100. A single data structure can be generated for a series of time periods at a particular location. For example, data structure 1800 may be generated for a 10 show run of Hamilton at Location Y. In the depicted embodiment, data structure 1800 is a database object table. Data structure 1800 may reside in a data store internal or external to resource system 100. Data structure 1800 may reside in a MySQL, Oracle, or DB2 database. Data structure 1800 may store all resource information for a series of time periods within a single data structure. Resource information may include resource accessibility, one or more images associated with the resource (e.g., view of a stage from the resource, birds eye view of the location in relation to the resource, etc.), a visiting team such as a sports team performing at the location, rate and/or location information for each resource. As depicted, data structure 1800 indicates availability as a binary value with the value of 1 indicating to one or more parts of resource system 100 that the particular resource is available for a time period. In another embodiment (e.g. as shown by data structure 1200) the availability bits may be depicted as a bitmask.

Figure 19A:
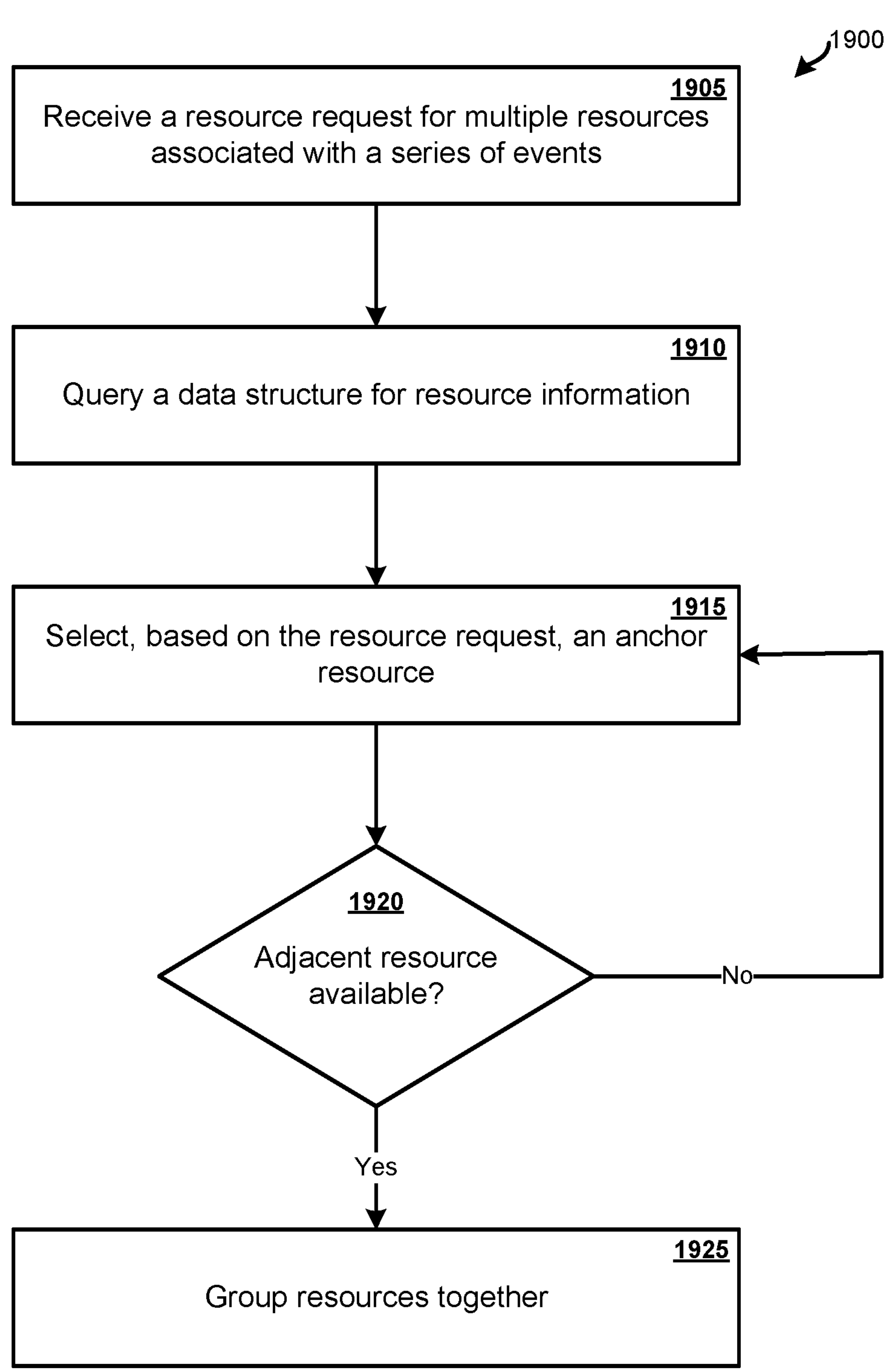
FIG. 19A illustrates one or more exemplary embodiments of one or more data structures of a resource access-facilitating interaction system.
Figure 19B:
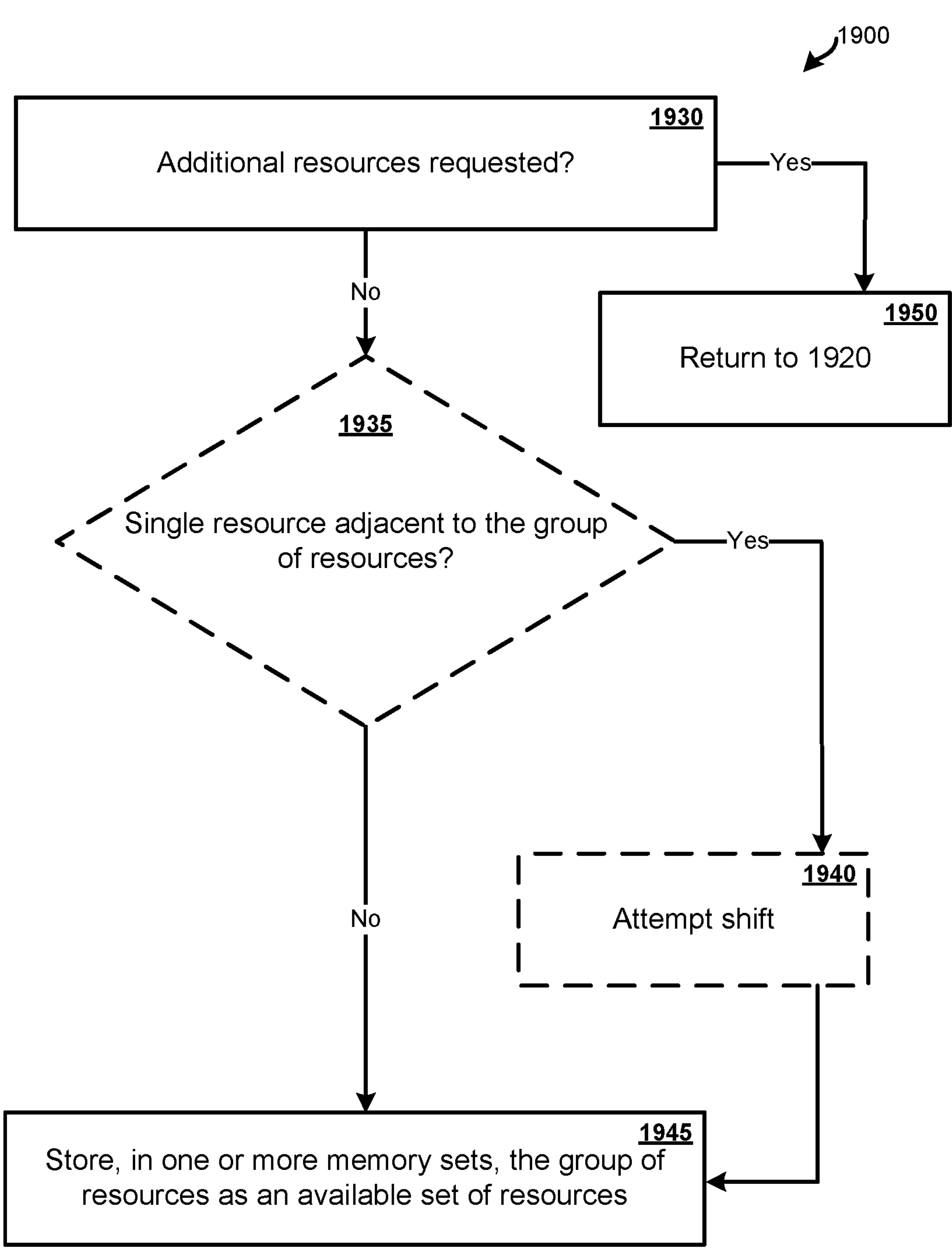
FIG. 19B illustrates one or more exemplary embodiments of one or more data structures of a resource access-facilitating interaction system.
Figure 20:
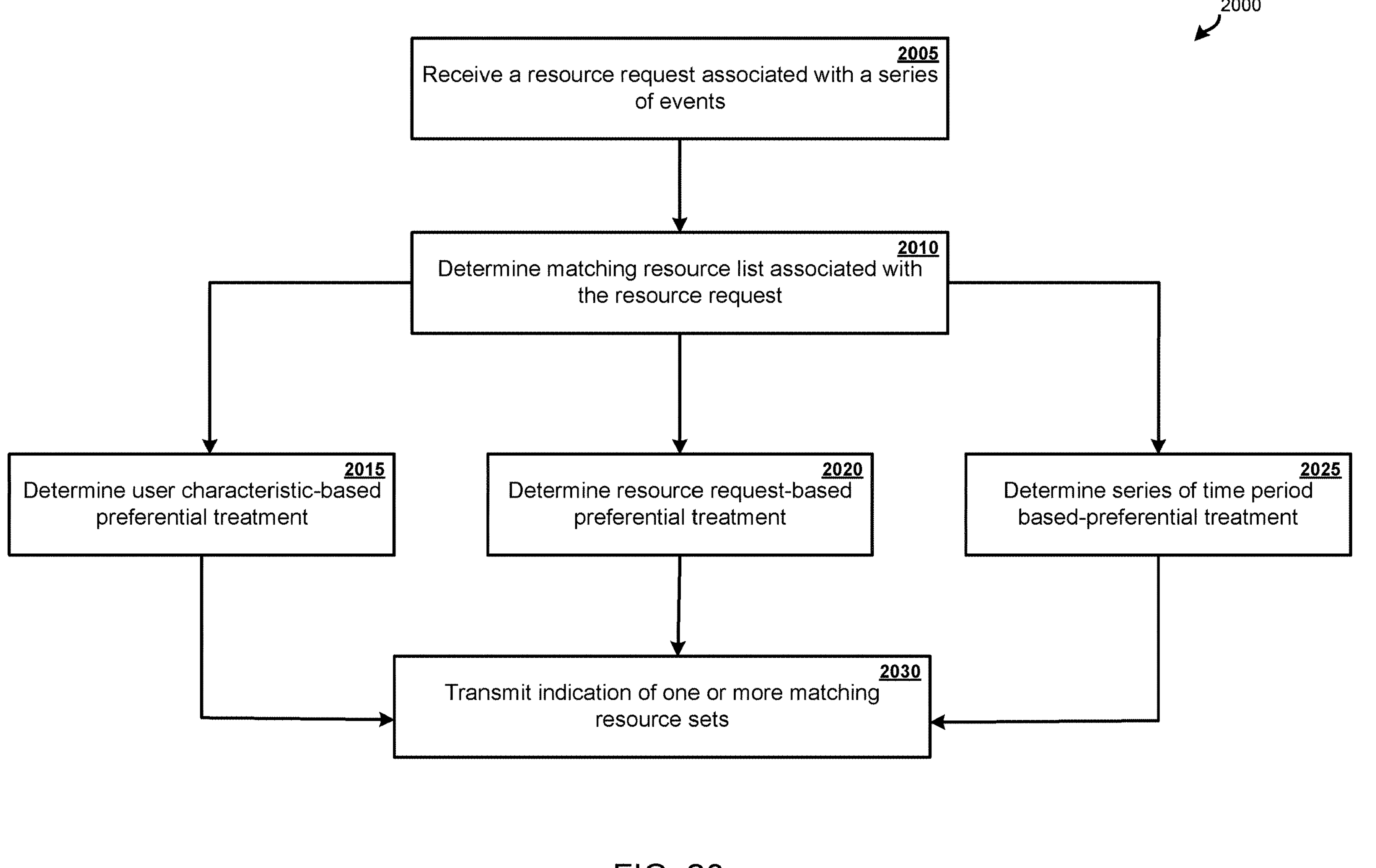
FIG. 20 illustrates one or more exemplary embodiments of one or more operations of a resource access-facilitating interaction system.

FIGS. 19A-19B illustrate an exemplary process 1900 performed by one or more parts of resource system 100. Process 1900 may be a method for determining one or more matching resources based on resource availability for a series of time periods. At 1905, one or more parts of resource system 100 receives a resource request for multiple resources associated with a series of time periods. The request may be transmitted from mobile device 110-1. The resource request may comprise one or more resource parameters such as: a series of time periods identifier, a location identifier, rate ranges, resource location information, number of resources, a coupled value, and the like.

At 1910, one or more parts of resource system 100 queries associated memory sets to find a data structure that corresponds to a series of time periods associated with the received resource request. The resource request may comprise a series of time periods identifier which may be used by one or more parts of resource system 100 to locate a data structure associated with the identified series of time periods. In one embodiment, such a data structure may be data structure 1800 which is a single data structure comprising of resource information for a plurality of resources for a series of time periods.

At 1915, one or more parts of resource system 100 selects, based on the resource request, an anchor resource. Once the data structure is retrieved, one or more parts of resource system 100 may query the data structure to determine the anchor resource. The start of a search for an anchor resource may be determined based on the number of resources requested. For example, for a set of three resources, the anchor resource search may start at resource 6 or resource 5, because these resources may be considered the most desirable since they are centered. For sake of explanation, data structure 1800 will correspond to the retrieved data structure at 1910. One or more parts of resource system 100 first searches for resource 6's accessibility for any time periods in the series of time periods. According to data structure 1800, resource 6 is available for event 10. Thus, resource 6 may be selected as the anchor resource. However, in an instance in which resource 6 is not available, one or more parts of resource system 100 would then determine if resource 5 is available for any time period and if resource 5 is available then it may be selected as the anchor resource. In one embodiment, for a resource request for three resources the anchor resource search may start at resource 6 then move to resource 5 then move to resource 7 then move to resource 4 and the like. In one embodiment, for a set of five resources the anchor resource search may start at resource 6 the move to resource 7, then move to resource 5, then move to resource 8, then move to resource 4 and the like. In one embodiment, the received resource parameters may specify which resource to use to start the resource anchor search. For example, the resource request may have a resource center parameter which indicates a location of a center resource for the group of resources. In such an example, the anchor resource search would start using the resource indicated by the resource center parameter.

At 1920, one or more parts of resource system 100 determines if adjacent resources are available to the anchor resource. Once the anchor resource is selected, one or more parts of resource system 100 may query the data structure to determine if resources adjacent to the anchor resource are available. One or more parts of resource system 100, may perform an AND operation between the availability bits of the anchor resource and one or more resources adjacent to the anchor resource. For example, the anchor resource may be determined to be resource 6 for time period 10. One or more parts of resource system 100 may perform an AND operation between the availability bit for resource 7 and resource 6 for time period 10. According to data structure 1800, this operation would yield a result of 1 as the availability bit for resource 6 and resource 7 are both 1 for time period 10. The same process may be performed for the availability bit for resource 6 and resource 5. According to data structure 1800, this operation would yield a result of 1 as the availability bit for resource 5 and 6 are both 1 for time period 10. In one embodiment, the AND operation may be performed simultaneously for one or more adjacent resources. For example, a single AND operation may be performed which ANDs together the availability bits for resource 5, resource 6, and resource 7. If it is determined by one or more parts of resource system 100 that at least one adjacent resource is available, the adjacent resource(s) and the anchor resource are grouped together at 1925. However, if it is determined by one or more parts of resource system 100 that there is not at least one adjacent resource available, then process 1900 returns to 1915 where another anchor resource may be determined and subsequently one or more adjacent resources may be determined to be available for the new anchor resource.

At 1930, one or more parts of resource system 100 determines if there are additional resources requested according the received resource request. If additional resources are request then process 1900 moves to 1950 and determines one or more additional adjacent resources. Depending on the number of resources requested, one or more parts of resource system 100 may perform additional searches for adjacent resources. For example, if the resource request specifies 5 resources and at 1925 only 2 or 3 resources are grouped together then process 1900 would move to 1920 and one or more parts of resource system 100 would determine if adjacent resources are available. For example, if resources 6, resource 7 and resource 5 are previously grouped together at 1925 then those resources will be treated as a single resource. One or more parts of resource system 100 may then perform one or more AND operations between the grouped resources and resource 4 and resource 8. In one embodiment, at 1920 if one resource adjacent to an anchor resource or group of resources is determined to not be available then the adjacent resource search may extend in only one direct. For example, if resource 6, resource 7, and resource 5 are grouped together at 1925 then one or more parts of resource system 100 may first perform an adjacent resource search for resource 4 and resource 8. However, if resource 4 is available and resource 8 is not, then one or more parts of resource system may perform a second adjacent resource search for resource 3 since resource 3 is adjacent to the now grouping of resources 4-7. It should be noted that resources that are "adjacent" to each other may be adjacent within a particular location (e.g., value) or within a particular data structure.

If no additional resources are requested and the grouping of resources contains the requested number of resources then at 1935, one or more parts of resource system optionally determines if a single resource is adjacent to the group of resources. A single resource may be defined as a resource that does not have at least one available resource next to it in the left or right adjacent direction. For example, for time period 10 if resources 7-9 are a group of resources then resource 10 would be a single resource as there is no available resource next to it and resource 10 is available. If a single resource is determined then process 1900 moves to step 1940 and one or more parts of resource system 100 attempts to shift the group of resources to remove the single resource. For example, for time period 10 if resources 7-9 are a group of resources then resource 10 would be a single resource. One or more parts of resource system 100 would attempt to shift the group of resources to resources 6-8 to leave resources 9 and 10 available. The shift may be performed in a similar manner as the adjacent resource search at 1920. For example, one or more parts of resource system 100 may temporarily remove resource 9 from the group of resources, leaving resources 7 and 8 in the group. One or more parts of resource system 100 may then perform an AND operation between the group of resources (i.e. resources 7-8) with resource 6 to determine if a new group may be formed comprising of resources 6-8. If the attempted shift is successful, resources 6-8 may be the new group of resources. However, if the attempted shift is unsuccessful then the group of resources may remain as resources 7-9 and resource 10 may remain a single resource. In another embodiment, if a single resource remains then one or more parts of resource system 100 may split the group of resources into two smaller groups. For example, if a resource request is received for 5 resources and a group of 5 resources would leave a single resource the resource request may be broken down and treated as a request for 3 resources and a request for 2 resources. By breaking up a potentially large resource request into smaller resource requests it may reduce the probability of a single resource remaining. Single resources are typically resources that may go unfilled. If there are no single resources adjacent to a group of resources or an attempted shift at 1940 is, process 1900 moves to 1945 and one or more parts of resource system 100 stores in memory associated with one or more parts of resource system 100 the group of resources as an available set of resources. These available set of resources may be utilized to determine one or more matching resources as described in processes 1300, 1400, 1700, and other related processes. Process 1900 may be repeated as many times as necessary to determine one or more or all available set of resources for a series of time periods at a particular location.

One or more parts of process 1900 may be implemented to determine if one or more sets of resources that are unavailable. This process may be similar to the process for determining if one or more sets of resources are available. Determining one or more sets of unavailable resources may improve the speed of determining one or more sets of available resources.

Determining, by a computer system, one or more available resources based on an initial resource anchor may allow the computer system to allocate one or more access tokens in a quick efficient manner. Resource anchoring alone or in combination with storing a series of time periods in a single database structure provides a mechanism to allocate inventory for multiple time periods at once at the same speed as allocating inventory for a single time period. Resource anchoring further allows one or more adjacent resources to be located quickly. At in least in part by performing a computationally fast operation (e.g. an AND operation) the computer system may search through the single database structure quickly to determine not only one or more available resources, but one or more unavailable resources for a series of time periods.

Process 2000 may be performed by one or more parts of resource system 100. Process 2000 may be a process that transmits a certain number of options from a matching resource list based on various user characteristics, requested resource parameters, and/or series of time period characteristics. User characteristics may include: a user's past resource history, a user's resource conversion history, a user's accessibility, and a user's previous access tokens associated with one or more time periods.

Requested resource parameters may include one or more parameters associated with a resource request including: a series of time periods identifier, a location identifier, rate ranges, rate limits, resource location information, number of resources, a coupled value and the like.

Series of time period characteristics may include: an overall popularity indicator, a location indicator, an individual time period popularity indicator, series of time periods popularity history, and a high congestion indicator.

The overall popularity indicator may indicate the popularity of a series of time periods. The overall popularity indicator may be determined based on social media mentions, access token allocation, resource requests, search data, and the like.

The location indicator may indicate a particular location where the series of time periods may be performed.

The individual time period popularity indicator may indicate the popularity of a single time period in the series of time periods. The individual time period popularity indicator may be determined based on social media mentions, access token allocation, resource requests, search data, and the like.

The series of time periods popularity history may indicate the historical popularity of a series of time periods. The series of time periods popularity history may be determined based on past social media mentions, past access token allocation, past resource requests, past search data, and the like.

The high congestion indicator may indicate if one or more single time periods in the series of time periods or the series of time periods as whole is in an high congestion period. A high congestion may refer to the commencement of a public high congestion time period where the public may have first access to be allotted one or more access tokens for one or more time periods in the series of time periods. The high congestion indicator may include a timer that indicates an high congestion period. For example, an high congestion period may be 10 minutes or 1 hour. The high congestion period may reflect a time when access tokens requests may be at their highest. An high congestion may be preceded by a period in which a certain allotment of access tokens are distributed prior to the high congestion.

At 2005, one or more parts of resource system 100 receives a resource request associated with a series of time periods. The request may be transmitted from mobile device 110-1. The resource request may comprise one or more resource parameters such as: a series of time periods identifier, an time period identifier, a location identifier, resource location information, a coupled value and the like. From the series of time periods identifier the one or more parts of resource system 100 determines a series of time periods. Once a series of time periods is identified, one or more parts of resource system 100 may retrieve, from one or more sets of memory associated with one or more parts of resource system 100, user characteristics associated with the resource request.

At 2010, one or more parts of resource system 100 determines a matching resource list associated with the resource request. A matching resource list may be defined as a resource or set of resources that satisfies one or more or all resource parameters associated with the resource request. The matching resource list may be determined as described by one or more operations of process 1300.

At 2015, one or more parts of resource system 100 determines user characteristic-based preferential treatment. Preferential treatment may be defined as one or more improvements given to a user or a user device based on one or more factors. The improvements may be applied by modifying, one or more attributes of a communication to a user device. For example, a communication may be sent from one or more parts of resource system 100 to a user device associated with a resource request. The communication may be renderable by the user device and when rendered display one or more access token allocation options. The communication may be configured to only display for a set amount of time or only display a certain amount of access token allocation options. In one embodiment, preferential treatment may entitle a user to one or more access token allocation options. For example, in an high congestion period, a typical user may be transmitted one indicator of a single set of access tokens. With preferential treatment, a user may be transmitted multiple indicators of multiple sets of access tokens. In another example, in an high congestion period, a typical user may be given 30 seconds to confirm an allocation of access tokens. With preferential treatment, a user may be given 60 seconds to confirm an allocation of access tokens.

User characteristic-based preferential treatment may be determined based on one more user characteristics. For example, preferential treatment may be given to a user based on the user's past resource history. In such an example, there may be a certain threshold of allotment of access tokens within the last 2 months that if exceeded will label the user has a high value user. A high value user may be granted, by one or more parts of resource system 100, preferential treatment. In another example, user's previous access tokens associated with one or more time periods may be used to indicate that a particular user has a high probability of accessing (e.g., attending) time periods for which he has been allocated access tokens for. In such an example, there may be a certain threshold for a percentage of time periods accessed that if exceed will indicate the user as a high access user. A high access user may be granted, by one or more parts of resource system 100, preferential treatment. In another example, a user's resource conversion history may be used to indicate that a particular user is a high conversion user. In such an example, there may be a certain threshold for a percentage of resource conversions that if exceeded will indicate that the user as a high conversion user. A high conversion user may be granted, by one or more parts of resource system 100, preferential treatment.

In one embodiment, characteristic-based preferential treatment may result in a user being given preference to recently released resources. During an high congestion period, access tokens associated with one or more resources may be temporarily unavailable as a user decides if confirmation for those access tokens. In circumstances when a user does not confirm the access tokens those access tokens may be released and become available. In such an instance, a user with characteristic-based preferential treatment (or another preferential treatment type) may be automatically presented with the recently released access tokens. For example, a user with characteristic-based preferential treatment may be in the process of confirming access tokens associated with a series of time periods (e.g., at a "checkout" phase). Prior to the user actually confirming the access tokens, another set of access tokens that meet the user's criteria become available. One or more parts of resource system 100 may send a communication to a user device associated with the user that when rendered by the user device alerts the user that another set of access tokens have just become available. The user may then proceed to confirm the newly available access tokens or decline the confirmation of the newly available access tokens. In one embodiment, one or more parts of resource system 100 may include in its matching resource list (at 2010) one or more resources that are temporarily unavailable. By including these resources when determining the matching resource list, one or more parts of resource system 100 may quickly determine if one or more newly available resources better match a user's criteria.

At 2020, one or more parts of resource system 100 determines resource request-based preferential treatment. Resource request-based preferential treatment may be determined based on one or more resource parameters received in the resource request. For example, if the number of resources requested is below a certain threshold a user associated with the request may receive preferential treatment. In such an example, if a resource request indicates a request for 3 resources and the threshold is 2 resources then the user associated with the resource request may not receive preferential treatment. By granting preferential treatment to smaller access token requests, resource system 100 may prioritize smaller access token confirmations first which may prevent mass resource requests from bottlenecking access token allocation during an high congestion period. In one embodiment, preferential treatment may be determined based on the preferred times indicated in a resource request. For example, if a resource request requests access tokens for an unpopular time then the user associated with that resource request may be given preferential treatment.

At 2025, one or more parts of resource system 100 determines series of time period-based preferential treatment. Series of time period-based preferential treatment may be determined based on or more series of time periods characteristics. In one embodiment, one or more parts of resource system 100 may compare the popularity of a series of time periods to a threshold value and if the popularity of a series does not exceed the threshold granting preferential treatment to users associated with resource requests for one or more time periods in the series of time periods. For example, if a series of time periods has less than 100 access tokens allocated in the last hour the series of time periods may be labeled as unpopular and preferential treatment may be given to users associated with resource request for time periods within the series of time periods.

At 2030, one or more parts of resource system 100 transmits an indication of one or more matching resource sets to a user device associated with the received resource request. The indication of one or more matching resource sets may be modified, by one or more parts of resource system 100, based on preferential treatment determined at 2015, 2020, or 2025. The modification of the indication may include extending a timer for which a selection of confirmation of access tokens remains valid. For example, in an high congestion period, a user may typically be given 30 seconds to confirm access tokens once the transmission has been sent from one or more parts of resource system 100. However, if preferential treatment has been identified, for example, by user characteristics then the timer may be modified to be 60 seconds, giving the user more than usual time allotment to make the confirmation decision. In one embodiment, the time to confirm an access token allocation and/or the number of access token allocations transmitted may be modified based on preferential treatment. For example, in an high congestion period, a user may typically be presented with only one access token allocation option (e.g., one set of resources). However, if preferential treatment has been identified by series of time periods characteristics, the access token allocations options may be increased (e.g. two set of resources.) In one embodiment there may be a multiple types of preferential treatment applied. For example, a first improvement of extended select time may be granted if preferential treatments is granted at 2015, then a second improvement of extended options may be granted if preferential treatment is granted at 2015 or 2020.

In one embodiment, the resource request itself may be modified according to preferential treatment. A resource request may be modified to be transmitted to a priority a queue which may be processed faster than a typical resource request. For example, if a user associated with a resource request is determined to be a high value user then resource requests associated with the high value user may be added to a priority queue while request associated with non-high value users may go into a standard queue. In some embodiments, the priority queue may be processed prior to the standard queue.

Modifying communications, by a computer system, based on characteristics associated with a user, characteristics associated with a user request, and/or characteristics of a requested object may allow for more efficient processing of access token requests. For example, it may be preferred to prioritize access token requests for a small amount of access tokens over access token requests for a vast amount of access tokens. The time to process a request for a vast amount of access tokens may cause a bottleneck for the system. In another example, it may be preferential to prioritize high value users over low value users or users that actually make use of access tokens instead of those users who customarily redistribute those access tokens.

Figure 21:
FIG. 21 illustrates one or more exemplary embodiments of one or more data structures of a resource access-facilitating interaction system.

FIG. 21 illustrates exemplary data structure 2100 that may be generated by one or more parts of resource system 100. A single data structure can be generated for a series of time periods at a particular location. For example, data structure 2100 may be generated for specific time periods of a series of time periods (e.g., all home basketball games at Location B for a season). For sake of explanation, data structure 2100 is only shown with 10 time periods, but it is within the scope of the disclosure for data structure 2100 to include all time periods at a particular location for a particular season. In the depicted embodiment, data structure 2100 is a database object table. Data structure 2100 may reside in a data store internal or external to resource system 100. Data structure 2100 may reside in a MySQL, Oracle, or DB2 database. Data structure 2100 may store all resource information for a series of time periods within a single data structure. Resource information may include resource availability, one or more images associated with the resource (e.g., view of a stage from the resource, birds eye view of the location in relation to the resource, etc.), a visiting team, rate and/or location information for each resource. As depicted, data structure 2100 indicates availability as a binary value with the value of 1 indicating to one or more parts of resource system 100 that the particular resource is available for a time period. In another embodiment (e.g. as shown by data structure 1200) the availability bits may be depicted as a bitmask.

Figure 22:
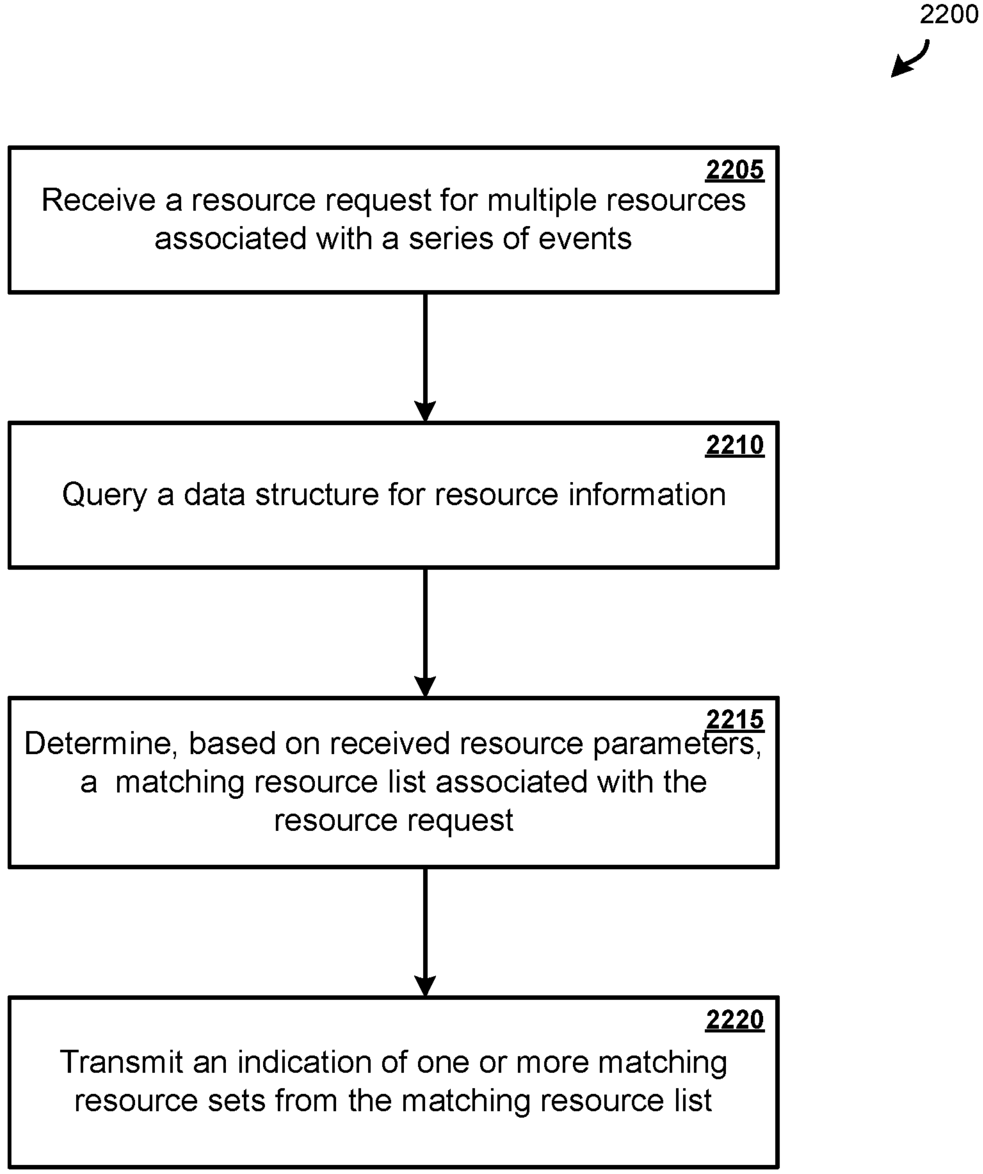
FIG. 22 illustrates one or more exemplary embodiments of one or more operations of a resource access-facilitating interaction system.
Figure 23:
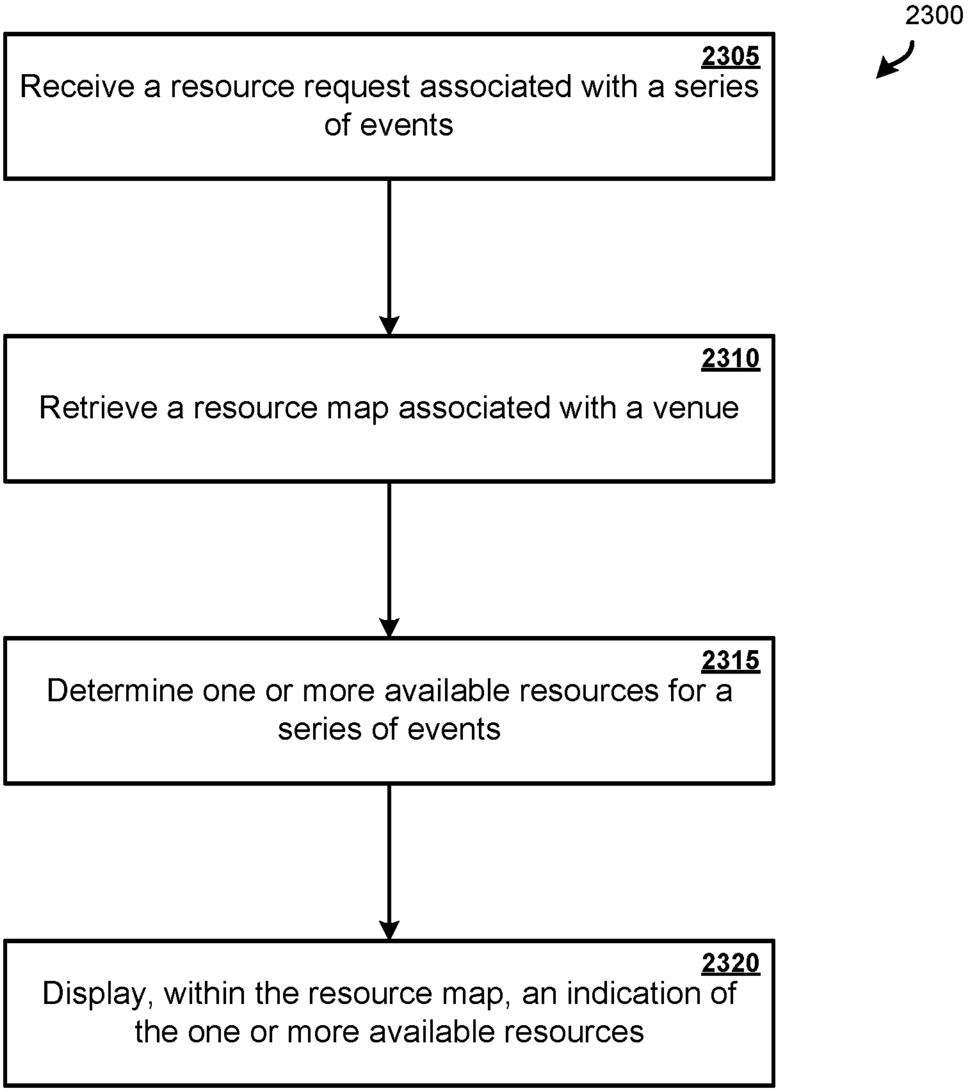
FIG. 23 illustrates one or more exemplary embodiments of one or more operations of a resource access-facilitating interaction system.
Figure 24:
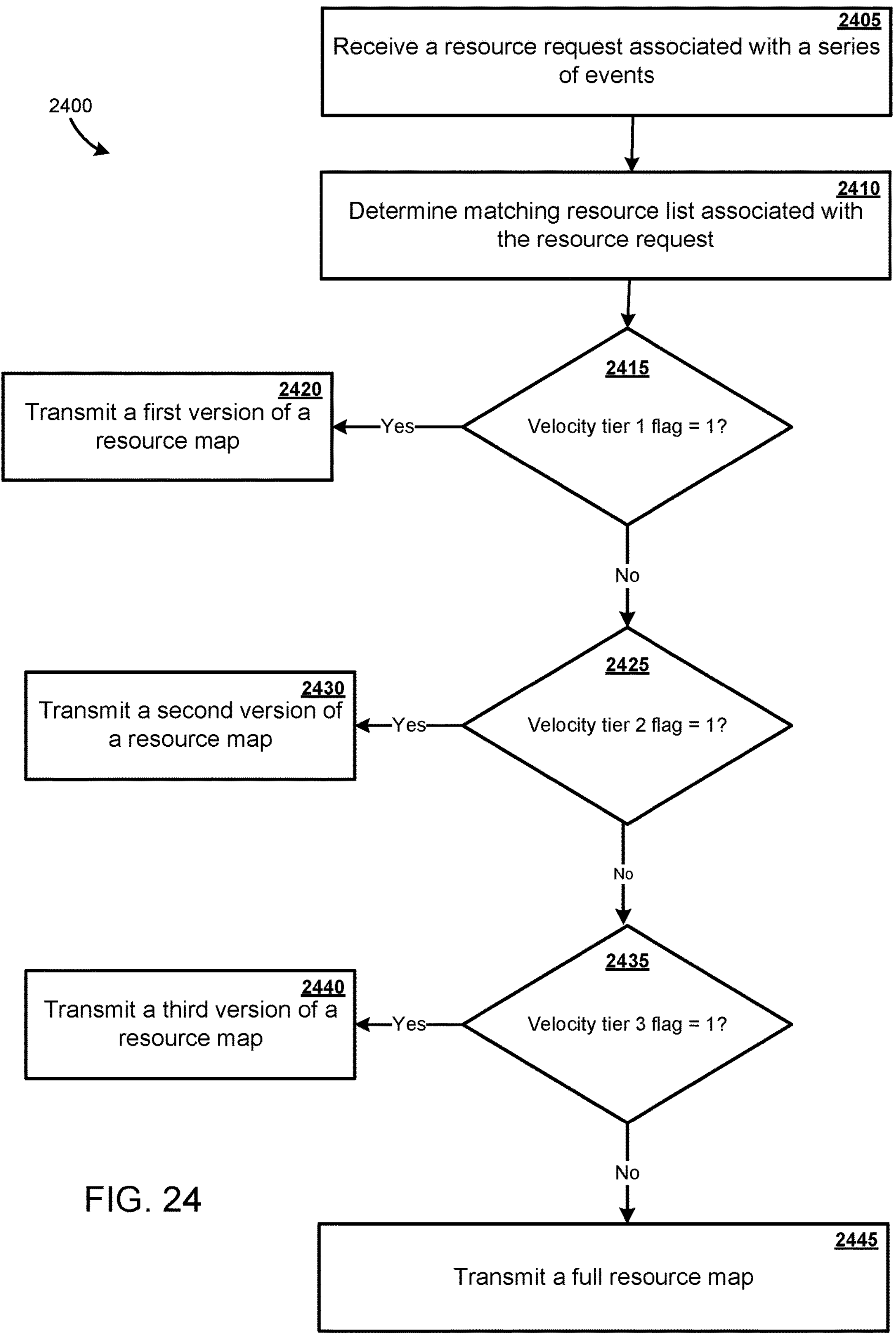
FIG. 24 illustrates one or more exemplary embodiments of one or more operations of a resource access-facilitating interaction system.

FIG. 22 illustrates an exemplary process 2200 performed by one or more parts of resource system 100. Process 2200 may be a method for determining the availability of a resource or set of resources across multiple time periods. At 2205, one or more parts of resource system 100 receives a resource request for multiple resources associated with a series of time periods. The request may be transmitted from mobile device 110-1. The resource request may comprise one or more resource parameters such as: a series of time periods identifier, a location identifier, preferred times, preferred times, rate ranges, rate limits, resource location information, blackout times (e.g., times a user is inaccessible), number of resources, a coupled value and the like. In one embodiment, the resource request may specify a particular resource location and this resource location may be for all time periods in the series of time periods. In one embodiment, the resource request may include a visiting team identifier to identify one or more visiting teams.

At 2210, one or more parts of resource system 100 queries associated memory sets to find a data structure that corresponds to a series of time periods associated with the received resource request. The resource request may comprise a series of time periods identifier which may be used by one or more parts of resource system 100 to locate a data structure associated with the identified series of time periods. In one embodiment, such a data structure may be data structure 2100 which is a single data structure comprising of resource information for a plurality of resources for a series of time periods.

At 2215, one or more parts of resource system 100 determines, based on the received resource parameters, a matching resource list associated with the resource request. As described in relation to FIG. 21 each series of time periods for a particular location may have a corresponding data structure. An example of such a data structure is embodied by data structure 2100 as shown in FIG. 21. A matching resource may be defined as a resource or set of resources that satisfies one or more or all resource parameters associated with the resource request. For example, a resource request may be received that comprises:

| Parameter | Value |
| --- | --- |
| Series of Time Period Identifier | Time Periods 1-6 |
| Location Identifier | Location B |
| Number of Resources | 1 |

In response, one or more parts of resource system 100 queries the data structure retrieved at 2205 to filter out one or more resources that do not meet one or more resource parameters associated with the resource request. One or more or parts of resource system 100 may perform a search operation based on the received number of resources parameter to determine if a same resource is available for the time periods. To perform the search operation, in one embodiment, one or more parts of resource system 100 performs an AND operation between the availability bits of one or more time periods for a particular resource in the database structure. For example, data structure 2100 depicts an availability bit of 1 if that resource is available for a particular time period. To perform the AND operation, in one embodiment, a first resource is chosen as an anchor. An anchor may be a resource that is a starting point for an availability search for multiple resources. For example, resource 6 is determined to be an anchor because it is in the middle of a row of resources. Once resource 6 is determined to be the anchor an AND operation may be performed between the availability bits of resource 6 for all time periods. For example, the and operation would have as an input 0, 0, 0, 0, 0, 0, 0, 0, 0, 1 which indicates resource 6 is only available for time period 10 against team 4. The result of the AND operation would be 0. The anchor resource may then be changed to a different resource and the AND operation is repeated. In another embodiment, one or more parts of resource system 100 may perform a linear progression. For example, resource 1 would be chosen as the anchor resource because it is the first resource and the AND operation would be performed on the availability bits for all time periods for resource 1. Next, the same process would be performed on resource 2, then resource 3, and so forth. In the depicted embodiment as shown by data structure 2100, resource 9 is the only resource for which the AND operation would return a 1, indicating that resource 9 is available for all 10 time periods. Using an AND operation allows the availability determination for multiple resources to be performed by a single assembly language process, which may increase the speed of search.

Depending on how many resource parameters are received, one or more parts of resource system 100 may perform additional search operations and subsequent filtering. For example, the received resource request may include resource parameters that may include cost parameters that indicate a rate range of $0-$200. In such an instance, the result for the AND operation may form a first list and this list may be further reduced by filtering out resources that are not within the rate range. Once the received parameters have been applied via one or more filtering operations the resulting resources may be added to a matching resource list.

In one embodiment, one or more parts of resource system 100 may receive a resource request that specifies a visiting team (at 2205.) In such an instance, one or more parts of resource system 100 may perform a first filter operation to filter out availability bits that correspond to time periods not involving the identified visiting team. For example, a resource request may identify team 2. In response, one or more parts of resource system 100 may only perform an AND operation for availability bits related to time period 2, and time period 8 as shown in data structure 2100. The AND operation for team 2 would return a 1 value for resource 1, resource 2, resource 9, and resource 10 indicating that these resources are available for each home against team 2. Resources 1, 2, 9, and 10 may be added to a matching resource list. By only performing the AND operation between certain bits, the speed of the search operation may be increased.

In one embodiment, one or more parts of resource system 100 may perform two availability bit operations. The first availability bit operation may be a vertical AND operation to determine the availability of a resource across multiple time periods in a series of time periods (e.g., availability for certain visiting teams.) In the vertical AND operation, the availability bits of a resource for particular time periods are ANDed together. The second availability bit operation may be a horizontal AND operation to determine the availability of a set of resources for the same time period. In the horizontal AND operation, the availability bits of resources for a single time period are ANDed together. In one embodiment, process 2200 uses a vertical AND operation and process 1900 uses a horizontal AND operation. A vertical AND operation may be used in combination with a horizontal AND operation to determine a set of available resources for particular time periods.

At 2220, one or more parts of resource system 100 may transmit an indication of one more sets of matching resources for the series of time periods. The transmission may be sent to mobile device 110-1 or another device associated with the resource request at 2205. The transmission may indicate one more matching resources and one or more details corresponding to the matching resources such as: rate of the resources, location of the resources, an interactive resource map of the location, a timer to confirm access tokens for the resources, and the like. Once a user receives the transmission, via a user device, she may confirm access tokens for one or more sets of matching resources.

Performing, by a computer system, one or more AND-based operations on availability bits of resources allows for a fast and efficient determination on which access tokens are available for a plurality of time periods. In part by storing availability bits in a single database structure, a myriad of searching operations may be available to quickly determine one or more sets of available access tokens. Typically, each time period may have its own data structure that stores resource information. Thus searching for available resources across multiple time periods may require searching multiple data structures, which is not efficient.

Process 2300 may performed by one or more parts of resource system 100. Process 2300 may be a process for determining and rendering an interactive resource map that illustrates a plurality of accessible resources across different time periods.

At 2305, one or more parts of resource system 100 receives a resource request associated with a series of time periods. The request may be transmitted from mobile device 110-1. The resource request may comprise one or more resource parameters (e.g., resource restrictions) such as: a series of time periods identifier, a location identifier, resource location information, number of resources, a coupled value, and the like.

At 2310, one or more parts of resource system 100 retrieves a resource map associated with a location identified in the received resource request. The received resource parameter may comprise a location identifier or a series of time periods identifier (i.e. series identifier). One or more parts of resource system 100 may retrieve a resource map associated with a location based on the location identifier or a series identifier. In one embodiment, one or more parts of resource system 100 may query one or more sets of memory associated with resource system 100 to locate a previously stored resource map of a location. In one embodiment, one or more parts of resource system 100 may send a request for a resource map to an event provider for an identified location. In one embodiment, one or more parts of resource system 100 may perform one or more search operations via a network enabled connection to locate a resource map associated with the identified location. The resource map may comprise of a layout of one or more resources at a particular location. The resource map may also include various structural elements of the location (e.g., columns, pillars, and the like)

At 2315, one or more parts of resource system 100 determines one or more accessible resources for a series of time periods. The determination of one or more accessible resources may be determined by operations similar to those described in processes 1300, 1400, 1700, 1900, 2000, and/or 2200. In one embodiment, resources in a matching resource list as described in one or more of the disclosed processes may be equivalent to accessible resources. In one embodiment, a different process may be used to identify accessible resources.

At step 2320, one or more parts of resource system 100 configures for rendering within the resource map an indication of the one or more accessible resources. The resource map with the indications may be generated at one or more parts of resource system 100 and sent to a user device associated with the received resource request. In one embodiment, one or more parts of resource system 100 may render resource interactive display (e.g., interactive map) with the indications. The indications may include a graphical indication of one or more accessible resources. For example, a graphical indication may be a color, a highlight, or any other indication that would graphical distinguish an accessible resource from a non-accessible resource. In one embodiment, each time period in a series of time periods may have a particular indication. In such an embodiment, when the same resource is accessible for multiple time periods the resource may have multiple indicators indicating that the resource is accessible for multiple time periods. For example, a resource may be graphically presented in two different colors with each color corresponding to a different time period. In one embodiment, the indication may be an interactive information box that, when interacted with, illustrates one or more time periods for which the resources are accessible. In one embodiment, the indication may include accessibility information of resources next to the accessible resources. For example, the indication may illustrate if a resource next to (e.g., in front, adjacent to, behind, etc.) the accessible resource is accessible. Such an embodiment may be advantageous when an adjacent resource is accessible, but is not illustrated as accessible because the resource does not meet other resource parameters illustrated in the resource request. For example, a resource next to an illustrated accessible resource may be accessible, but is not within a rate range specified by the resource request received at 2305. An indication may also include other data related to a resource such as the resource location, resource rate, an image associated with the resource, a timer associated with how long access tokens for the resource will be accessible to the user, and the like.

In one embodiment, after a first resource is determined for a series of time periods (e.g., 1315, 1715, 1915 and the like) one or more parts of resource system 100 may immediately filter out all resources that do not share at least one time period with the selected resource. Such an embodiment may be useful when two adjacent resources cannot be selected together even if the indications within the resource map (e.g., color of resources, highlighting of resources, and the like) do not make it graphically apparent to the user. For example, any resources not sharing at least one time period with the selected resource may be completely blacked out so the resources may appear un-engagable to a user using the interactive resource map. Immediately filtering out resources Indicating, by a computer system, within a resource map, a visual indication of one or more accessible resources and information about one or more accessible resources is an improvement to information rendering for a graphical user interface. Information communicated graphically may be quicker and easier to understand for a user than information merely presented in long text format. In instances like an high congestion period where speed is critical to functionality, rendering information graphically to a user may implement quicker selection and allocation of access tokens. For example, a user may have only thirty seconds to confirm an access token allocation. If the information related to the access token is graphically rendered (e.g., the location of the resource on a resource map) then the user may be able to quickly confirm the access token allocation.

Velocity Based Resource Map

Process 2400 may be performed by one or more parts of resource system 100. Process 2400 may be a process that transmits a certain version of a resource map based on velocity. Velocity may be defined as the amount of communications received by one or more parts of resource system 100 related to a particular object. An object may be a series of time periods, an time period in a series of time periods, or a segment of a location (e.g., the front row) and the like.

At 2405, one or more parts of resource system 100 receives a resource request associated with a series of time periods. The request may be transmitted from mobile device 110-1. The resource request may comprise one or more resource parameters such as: a series of time periods identifier, an event identifier, a location identifier, preferred times, preferred dates, rate ranges, rate limits, resource location information, blackout times and dates, number of resources, a sit together value and the like. From the series of time periods identifier, one or more parts of resource system 100 determines a series of time periods. Once a series of time periods is identified, one or more parts of resource system 100 may retrieve, from one or more sets of memory associated with one or more parts of resource system 100, one or more velocity tier flags associated with the identified series of time periods. A velocity tier flag may be a binary value that indicates a particular popularity of an object based on velocity. A value of a velocity tier flag may be set according to process 1500. In one embodiment, there are multiple velocity tier flags and each flag is equal to one when a certain amount of communications related a series of time periods exceeds a respective threshold.

At 2410, one or more parts of resource system 100 determines a matching resource list associated with the resource request. A matching resource list may be defined as a resource or set of resources that satisfies one or more or all resource parameters associated with the resource request. The matching resource list may be determined as described by one or more operations of process 1300.

At 2415, one or more parts of resource system 100 determines if a velocity tier 1 flag is equal to one. One or more parts of resource system 100 may query one or more sets of memory associated with resource system 100 to retrieve the velocity tier 1 flag. The velocity tier 1 flag may indicate the velocity for resource requests for a series of time periods is above a first threshold. For example, a velocity tier 1 flag may be set to one in circumstances when there are over 300 resource requests for a series of time periods within a time frame (e.g. 5, 10, 15, 20 minutes etc.) This very high velocity rate may indicate that the series of time periods is in very high demand. In one embodiment, the velocity tier 1 flag may indicate a certain time range since the start of an high congestion period. For example, a velocity tier 1 flag may be set to one in circumstances when it is within 10 minutes after the start of public high congestion for the series of time periods or an time period in the series of time periods. This time range may indicate an anticipated very high volume period.

If the velocity tier 1 flag is equal to one then at 2420, one or more parts of resource system 100 transmits a first version of a resource map with one or more matching resources from the matching resource list identified within the resource map. In one embodiment, the first version of a resource map may only display a location associated with one or more matching resources and the location of a stage or performance area. The transmission may be configured to be rendered by a user device. In one embodiment, the transmission includes a timer that may be rendered, along with the interactive resource map, by the user device. The timer may indicate how long the user has to acquire access tokens for the indicated matching resource set. In one embodiment, one or more parts of resource system 100 puts a temporary hold on the access tokens associated with the indicated matching resource set. The temporary hold may be removed when the timer expires. The temporary hold may block any other user devices from obtaining the access tokens associated with the indicated matching resource set while the timer is not expired. The temporary hold may also prevent parallel threads from attempting to grant the same access tokens to different users at the same time.

In circumstances when velocity tier 1 flag is not equal to one then at 2425, one or more parts of resource system 100 determines if a velocity tier 2 flag is equal to one. One or more parts of resource system 100 may query one or more sets of memory associated with resource system 100 to retrieve the velocity tier 2 flag. The velocity tier 2 flag may indicate the velocity for resource requests for a series of time periods is above a second threshold. For example, a velocity tier 2 flag may be set to one in circumstances when there are over 200 resource requests for a series of time periods within a time frame (e.g. 5, 10, 15, 20 minutes etc.) This high velocity rate may indicate that the series of time periods is in high demand. In one embodiment, the velocity tier 2 flag may indicate a certain time range since the start of an high congestion period. For example, a velocity tier 2 flag may be set to one in circumstances when it is within 15 minutes after a public high congestion has started for a series of time periods or an time period in the series of time periods. This time range may indicate an anticipated high volume of demand.

If velocity tier 2 flag is equal to one then at 2430, one or more parts of resource system 100 transmits an indication of up to two matching resource sets from a matching resource list. In one embodiment, the second version of a resource map may be a more detailed resource map than the first version of the resource map. The second version of the resource map may include all of the details of the first version of the resource map but may also contain additional details. For example, the second version of the resource map may depict resources surrounding the one or more matching resource sets. The transmission may be configured to be rendered by the user device. In one embodiment, the transmission includes a timer that may be rendered by the user device. In one embodiment, one or more parts of resource system 100 puts a temporary hold on the access tokens associated with the indicated matching resource sets.

In circumstances when velocity tier 2 flag is not equal to one then at 2435, one or more parts of resource system 100 determines if a velocity tier 3 flag is equal to one. One or more parts of resource system 100 may query one or more sets of memory associated with resource system 100 to retrieve the velocity tier 3 flag. The velocity tier 3 flag may indicate the velocity for resource requests for a series of time periods is above a third threshold. For example, a velocity tier 3 flag may be set to one in circumstances when there are over 100 resource requests for a series of time periods within a time frame (e.g. 5, 10, 15, 20 minutes etc.) This velocity rate may indicate that the series of time periods is in mild demand. In another embodiment, the velocity tier 3 flag may indicate a certain time range since the start of an high congestion period. For example, a velocity tier 3 flag may be set to one in circumstances when it is within 30 minutes after the start of a public high congestion for a series of time periods or an time period in the series of time periods. This time range may indicate an anticipated mild volume of demand.

If velocity tier 3 flag is equal to one then at 2440, one or more parts of resource system 100 transmits a third version of a resource map. The third version of the resource map may be a more detailed resource map than the second version. The third version of the resource map may include all of the details of the first and second resource maps but contain additional details. For example, the third version of the resource map may comprise additional details about the location such as structures (e.g. columns, balconies, stairs, elevators), concession stands, restrooms and the like The transmission may be configured to be rendered by the user device. In one embodiment, the transmission includes a timer that may be rendered by the user device. In one embodiment, one or more parts of resource system 100 puts a temporary hold on the access tokens associated with the indicated matching resource sets.

In circumstances when velocity tier 3 flag is not equal to one then at 2445, one or more parts of resource system 100 transmits a full resource map. The full resource map may comprise the first version, second version, and third version of the resource map as well as additional information. For example, the full resource map may include location specific information such as parking location relative to an indicated resource, location size, the amount of resources currently sold, information about one or more performers, and the like The transmission may be configured to be rendered by the user device. In one embodiment, the transmission includes a timer that may be rendered by the user device. In one embodiment, one or more parts of resource system 100 puts a temporary hold on the access tokens associated with the indicated matching resource sets.

In one embodiment, processes associated with 2415, 2425, and 2435 may be performed in a linear fashion such that a first check is performed to determine if velocity tier 1 flag is equal to one, then a second check is performed to determine if velocity tier 2 flag is equal to one, then a third check is performed to determine if velocity tier 3 flag is equal to one and so forth. In one embodiment, process 1600 may be utilized for an high congestion period.

Each version of the resource map may be layered onto the previous version to produce the subsequent version of the resource map. For example, the first version of a resource map may contain only an indication of matching resource sets. To produce the second version of the resource map additional data may be layered onto the first version of the resource map. For example, data for displaying resources surrounding the indicated resources may be sent after the first version of the resource map has been sent and when rendered together with the first version of the resource map produces the second version of the resource map that comprises the indicated matching resource sets as well as the resources around the indicated matching resource sets. It may be advantageous to slowly add more detail to a resource map (which requires more data) when other resources of a system are relaxed (e.g., the system is not processing a high volume resource requests.)

In one embodiment, process 2400 may be combined with process 1600 to produce a first version of a resource map that indicates only a first set of matching resources, a second version of a resource map that includes two sets of matching resources, and a third version of a resource map that includes three sets of matching resources.

Determining, by a computer system, certain operations to perform based on a velocity of communication pertaining to a particular object may improve the speed and efficiency of a computer system for data processing. In times of low demand for access tokens, a resource map may be generated with extreme detail. However, when demand is high for access tokens a resource map may be generated with very low detail. Such a system, enables system resources to be prioritized to process request and allocate access tokens, which is especially beneficial when a temporary hold is used while a user is making a decision. If computer resources are used to generate detailed resource maps it may prevent those same resources from being used to allocate access tokens, which could potentially bottleneck a system. The system and methods presented here within may aid in preventing a resource bottleneck as in periods of high demand. At the same time the visual indication of the options presented to the user will aid in the decision making process.

Each operation or process described may be used individually or combined with one or more other operations or processed described. For example, process 1600 may be used to provide an indication of resources based upon velocity and those indicated resources may be determined by process 1900 and/or process 1400.

Specific details are given in the above description to provide a thorough understanding of the embodiments. However, it is understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, access token passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium", "storage" or "memory" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

The invention claimed is:

1. A computer-implemented method for determining a set of available tickets for admittance to an event, the computer-implemented method comprising:

receiving, by a computer system, a ticket request from a user device associated with a user, the ticket request comprising a series of time periods identifier identifying a first plurality of time periods to utilize a requested set of tickets and a location identifier identifying a location to utilize the requested set of tickets, and a ticket number identifying an amount of tickets within the requested set of tickets, wherein the ticket request is for one or more tickets to the event;

querying, a ticket database system, based at least in part on the series of time periods identifier and the location identifier to identify a first database object comprising a first plurality of tickets associated with the series of time periods identifier and the location identifier, the first plurality of tickets comprising one or more first events that occur at a first plurality of time periods at a first location, and wherein each database object within the ticket database system is associated with a different plurality of tickets;

receiving, by the computer system, a ticket parameter identifying one or more ticket restrictions, the one or more ticket restrictions being used to filter the one or more first events included in the first plurality of tickets;

filtering, by the computer system, the first plurality of tickets into a second plurality of tickets based at least in part on the one or more ticket restrictions of the ticket parameter, the second plurality of tickets comprising one or more second events that occur at the first plurality of time periods at the first location;

determining, by the computer system, resource history of the user, wherein:

the resource history indicates genre of a plurality of ticket request sent by the user in past and one or more locations preferred by the user in past;

ranking, by the computing system, each of the second plurality of tickets based on the resource history of the user and user availability;

determining, by the computer system, a user characteristic-based preferential treatment based on the resource history, the user characteristic-based preferential treatment being one or more improvements provided to the user or the user device based on one or more user characteristics;

selecting, by the computer system, a third plurality of tickets based on the user availability from the second plurality of tickets based on a rank of each of the second plurality of tickets, wherein the third plurality of tickets includes a set of highest ranked tickets from the second plurality of tickets;

generating, by the computer system, an access token to simultaneously access at least two or more tickets from the third plurality of tickets at a time from the first plurality of time periods, wherein the access token is generated upon meeting of a bot-detection condition;

determining priority level for the user to receive access token based on identifying if the ticket request is associated with inputs from a bot;

modifying one or more attributes of communication between the computer system and the user device based on the one or more improvements, wherein modifying the one or more attributes of communication comprises extending time for confirmation of allocation of the access token from a first duration to a second duration, the time being extended for the user or the user device provided with the user characteristic-based preferential treatment, and the second duration being greater than the first duration; and transmitting, by the computer system, an indication of the third plurality of tickets to the user device associated with the ticket request, wherein each ticket of the third plurality of tickets is associated with a demand indicating a number of communications received for each ticket, and wherein the demand defines a length of a duration during which the number of communications received for each ticket exceeds a threshold of a plurality of thresholds, after start of a public on sale for the third plurality of tickets, wherein:

where the demand is high, the length is decreased, where the demand is low, the length is increased, when the demand is greater than a first threshold of the plurality of thresholds, a first set of tickets from the third plurality of tickets and a first version of an interactive resource map are transmitted to the user device, the first version of the interactive resource map displays a first graphical details including locations of a first set of resources corresponding to each ticket of the first set of tickets, when the demand is less than the first threshold and greater than a second threshold of the plurality of thresholds, a second set of tickets from the third plurality of tickets and a second version of the interactive resource map are transmitted to the user device, the second set of tickets is greater than the first set of tickets and includes the first set of tickets, the second version of the interactive resource map displays second graphical details including a plurality resources surrounding a second set of resources corresponding to each ticket of the second set of tickets and a timer indicating a time period during which the user device can acquire the second set of tickets, the second graphical details further include entirety of the first graphical details of each ticket of the first set of tickets, when the demand is less than the second threshold and greater than a third threshold of the plurality of thresholds, a third set of tickets from the third plurality of tickets and a third version of the interactive resource map are transmitted to the user device, the third set of tickets is greater than the second set of tickets and includes the second set of tickets, the third version of the interactive resource map displays third graphical details including structures surrounding a third set of resources corresponding to each ticket of the third set of tickets, the third graphical details further include entirety of the second graphical details of each ticket of the second set of, and when the demand is less than the third threshold, the third plurality of tickets are transmitted to the user device.

2. The computer-implemented method of claim 1, wherein the first database object further comprises accessibility bitmasks associated with each ticket of the first plurality of tickets, the accessibility bitmasks comprising bit values that indicate an accessibility of a ticket of the first plurality of tickets at a different time within the first plurality of time periods.

3. The computer-implemented method of claim 2, further comprising:

performing, by the computer system, one assembly language process to compare accessibility bitmasks of a first ticket in the third plurality of tickets and accessibility bitmasks of a second ticket in the third plurality of tickets to determine one or more time periods of the first plurality of time periods that both the first ticket in the third plurality of tickets and the second ticket in the third plurality of tickets are available.

4. The computer-implemented method of claim 2, further comprising:

performing, by the computer system, one assembly language process to compare accessibility bitmasks of a third ticket in the third plurality of tickets and accessibility bitmasks of a fourth ticket in the third plurality of tickets to determine one or more time periods of the first plurality of time periods that both the third ticket in the third plurality of tickets and the fourth ticket in the third plurality of tickets are not available.

5. The computer-implemented method of claim 1, further comprising:

receiving, by the computer system from the user device, a selected ticket identifier comprising an indication of at least two or more tickets from the third plurality of tickets and a particular time period identifier of the first plurality of time periods; and generating, by the computer system, the access token to simultaneously access the at least two or more tickets from the third plurality of tickets at a time identified by the particular time period identifier of the first plurality of time periods.

6. The computer-implemented method of claim 5, wherein the selected ticket identifier further comprises a particular location identifier, and wherein one or more access tokens are valid only at particular location identified by the particular location identifier.

7. The computer-implemented method of claim 5, wherein the selected ticket identifier comprises an indication of at least three or more tickets from the third plurality of tickets.

8. A non-transitory computer-readable storage medium having stored thereon instructions for causing at least one computer to determine a set of available resources for admittance to an event, the instructions comprising:

receiving, by a computer system, a ticket request from a user device associated with a user, the ticket request comprising a series of time periods identifier identifying a first plurality of time periods to utilize a requested set of tickets and a location identifier identifying a location to utilize the requested set of tickets, and a ticket number identifying an amount of tickets within the requested set of tickets, wherein the ticket request is for one or more tickets to the event;

querying, a ticket database system, based at least in part on the series of time periods identifier and the location identifier to identify a first database object comprising a first plurality of tickets associated with the series of time periods identifier and the location identifier, the first plurality of tickets comprising one or more first events that occur at a first plurality of time periods at a first location, and wherein each database object within the ticket database system is associated with a different plurality of tickets;

receiving, by the computer system, a ticket parameter identifying one or more ticket restrictions, the one or more ticket restrictions being used to filter the one or more first events included in the first plurality of tickets;

filtering, by the computer system, the first plurality of tickets into a second plurality of tickets based at least in part on the one or more ticket restrictions of the ticket parameter, the second plurality of tickets comprising one or more second events that occur at the first plurality of time periods at the first location;

determining, by the computer system, resource history of the user, wherein:

the resource history indicates genre of a plurality of ticket request sent by the user in past and one or more locations preferred by the user in past;

ranking, by the computing system, each of the second plurality of tickets based on the resource history of the user and user availability;

determining, by the computer system, a user characteristic-based preferential treatment based on the resource history, the user characteristic-based preferential treatment being one or more improvements provided to the user or the user device based on one or more user characteristics;

selecting, by the computer system, a third plurality of tickets based on the user availability from the second plurality of tickets based on a rank of each of the second plurality of tickets, wherein the third plurality of tickets includes a set of highest ranked tickets from the second plurality of tickets;

generating, by the computer system, an access token to simultaneously access at least two or more tickets from the third plurality of tickets at a time from the first plurality of time periods, wherein the access token is generated upon meeting of a bot-detection condition;

determining priority level for the user to receive access token based on identifying if the ticket request is associated with inputs from a bot;

modifying one or more attributes of communication between the computer system and the user device based on the one or more improvements, wherein modifying the one or more attributes of communication comprises extending time for confirmation of allocation of the access token from a first duration to a second duration, the time being extended for the user or the user device provided with the user characteristic-based preferential treatment, and the second duration being greater than the first duration; and transmitting, by the computer system, an indication of the third plurality of tickets to the user device associated with the ticket request, wherein each ticket of the third plurality of tickets is associated with a demand indicating a number of communications received for each ticket, and wherein the demand defines a length of a duration during which the number of communications received for each ticket exceeds a threshold of a plurality of thresholds, after start of a public on sale for the third plurality of tickets, wherein:

where the demand is high, the length is decreased, where the demand is low, the length is increased, when the demand is greater than a first threshold of the plurality of thresholds, a first set of tickets from the third plurality of tickets and a first version of an interactive resource map are transmitted to the user device, the first version of the interactive resource map displays a first graphical details including locations of a first set of resources corresponding to each ticket of the first set of tickets, when the demand is less than the first threshold and greater than a second threshold of the plurality of thresholds, a second set of tickets from the third plurality of tickets and a second version of the interactive resource map are transmitted to the user device, the second set of tickets is greater than the first set of tickets and includes the first set of tickets, the second version of the interactive resource map displays second graphical details including a plurality resources surrounding a second set of resources corresponding to each ticket of the second set of tickets and a timer indicating a time period during which the user device can acquire the second set of tickets, the second graphical details further include entirety of the first graphical details of each ticket of the first set of tickets, when the demand is less than the second threshold and greater than a third threshold of the plurality of thresholds, a third set of tickets from the third plurality of tickets and a third version of the interactive resource map are transmitted to the user device, the third set of tickets is greater than the second set of tickets and includes the second set of tickets, the third version of the interactive resource map displays third graphical details including structures surrounding a third set of resources corresponding to each ticket of the third set of tickets, the third graphical details further include entirety of the second graphical details of each ticket of the second set of, and when the demand is less than the third threshold, the third plurality of tickets are transmitted to the user device.

9. The non-transitory computer-readable storage medium of claim 8, wherein the first database object further comprises accessibility bitmasks associated with each resource of the first plurality of resources, the accessibility bitmasks comprising bit values that indicate an accessibility of a resource of the first plurality of resources at a different time within the first plurality of time periods.

10. The non-transitory computer-readable storage medium of claim 9, the instructions further comprising:

performing one assembly language process to compare accessibility bitmasks of a first resource in the third plurality of resources and accessibility bitmasks of a second resource in the third plurality of resources to determine one or more time periods of the first plurality of time periods that both the first resource in the third plurality of resources and the second resource in the third plurality of resources are available.

11. The non-transitory computer-readable storage medium of claim 9, the instructions further comprising:

performing one assembly language process to compare accessibility bitmasks of a third resource in the third plurality of resources and accessibility bitmasks of a fourth resource in the third plurality of resources to determine one or more time periods of the first plurality of time periods that both the third resource in the third plurality of resources and the fourth resource in the third plurality of resources are not available.

12. The non-transitory computer-readable storage medium of claim 8, the instructions further comprising:

receiving a selected resource identifier comprising an indication of at least two or more resources from the third plurality of resources and a particular time period identifier of the first plurality of time periods; and generating the access token to simultaneously access the at least two or more resources from the third plurality of resources at a time identified by the particular time period identifier of the first plurality of time periods.

13. The non-transitory computer-readable storage medium of claim 12, wherein the selected resource identifier further comprises a particular location identifier, and wherein one or more access tokens are valid only at particular location identified by the particular location identifier.

14. The non-transitory computer-readable storage medium of claim 12, wherein the selected resource identifier comprises an indication of at least three or more resources from the third plurality of resources.

15. A system for determining a set of available resources for admittance to an event, the system comprising:

receiving, by a computer system, a ticket request from a user device associated with a user, the ticket request comprising a series of time periods identifier identifying a first plurality of time periods to utilize a requested set of tickets and a location identifier identifying a location to utilize the requested set of tickets, and a ticket number identifying an amount of tickets within the requested set of tickets, wherein the ticket request is for one or more tickets to the event;

querying, a ticket database system, based at least in part on the series of time periods identifier and the location identifier to identify a first database object comprising a first plurality of tickets associated with the series of time periods identifier and the location identifier, the first plurality of tickets comprising one or more first events that occur at a first plurality of time periods at a first location, and wherein each database object within the ticket database system is associated with a different plurality of tickets;

receiving, by the computer system, a ticket parameter identifying one or more ticket restrictions, the one or more ticket restrictions being used to filter the one or more first events included in the first plurality of tickets;

filtering, by the computer system, the first plurality of tickets into a second plurality of tickets based at least in part on the one or more ticket restrictions of the ticket parameter, the second plurality of tickets comprising one or more second events that occur at the first plurality of time periods at the first location;

determining, by the computer system, resource history of the user, wherein:

the resource history indicates genre of a plurality of ticket request sent by the user in past and one or more locations preferred by the user in past;

ranking, by the computing system, each of the second plurality of tickets based on the resource history of the user and user availability;

determining, by the computer system, a user characteristic-based preferential treatment based on the resource history, the user characteristic-based preferential treatment being one or more improvements provided to the user or the user device based on one or more user characteristics;

selecting, by the computer system, a third plurality of tickets based on the user availability from the second plurality of tickets based on a rank of each of the second plurality of tickets, wherein the third plurality of tickets includes a set of highest ranked tickets from the second plurality of tickets;

generating, by the computer system, an access token to simultaneously access at least two or more tickets from the third plurality of tickets at a time from the first plurality of time periods, wherein the access token is generated upon meeting of a bot-detection condition;

determining priority level for the user to receive access token based on identifying if the ticket request is associated with inputs from a bot;

modifying one or more attributes of communication between the computer system and the user device based on the one or more improvements, wherein modifying the one or more attributes of communication comprises extending time for confirmation of allocation of the access token from a first duration to a second duration, the time being extended for the user or the user device provided with the user characteristic-based preferential treatment, and the second duration being greater than the first duration; and transmitting, by the computer system, an indication of the third plurality of tickets to the user device associated with the ticket request, wherein each ticket of the third plurality of tickets is associated with a demand indicating a number of communications received for each ticket, and wherein the demand defines a length of a duration during which the number of communications received for each ticket exceeds a threshold of a plurality of thresholds, after start of a public on sale for the third plurality of tickets, wherein:

where the demand is high, the length is decreased, where the demand is low, the length is increased, when the demand is greater than a first threshold of the plurality of thresholds, a first set of tickets from the third plurality of tickets and a first version of an interactive resource map are transmitted to the user device, the first version of the interactive resource map displays a first graphical details including locations of a first set of resources corresponding to each ticket of the first set of tickets, when the demand is less than the first threshold and greater than a second threshold of the plurality of thresholds, a second set of tickets from the third plurality of tickets and a second version of the interactive resource map are transmitted to the user device, the second set of tickets is greater than the first set of tickets and includes the first set of tickets, the second version of the interactive resource map displays second graphical details including a plurality resources surrounding a second set of resources corresponding to each ticket of the second set of tickets and a timer indicating a time period during which the user device can acquire the second set of tickets, the second graphical details further include entirety of the first graphical details of each ticket of the first set of tickets, when the demand is less than the second threshold and greater than a third threshold of the plurality of thresholds, a third set of tickets from the third plurality of tickets and a third version of the interactive resource map are transmitted to the user device, the third set of tickets is greater than the second set of tickets and includes the second set of tickets, the third version of the interactive resource map displays third graphical details including structures surrounding a third set of resources corresponding to each ticket of the third set of tickets, the third graphical details further include entirety of the second graphical details of each ticket of the second set of, and when the demand is less than the third threshold, the third plurality of tickets are transmitted to the user device.

16. The system of claim 15, wherein the first database object further comprises accessibility bitmasks associated with each resource of the first plurality of resources, the accessibility bitmasks comprising bit values that indicate an accessibility of a resource of the first plurality of resources at a different time within the first plurality of time periods.

17. The system of claim 16, wherein the instructions that when executed by the one or more processors further cause the one or more processors to:

perform one assembly language process to compare accessibility bitmasks of a first resource in the third plurality of resources and accessibility bitmasks of a second resource in the third plurality of resources to determine one or more time periods of the first plurality of time periods that both the first resource in the third plurality of resources and the second resource in the third plurality of resources are available.

18. The system of claim 16, further comprising:

perform one assembly language process to compare accessibility bitmasks of a third resource in the third plurality of resources and accessibility bitmasks of a fourth resource in the third plurality of resources to determine one or more time periods of the first plurality of time periods that both the third resource in the third plurality of resources and the fourth resource in the third plurality of resources are not available.

19. The system of claim 15, wherein the instructions that when executed by the one or more processors further cause the one or more processors to:

receive, from the user device, a selected resource identifier comprising an indication of at least two or more resources from the third plurality of resources and a particular time period identifier of the first plurality of time periods; and generate the access token to simultaneously access the at least two or more resources from the third plurality of resources at a time identified by the particular time period identifier of the first plurality of time periods.

20. The system of claim 19, wherein the selected resource identifier further comprises a particular location identifier, and wherein one or more access tokens are valid only at particular location identified by the particular location identifier.

21. The computer-implemented method for determining the set of available tickets for admittance to the event as claimed in claim 1 wherein:

the first version of the resource map indicates a visual representation of the first set of tickets.

* * * * *